US009109823B2

(12) United States Patent
Itou et al.

(10) Patent No.: US 9,109,823 B2
(45) Date of Patent: Aug. 18, 2015

(54) INTEGRATION VALVE

(71) Applicant: DENSO CORPORATION, Kariya, Aichi (JP)

(72) Inventors: Tetsuya Itou, Kariya (JP); Yukihiko Takeda, Aichi-gun (JP); Teruyuki Hotta, Nagoya (JP); Atsushi Inaba, Okazaki (JP); Keiichi Yoshii, Anjo (JP); Shigeji Ohishi, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/349,620

(22) PCT Filed: Oct. 2, 2012

(86) PCT No.: PCT/JP2012/006304
§ 371 (c)(1),
(2) Date: Apr. 3, 2014

(87) PCT Pub. No.: WO2013/051237
PCT Pub. Date: Apr. 11, 2013

(65) Prior Publication Data
US 2014/0290772 A1     Oct. 2, 2014

(30) Foreign Application Priority Data

Oct. 5, 2011   (JP) ................................ 2011-221016
Aug. 24, 2012  (JP) ................................ 2012-185549

(51) Int. Cl.
*F25B 41/06*     (2006.01)
*F25B 41/04*     (2006.01)
(Continued)

(52) U.S. Cl.
CPC ............. *F25B 41/046* (2013.01); *F16K 11/044* (2013.01); *F16K 31/04* (2013.01); *F25B 1/00* (2013.01); *F25B 41/04* (2013.01);
(Continued)

(58) Field of Classification Search
CPC ...... F25B 41/04; F25B 41/043; F25B 41/062; F25B 43/006; F25B 2341/0653; F25B 2480/13; F25B 2500/18
See application file for complete search history.

(56) References Cited

U.S. PATENT DOCUMENTS 5,526,650 A    6/1996   Iritani et al.
5,619,861 A *  4/1997   Yamanaka et al. ............... 62/225
(Continued)

FOREIGN PATENT DOCUMENTS

JP    S62-76876 U    5/1987
JP    H11-157327 A   6/1999
(Continued)

OTHER PUBLICATIONS

U.S. Appl. No. 14/349,543, filed Apr. 3, 2014, Itou et al.
(Continued)

*Primary Examiner* — Cassey D Bauer
(74) *Attorney, Agent, or Firm* — Harness, Dickey & Pierce, PLC

(57) ABSTRACT

A vapor-liquid separating space is provided in a body. The body houses a fixed throttle-decompressing liquid-phase refrigerant, and an integration valve member selectively opening or closing a liquid-phase refrigerant passage and a vapor-phase refrigerant passage. The integration valve member is moved by a stepping motor connected to the integration valve member via a shaft. Accordingly, a cycle configuration of a heat pump cycle working as a gas injection cycle can be simplified.

14 Claims, 24 Drawing Sheets

(51) Int. Cl.
  *F25B 43/00*   (2006.01)
  *F25B 1/00*    (2006.01)
  *F16K 11/044*  (2006.01)
  *F16K 31/04*   (2006.01)

(52) U.S. Cl.
  CPC .............. *F25B 41/062* (2013.01); *F25B 43/00* (2013.01); *F25B 2341/0653* (2013.01); *F25B 2400/13* (2013.01); *F25B 2400/23* (2013.01); *F25B 2500/18* (2013.01); *Y02B 30/72* (2013.01); *Y10T 137/86509* (2015.04)

(56) References Cited

U.S. PATENT DOCUMENTS

| | | |
|---|---|---|
| 5,704,219 A | 1/1998 | Suzuki et al. |
| 5,934,094 A | 8/1999 | Itoh et al. |
| 2013/0312447 A1 | 11/2013 | Inaba et al. |

FOREIGN PATENT DOCUMENTS

| | | |
|---|---|---|
| JP | 3257361 B2 | 2/2002 |
| JP | 3331765 B2 | 10/2002 |
| JP | 2009-228979 A | 10/2009 |
| JP | 2010-133606 A | 6/2010 |
| JP | 2011-090920 A | 5/2011 |
| JP | 2012-091578 A | 5/2012 |
| JP | 2012-181005 A | 9/2012 |
| WO | WO-2012108211 A1 | 8/2012 |
| WO | WO-2013051235 A1 | 4/2013 |

OTHER PUBLICATIONS

International Search Report and Written Opinion of the ISA for PCT/JP2012/006304, ISA/JP, mailed Dec. 25, 2012.

* cited by examiner

COOLING OPERATION MODE /
DEHUMIDIFICATION AND HEATING OPERATION MODE

HEATING OPERATION MODE (FIRST HEATING MODE)

HEATING OPERATION MODE (SECOND HEATING MODE)

COOLING OPERATION MODE

HEATING OPERATION MODE (FIRST HEATING MODE)

HEATING OPERATION MODE (SECOND HEATING MODE)

DEHUMIDIFICATION AND HEATING OPERATION MODE
(FIRST DEHUMIDIFICATION AND HEATING MODE)

DEHUMIDIFICATION AND HEATING OPERATION MODE
(SECOND DEHUMIDIFICATION AND HEATING MODE)

DEHUMIDIFICATION AND HEATING OPERATION MODE
(THIRD DEHUMIDIFICATION AND HEATING MODE)

DEHUMIDIFICATION AND HEATING OPERATION MODE
(FOURTH DEHUMIDIFICATION AND HEATING MODE)

INTEGRATION VALVE

CROSS REFERENCE TO RELATED APPLICATION

This application is a 371 U.S. National Phase of PCT/JP2012/006304, filed on Oct. 2, 2012, based on Japanese Patent Applications No. 2011-221016 filed on Oct. 5, 2011 and No. 2012-185549 filed on Aug. 24, 2012, the contents of which are incorporated herein by reference in their entirety.

FIELD OF THE INVENTION

The present disclosure relates to an integration valve used for a heat pump cycle functioning as a gas injection cycle.

BACKGROUND OF THE INVENTION

Conventionally, an air conditioner for a vehicle, for example, an electric vehicle in which it is difficult to secure a heat source for heating a vehicle compartment, is known to heat air blown into a vehicle compartment in a heat pump cycle (i.e., a vapor compression refrigerant cycle).

For example, Patent Document 1 and Patent Document 2 describe a heat pump cycle used for such kind of a vehicle air conditioner, in which a refrigerant cycle in a cooling operation and a refrigerant cycle in a heating operation are configured to be switchable. More specifically, in the heat pump cycle of Patent Document 1 and Patent Document 2, a refrigerant cycle is switched so that refrigerant absorbs heat from outside air at an exterior heat exchanger and releases the heat to the blown air at an interior condenser, to heat the blown air in the heating operation.

In the heat pump cycle of Patent Document 2, in the heating operation, refrigerant is pressurized through multiple stages by two compression mechanisms such as a low stage compression mechanism and a high stage compression mechanism. An intermediate-pressure gas-phase refrigerant is mixed with a refrigerant discharged from the low stage compression mechanism, and the mixed refrigerant is drawn into the high stage compression mechanism. That is, a gas injection cycle (i.e., an economizer-type refrigerant cycle) is set to improve a coefficient of performance (COP) in the heating operation.

PRIOR ART DOCUMENT

Patent Document 1: Japanese Patent No. 3331765
Patent Document 2: Japanese Patent No. 3257361

SUMMARY OF THE INVENTION

However, according to investigations of inventors of the present disclosure, the heat pump cycle described in Patent Document 1 and Patent Document 2 needs to have multiple valves such as an open-close valve or a four-way valve to switch between the refrigerant cycle in the cooling operation and the refrigerant cycle in the heating operation. Therefore, switching control to switch cycle structures or refrigerant cycles may become complicate.

Specifically, when a refrigerant cycle working as a gas injection cycle, such as the refrigerant cycle described in Patent Document 2, is configured, a cycle structure tends to likely be complicated compared to a conventional refrigerant cycle. Further, in association with a complex cycle structure, there is a risk that ease of mounting of the heat pump cycle as a whole to an object such as a vehicle may be decreased.

The present disclosure has been made in view of the foregoing points, and it is an object of the present disclosure to provide an integration valve to simplify a cycle configuration of a heat pump cycle.

An integration valve of the present disclosure is used for a heat pump cycle which is capable of working as a gas injection cycle and including a compressor, a using-side heat exchanger, a high-stage-side decompressor, and an evaporator. The compressor decompresses refrigerant drawn from a suction port, discharges high-pressure refrigerant from a discharge port, and has an intermediate-pressure port drawing intermediate-pressure refrigerant in the cycle and mixing the intermediate-pressure refrigerant with refrigerant being decompressed. In the using-side heat exchanger, a heat-exchange fluid exchanges heat with the high-pressure refrigerant discharged from the discharge port so as to be heated. The high-stage-side decompressor decompresses high-pressure refrigerant flowing out of the using-side heat exchanger to be intermediate-pressure refrigerant. The evaporator evaporates low-pressure refrigerant in the cycle and causing the evaporated low-pressure refrigerant to flow to the suction port.

According to a first example of the integration valve of the present disclosure, the integration valve has a body, an integration valve member, and a drive device. In the body, a refrigerant inlet port, a vapor-liquid separating space, a vapor-phase refrigerant outlet port, and a liquid-phase refrigerant outlet port are provided. The intermediate-pressure refrigerant decompressed at the high-stage-side decompressor flows through the refrigerant inlet port. The vapor-liquid separating space separates refrigerant flowing out of the refrigerant inlet port into vapor-phase refrigerant and liquid-phase refrigerant. The vapor-phase refrigerant separated in the vapor-liquid separating space flows out through the vapor-phase refrigerant outlet port to a side of the intermediate-pressure port. The liquid-phase refrigerant separated in the vapor-liquid separating space flows out through the liquid-phase refrigerant outlet port to a side of the evaporator. The integration valve member is disposed in the body, and opens or closes (i) a liquid-phase refrigerant passage extending from the vapor-liquid separating space to the liquid-phase refrigerant outlet port and (ii) a vapor-phase refrigerant passage extending from the vapor-liquid separating space to the vapor-phase refrigerant outlet port. The drive device is connected to the integration valve member via a drive mechanism and operating the integration valve member. The drive device operates and moves the integration valve member (i) to close the vapor-phase refrigerant passage so that liquid-phase refrigerant flows toward a side of the liquid-phase refrigerant outlet port when the liquid-phase refrigerant passage is open and (ii) to be displaced so that liquid-phase refrigerant flowing to the side of the liquid-phase refrigerant outlet port is decompressed, when the vapor-phase refrigerant passage is open and vapor-phase refrigerant flows to a side of the vapor-phase refrigerant outlet port.

Accordingly, by using the single integration valve, intermediate-pressure refrigerant can be separated into vapor-phase refrigerant and liquid-phase refrigerant, the liquid-phase refrigerant passage and the vapor-phase refrigerant passage can be open or closed, and liquid-phase refrigerant can be decompressed. Furthermore, by just displacing the integration valve member using the drive device, a refrigerant circuit in the cycle can be switched for a refrigerant circuit working as a gas injection cycle.

Therefore, a heat pump cycle working as a gas injection cycle can be configured with a simple cycle configuration. It should be noted that "vapor-phase refrigerant" includes not only refrigerant in a vapor-phase state (i.e., single phase refrigerant) but also refrigerant in a vapor-liquid mixing state mainly including refrigerant in the vapor-phase state, and that "liquid-phase refrigerant" includes not only refrigerant in a liquid-phase state (i.e., single phase refrigerant) but also refrigerant in a vapor-liquid mixing state mainly including refrigerant in the liquid-phase state.

Alternatively, according to a second example of the integration valve of the present disclosure, a fixed throttle decompresses the liquid-phase refrigerant flowing to the side of the liquid-phase refrigerant outlet port when the vapor-phase refrigerant passage is open so that vapor-phase refrigerant flows toward the side of the vapor-phase refrigerant outlet port is housed in the body. The drive device may operate the integration valve member to close the liquid-phase refrigerant passage when the vapor-phase refrigerant passage is open so that vapor-phase refrigerant flows to the side of the vapor-phase refrigerant outlet port.

Accordingly, when the integration valve member closes the liquid-phase refrigerant passage, vapor-phase refrigerant separated in the vapor-liquid separating space flows out through the vapor-phase refrigerant outlet port, and liquid-phase refrigerant decompressed at the fixed throttle flows out through the liquid-phase refrigerant outlet port.

On the other hand, when the integration valve member opens the liquid-phase refrigerant passage, refrigerant can flow out through the liquid-phase refrigerant outlet port without flowing out of the vapor-phase refrigerant outlet port.

Therefore, the liquid-phase refrigerant passage and the vapor-phase refrigerant passage can be selectively open or closed by a single valve body without disposing a valve body to each of the liquid-phase refrigerant passage and the vapor-phase refrigerant passage. Accordingly, a cycle configuration of the heat pump cycle which is capable of working as a gas injection cycle can be simplified.

Alternatively, according to a third example of the integration valve of the present disclosure, the liquid-phase refrigerant passage and the fixed throttle may be located downward of the separated vapor-phase refrigerant outlet hole through which vapor-phase refrigerant flows out through the vapor-liquid separating space to a side of the vapor-phase refrigerant passage.

Accordingly, liquid-phase refrigerant separated in the vapor-liquid separating space due to gravity can be guided into the liquid-phase refrigerant passage and to a side of the fixed throttle.

Alternatively, according to a fourth example of the integration valve of the present disclosure, the drive device may operate the integration valve member so that the liquid-phase refrigerant passage is slightly open to decompress liquid-phase refrigerant flowing to the side of the liquid-phase refrigerant outlet port, when the vapor-phase refrigerant passage is open, and when vapor-phase refrigerant flows to the side of the vapor-phase refrigerant outlet port.

Accordingly, when the integration valve member opens the vapor-phase refrigerant passage, vapor-phase refrigerant separated in the vapor-liquid separating space can flow out through the vapor-phase refrigerant outlet port, and liquid-phase refrigerant can be decompressed at a clearance provided between the integration valve member and the liquid-phase refrigerant passage and can flow out through the liquid-phase refrigerant outlet port.

On the other hand, when the integration valve member opens the liquid-phase refrigerant passage, refrigerant can flow out through the liquid-phase refrigerant outlet port without flowing out of the vapor-phase refrigerant outlet port.

Therefore, the liquid-phase refrigerant passage and the vapor-phase refrigerant passage can be open or closed selectively by a single valve body without disposing a valve body to each of the liquid-phase refrigerant passage and the vapor-phase refrigerant passage so as to open or close those passages, and inside structure of the integration valve can be simplified. Accordingly, a cycle configuration of the heat pump cycle which is capable of working as a gas injection cycle can be simplified.

In addition, when the integration valve member opens the vapor-phase refrigerant passage, liquid-phase refrigerant can be decompressed at the clearance provided between the liquid-phase refrigerant passage and the integration valve member. Therefore, the fixed throttle is unnecessary, and a configuration of the integration valve can be simplified.

Specifically, according to a fifth example of the integration valve of the present disclosure, the vapor-liquid separating space may be provided in a cylindrical shape. A cylindrical-shaped separated vapor-phase refrigerant outlet pipe may be arranged inside the vapor-liquid separating space coaxially with the vapor-liquid separating space and provide the vapor-phase refrigerant passage therein. A separated vapor-phase refrigerant outlet hole through which vapor-phase refrigerant flows out through the vapor-liquid separating space to the side of the vapor-phase refrigerant passage may be at an end of the separated vapor-phase refrigerant outlet pipe in a longitudinal direction. The integration valve member may open or close a separated liquid-phase refrigerant outlet hole through which liquid-phase refrigerant flowing from a side of the separated vapor-phase refrigerant outlet hole and the vapor-liquid separating space flows to the side of the liquid-phase refrigerant passage.

Alternatively, according to a sixth example of the integration valve of the present disclosure, the vapor-liquid separating space may include a swirl space, a separating space, and a storing space. The swirl space is provided between an inner wall surface of the vapor-liquid separating space and an outer wall surface of the separated vapor-phase refrigerant outlet pipe, and refrigerant flowing from the refrigerant inlet port swirls along the inner wall surface of the vapor-liquid separating space. The separating space is (i) located downward of the swirl space, (ii) provided between the end of the separated vapor-phase refrigerant outlet pipe in the longitudinal direction and the integration valve member, and (iii) separating refrigerant into vapor-phase and liquid-phase. The storing space is located downward of the separating space and storing liquid-phase refrigerant separated from refrigerant in the separating space. The integration valve member may be arranged between the separated vapor-phase refrigerant outlet hole located in the separating space and the separated liquid-phase refrigerant outlet hole located in the storing space and may be made of a discoid-shaped member which is larger than an inside diameter of the separated liquid-phase refrigerant outlet hole.

Accordingly, by the integration valve member, liquid-phase refrigerant can be restricted from scattering from a side of the separated liquid-phase refrigerant outlet hole located in the storing space to a side of the separated vapor-phase refrigerant outlet hole located in the separating space. Therefore, a space for the vapor-liquid separating space can be saved, and an entire integration valve member can be downsized. Moreover, whole of the heat pump cycle can be downsized, and mountability of the heat pump cycle in a target object can be improved.

Alternatively, according to a seventh example of the integration valve of the present disclosure. when (i) an outside diameter of the integration valve member is defined as Ds, (ii) an outside diameter of the separated vapor-phase refrigerant outlet pipe is defined as Dp, (iii) an inside diameter of the vapor-liquid separating space is defined as Dr, and (iv) the inside diameter of the separated liquid-phase refrigerant outlet hole is defined as Do, those diameters Ds, Dp, Dr, and Do may satisfy following formulas of $Dp \leq Ds \leq (Dx+Dr)/2$ and $Dx=(Dr^2-Do^2)^{1/2}$.

By determining the outside diameter of the integration valve member in such a way, pressure loss caused by the integration valve member can be restricted, and vapor-liquid separating efficiency inside the integration valve can be improved.

Alternatively, according to an eighth example of the integration valve of the present disclosure, a diameter of an outer periphery part of the integration valve member at least on a side of the separated vapor-phase refrigerant outlet hole may continuously decrease from a side of the separated liquid-phase refrigerant outlet hole to a side of the separated vapor-phase refrigerant outlet hole.

Accordingly, when refrigerant flows around the integration valve member, the refrigerant can flow smoothly from a side of the separated vapor-phase refrigerant outlet hole to a side of the separated liquid-phase refrigerant outlet hole, and pressure loss caused by the integration valve member can be reduced.

Alternatively, according to a ninth example of the integration valve of the present disclosure, a refrigerant introducing passage, guiding refrigerant to flow from the refrigerant inlet port to the vapor-liquid separating space, may communicate with the vapor-liquid separating space via a refrigerant introducing hole provided at a radial-outer wall surface of the vapor-liquid separating space. The refrigerant introducing hole may be open at a position far from the end of the separated vapor-phase refrigerant outlet pipe in the longitudinal direction, and closer to the other end of the separated vapor-phase refrigerant outlet pipe in the longitudinal direction.

By providing the refrigerant introducing hole to be distanced from the separated vapor-phase refrigerant outlet hole in the axial direction of the vapor-liquid separating space, (i) an approach zone for refrigerant in the vapor-liquid separating space 141b can be secured, (ii) a centrifugal force can effectively affect refrigerant flowing into the vapor-liquid separating space, and (iii) vapor-liquid separating efficiency inside the integration valve can be improved.

Alternatively, according to a tenth example of the integration valve of the present disclosure, the refrigerant introducing hole may be an oblong hole extending in the axial direction of the vapor-liquid separating space.

Accordingly, refrigerant is restricted from scattering radially-inward of the vapor-liquid separating space and can flow along radial-outer wall surface of the vapor-liquid separating space. Therefore, a centrifugal force can effectively affect refrigerant flowing into the vapor-liquid separating space, and vapor-liquid separating efficiency inside the integration valve can be improved.

Alternatively, according to a eleventh example of the integration valve of the present disclosure, when (i) a distance in the axial direction from an end of the refrigerant introducing hole corresponding to the end of the separated vapor-phase refrigerant outlet pipe in the longitudinal direction to the other end of the separated vapor-phase refrigerant outlet pipe in the longitudinal direction is defined as Lv, and (ii) a dimension of the refrigerant introducing hole extending in the axial direction in the vapor-liquid separating space is defined as Dv, the distance Lv and the dimension Dv may satisfy a following formula of $Lv \geq (1/2) \times Dv$.

By determining the distance from the end of the refrigerant introducing hole to the end of the separated vapor-phase refrigerant outlet pipe in such a way, an approach zone of refrigerant swirling in the vapor-liquid separating space can be secured, and vapor-liquid separating efficiency inside the integration valve can be improved.

Alternatively, according to a twelfth example of the integration valve of the present disclosure, the body may have a tubular portion in which the liquid-phase refrigerant passage and the separated liquid-phase refrigerant outlet hole are provided. The tubular portion may have a heat resistance higher than that of a portion around the tubular portion.

Accordingly, heat transferring between liquid-phase refrigerant decompressed by displacement of the integration valve member and refrigerant in the vapor-liquid separating space via the body and the cylindrical portion is restricted.

Therefore, refrigerant before being decompressed is hardly being cooled by liquid-phase refrigerant decompressed by displacement of the integration valve member, and decompression characteristic is restricted from being changed by displacement of the integration valve member. Thus, depression of a heat amount of the heat exchanger, which is arranged downstream of the integration valve in a flow direction of refrigerant and absorbs heat, is restricted. Further, a temperature of vapor-phase refrigerant flowing out of the vapor-phase refrigerant passage can be restricted from being decreased due to liquid-phase refrigerant decompressed by displacement of the integration valve member. Accordingly, when the heat pump cycle works as a gas injection cycle, decreasing of heating capacity can be reduced.

DETAILED DESCRIPTION OF THE PREFERRED EMBODIMENTS

Embodiments of the present disclosure will be described hereafter referring to drawings. In the embodiments, a part that corresponds to a matter described in a preceding embodiment may be assigned with the same reference number, and redundant explanation for the part may be omitted.

First Embodiment

Referring to FIGS. 1 to 18, a first embodiment of the present disclosure will be described below. According to the first embodiment, a heat pump cycle (i.e., a vapor compression refrigerant cycle) 10 has an integration valve 14 of the present disclosure, and the heat pump cycle 10 is used for a vehicle air conditioner 1 of an electric vehicle. The electric vehicle gains a driving force from an electric motor for driving the electric vehicle. In the vehicle air conditioner 1, the heat pump cycle 10 carries out a cooling operation or a heating operation to cool or heat a blown air blown into a passenger compartment, which is an example of an object space being air-conditioned. Therefore, an object fluid of heat exchanging is the blown air in the first embodiment.

Figure 1:
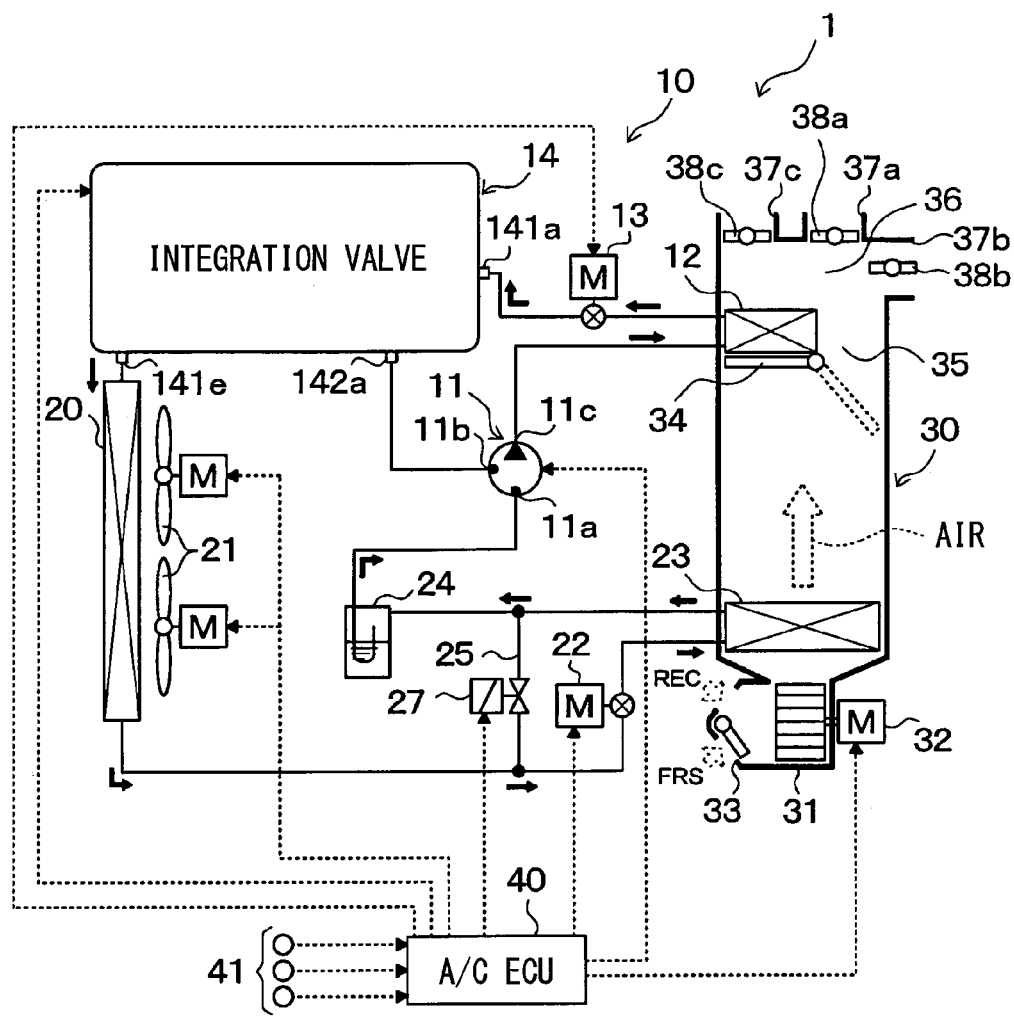
FIG. 1 is an overall schematic diagram illustrating a refrigerant cycle in a cooling operation mode/dehumidification and heating operation mode according to a first embodiment.

Further, as shown in an overall schematic diagram of FIG. 1, the heat pump cycle 10 is configured to switch between (i) a refrigerant cycle in a cooling operation mode cooling the passenger compartment (i.e., a cooling operation mode cooling the blown air) or in a dehumidification and heating operation mode (i.e., a dehumidification mode) dehumidifying and heating the passenger compartment and (ii) a refrigerant cycle in a heating operation mode heating the passenger compartment (i.e., a heating operation mode heating the blown air).

Figure 2:
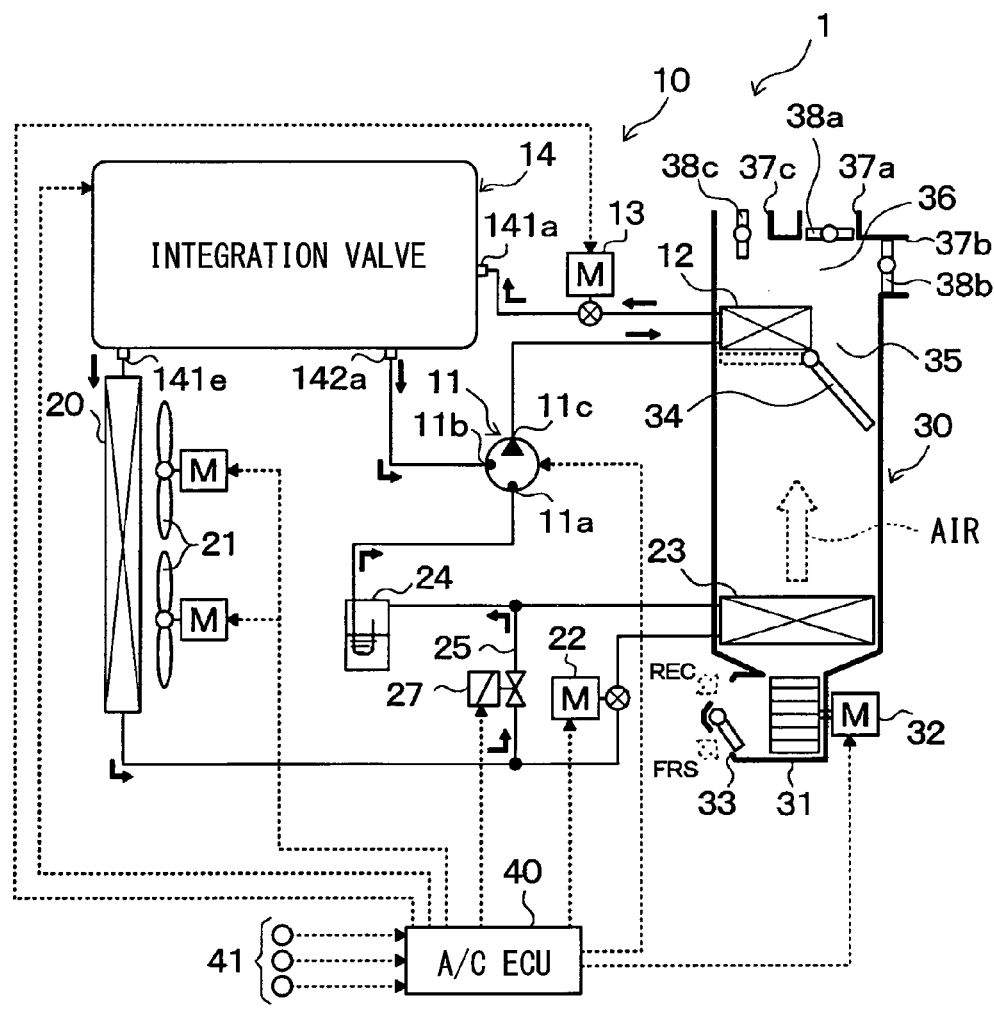
FIG. 2 is an overall schematic diagram illustrating a refrigerant cycle in a first heating mode of the heat pump cycle according to the first embodiment.
Figure 3:
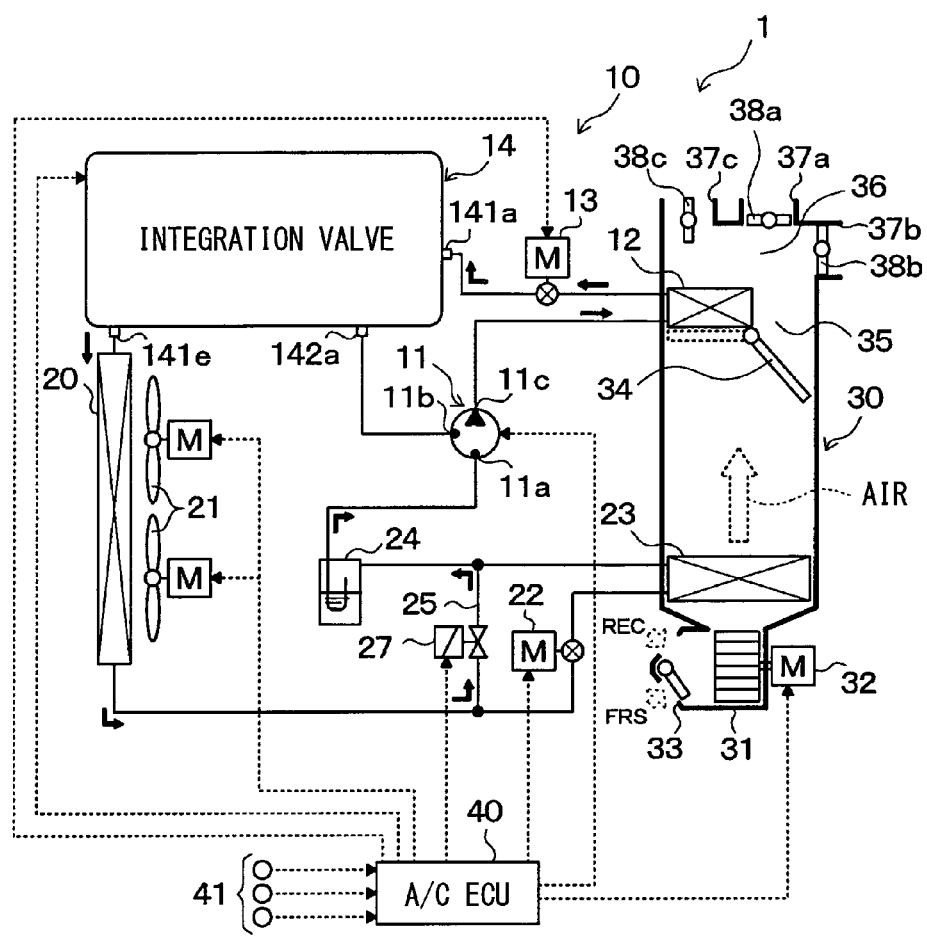
FIG. 3 is an overall schematic diagram illustrating a refrigerant cycle in a second heating mode of the heat pump cycle according to the first embodiment.

Specifically, the heat pump cycle 10 switches between a first heating mode (FIG. 2), which is an example of the heating operation mode and is carried out when an outside temperature is ultralow (e.g., under 0° C.), and a second heating mode (FIG. 3), in which a normal heating is carried out. In FIGS. 1-3, a refrigerant flow of each operation mode is shown by solid arrows.

The heat pump cycle 10 uses a hydrofluorocarbon (HFC)-group refrigerant, specifically, R134a, as a refrigerant and constructs a vapor-compression subcritical refrigerant cycle, in which a high-pressure side refrigerant pressure Pd does not exceed a subcritical pressure of the refrigerant. Other refrigerant such as a hidrofluoroolefin (HFO)-group refrigerant, for example, R1234yf, may be used. Further, the refrigerant is mixed with a refrigerant oil lubricating a compressor 11, and a part of the refrigerant oil circulates in the heat pump cycle 10 together with the refrigerant.

The compressor 11 is one of components of the heat pump cycle 10 and positioned in a bonnet of a vehicle. In the heat pump cycle 10, when the refrigerant is supplied to the compressor 11, the compressor 11 compresses the refrigerant and discharges a compressed refrigerant. The compressor 11 is a double-stage-compression electric compressor configured to include a housing. The housing defines an outer wall of the compressor 11 and houses two compression mechanisms (i.e., a low-stage compression mechanism and a high-stage compression mechanism) and an electric motor, which operates and rotates the two compression mechanisms.

The housing of the compressor 11 has a suction port 11a, an intermediate-pressure port 11b, and a discharge port 11c. The suction port 11a draws a low-pressure refrigerant from outside of the housing to the low-stage compressing mechanism. The intermediate-pressure port 11b supplies an intermediate-pressure refrigerant from outside the housing to inside the housing and mixes the intermediate-pressure refrigerant with a refrigerant being compressed from a low pressure to a high pressure. The discharge port 11c discharges a high-pressure refrigerant from the high-stage compressing mechanism, to outside of the housing.

Specifically, the intermediate-pressure port 11b is connected to a refrigerant outlet side of the low-stage compression mechanism (i.e., a refrigerant suction side of the high-stage compression mechanism). The low-stage compression mechanism and the high-stage compression mechanism may be a scroll-type compression mechanism, vane-type compression mechanism, a rolling-piston-type compression mechanism, or the like.

Operation (i.e., a rotation speed) of the electric motor is controlled by control signals output from an air-conditioning controller 40 which is described later, and the electric motor may be an alternating-current or a direct-current motor. A refrigerant discharge capacity of the compressor 11 is changed by a rotation-number control. According to the first embodiment, the electric motor configures a discharge capacity changing part changing the refrigerant discharge capacity of the compressor 11.

Although the compressor 11, in which the two compression mechanisms are housed by a single housing, is used according to the first embodiment, a type of a compressor is not limited to the compressor 11. That is, as long as the intermediate-pressure refrigerant is made to flow through the intermediate-pressure port 11b and mixed with the refrigerant being compressed from a low pressure to a high pressure, the compressor 11 may be an electric compressor. The electric compressor is configured such that one fixed-capacity-type compression mechanism and an electric motor rotary operating the fixed-capacity-type compression mechanism are housed in a housing.

Further, a double-stage-compression electric compressor may have a structure in which two compressors, a low-stage-side compressor and a high-stage-side compressor, are connected in series. The suction port 11a may be a suction port of the low-stage-side compressor positioned on a low-stage side. The discharge port 11c may be a discharge port of the high-stage-side compressor positioned on a high-stage side. The intermediate-pressure port 11b may be located at a connection part connecting a discharge port of the low-stage-side compressor and a suction port of the high-stage-side compressor.

A refrigerant inlet side of an interior condenser 12 is connected to the discharge port 11c of the compressor 11. The interior condenser 12 is a using-side heat exchanger (i.e., a first using-side heat exchanger) heating a blown air passed though an interior evaporator 23 which will be described later, and is disposed in an air conditioning case 31 of an interior air conditioning unit 30 disposed in the vehicle air conditioner 1, which will be described after. The interior condenser 12 works as a radiator radiating heat of a high-temperature high-pressure refrigerant discharged from the compressor 11, specifically, the high-stage-side compression mechanism.

A refrigerant outlet side of the interior condenser 12 is connected with an inlet side of a high-stage-side expansion valve 13 working as a high-stage-side decompressor (i.e., a first decompressor) decompressing a high-pressure refrigerant, flowing out the interior condenser 12, to be an intermediate-pressure refrigerant. The high-stage-side decompressor is an electric variable throttle mechanism including a valve body, in which a throttle opening degree of the valve body can be changed, and an electric actuator having a stepping motor changing the throttle opening degree of the valve body.

Specifically, when the high-stage-side expansion valve 13 is partially closed to decompress a refrigerant, the throttle opening degree is changed such that an equivalent diameter of a throttle passage area is within the range of $\phi 0.5$-$\phi 3$ mm. Further, when the throttle opening degree is fully opened, the equivalent diameter of the throttle passage area can be kept to $\phi$ 10 mm so that a refrigerant decompression function is not exerted. Operation of the high-stage-side expansion valve 13 is controlled by control signals output from the air-conditioning controller 40. An outlet side of the high-stage-side expansion valve 13 is connected with a refrigerant inlet port 141a of the integration valve 14.

The integration valve 14 is configured such that a vapor-liquid separating part (e.g., a vapor-liquid separating space 141b), a valve device (e.g., an integration valve member 29), a decompressor (e.g., a fixed throttle 17), and the like are integrated. The vapor-liquid separating part separates a refrigerant, flowing out the high-stage-side expansion valve 13, into a vapor-phase refrigerant and a liquid-phase refrigerant. The valve device opens or closes a vapor-phase refrigerant passage 142b, through which the vapor-phase refrigerant separated by the vapor-liquid separating part passes, and a liquid-phase refrigerant passage 141d. The decompressor decompresses the liquid-phase refrigerant separated by the vapor-liquid separating part.

In other words, the integration valve 14 has a structure in which a part of component devices required to drive the heat pump cycle 10 as a gas injection cycle are integrated. Moreover, the integration valve 14 carries out a function as a refrigerant cycle switching part switching a refrigerant cycle in which refrigerant is circulating.

Figure 4:
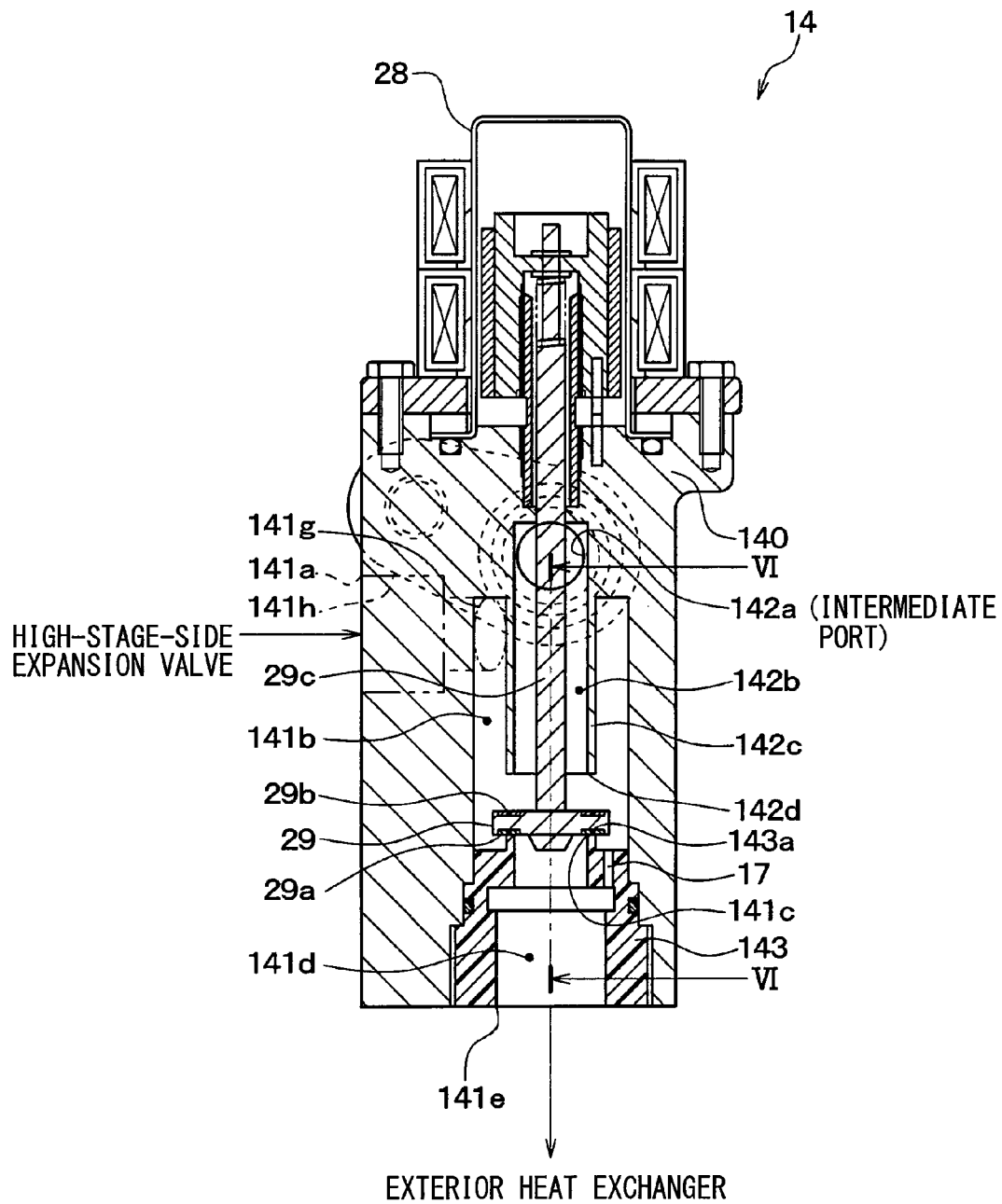
FIG. 4 is a cross-sectional view of an integration valve taken along a line extending in a top-bottom direction at a time when a separated vapor-phase refrigerant outlet hole is open, according to the first embodiment.
Figure 5:
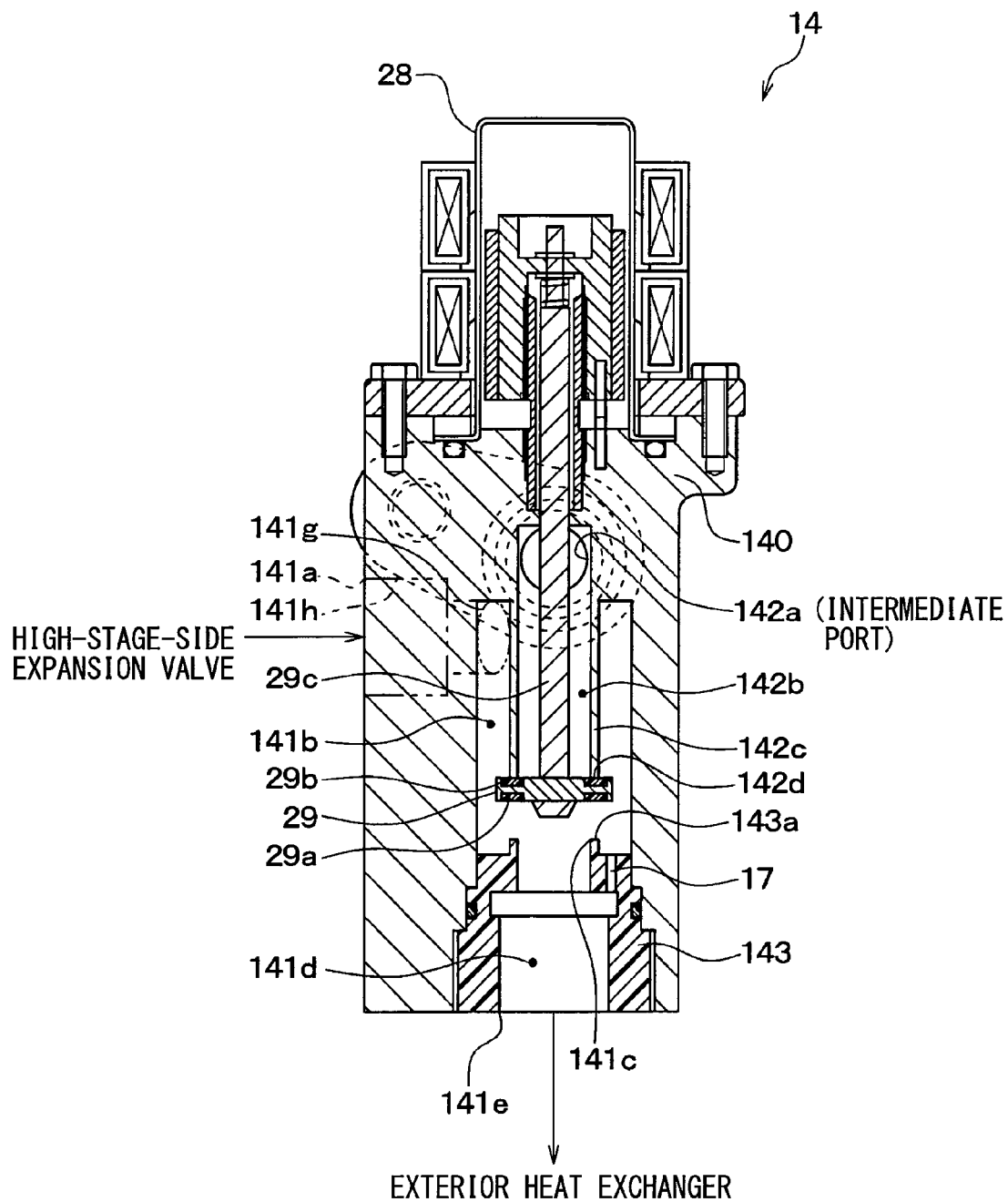
FIG. 5 is a cross-sectional view of the integration valve taken along the line extending in the top-bottom direction at a time when the separated vapor-phase refrigerant outlet hole is closed, according to the first embodiment.
Figure 6:
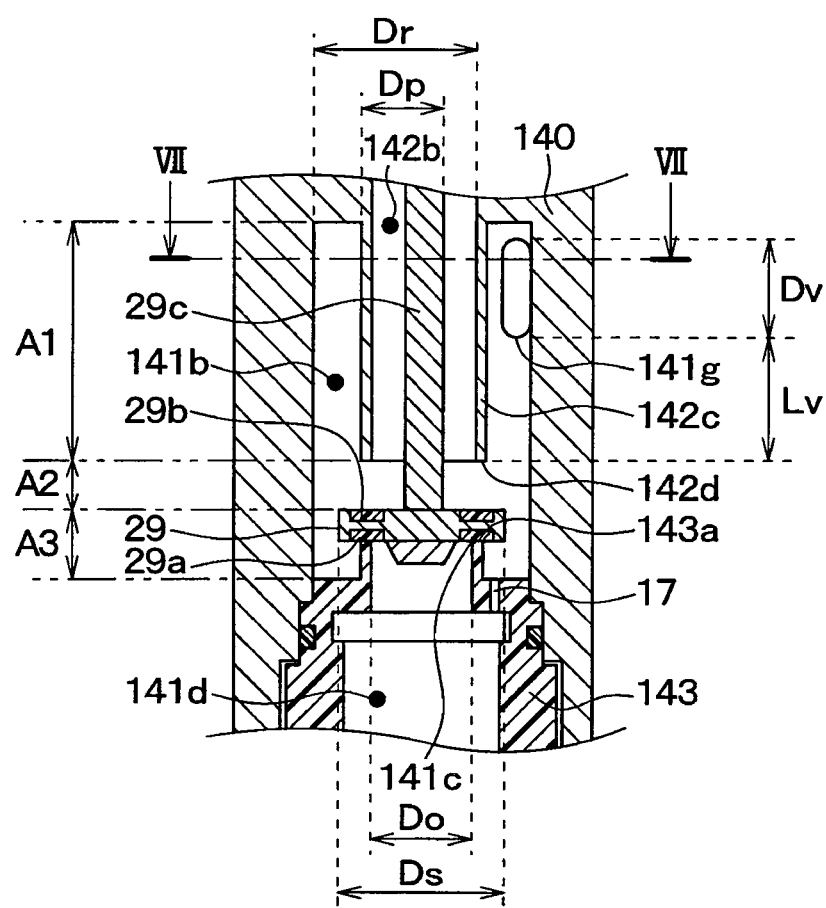
FIG. 6 is a cross-sectional view taken along a line VI-VI of FIG. 4.
Figure 7:
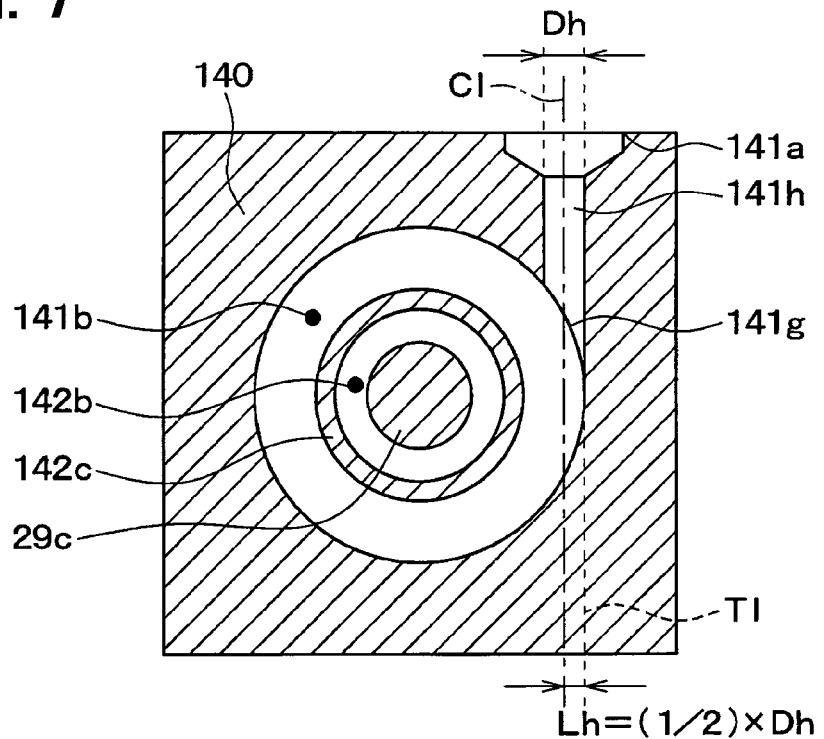
FIG. 7 is a cross-sectional view taken along a line VII-VII of FIG. 6.
Figure 8:
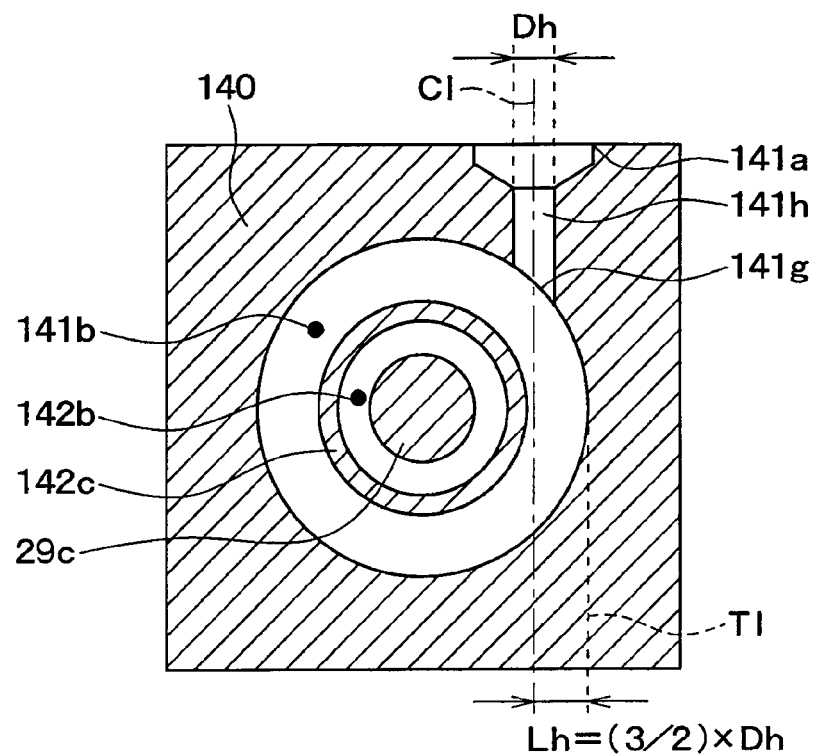
FIG. 8 is a cross-sectional view illustrating a modification example of a location of a refrigerant introducing passage.

A detail of the structure of the integration valve 14 will be described hereafter referring to FIGS. 4-8. FIGS. 4 and 5 are schematic cross-sectional views of the integration valve 14 of the first embodiment taken along a line extending in top-bottom direction. FIG. 4 is a cross-sectional view showing a stepping motor 28, which will be described after, in a condition where the stepping motor 28 operates the integration valve member 29 so that a separated vapor-phase-refrigerant outlet hole 142d is opened. FIG. 5 is a cross-sectional view showing the stepping motor 28 in a condition where the stepping motor 28 operates the integration valve member 29 so that the separated vapor-phase-refrigerant outlet hole 142d is closed. FIG. 6 is a cross-sectional view taken along a line VI-VI of FIG. 6, and FIG. 7 is a cross-sectional view taken along a line VII-VII of the FIG. 6, and FIG. 8 shows a modification example of locational configuration inside the integration valve 14.

The integration valve 14 has a body 140 defining an outer shell of the integration valve 14 and housing the integration valve member 29 and the like therein. The body 140 is configured by a metal block body, which has a generally square tubular shape, and an axis direction of the metal block body extends in an up-down direction. The vapor-liquid separating space 141b is provided in the body 140. The vapor-liquid separating space 141b is configured to have a generally cylindrical shape, and an axis direction of the generally cylindrical shape extends in the up-down direction.

The refrigerant inlet port 141a, through which a refrigerant after flowing out of the high-stage-side expansion valve 13 is introduced to the vapor-liquid separating space 141b, is defined at an outer wall surface of the body 140.

A refrigerant introducing passage 141h, which introduces a refrigerant from the refrigerant inlet port 141a to the vapor-liquid separating space 141b, communicates with the vapor-liquid separating space 141b via a refrigerant introducing hole 141g.

As shown in the cross-sectional view of FIG. 7, the refrigerant introducing passage 141h of this embodiment extends in a tangential direction of a circle, which is a cross-sectional shape of an inner wall surface of the vapor-liquid separating space 141b, when being viewed in an axial direction of the vapor-liquid separating space 141b (i.e., in the up-down direction of this embodiment).

Therefore, the refrigerant introduced from the refrigerant inlet port 141a into the vapor-liquid separating space 141b turns and swirls along the inner wall surface of the vapor-liquid separating space 141b, which has the generally circle shape in cross section.

By an action of centrifugal force produced by such a swirl flow, the refrigerant flowing in the vapor-liquid separating space 141b is separated into a vapor-phase refrigerant and a liquid-phase refrigerant, and the liquid-phase refrigerant moves downward of the vapor-liquid separating space 141b by action of gravity. In other words, the vapor-liquid separating space 141b configures a centrifugal vapor-liquid separating part.

As shown in FIG. 6, a swirl space A1, a separating space A2, and a storing space A3 configure the vapor-liquid separating space 141b. In the swirl space A1, the refrigerant flowing out the refrigerant inlet port 141a flows in circle along the inner wall surface. The separating space A2 separates the refrigerant into the vapor-phase refrigerant and the liquid-phase refrigerant. The storing space A3 in which the liquid-phase refrigerant separated in the separating space A2 is stored.

The swirl space A1 is a space provided between the inner wall surface of the vapor-liquid separating space 141b and an outer wall surface of a gas-phase refrigerant outlet pipe 142c, which will be described after. A length of the swirl space A1 in the axial direction of the vapor-liquid separating space 141b is longer than a half of a whole length of the vapor-liquid separating space 141b in the axial direction.

The separating space A2 is positioned downward of the swirl space A1 and is a space provided between an end (i.e., a bottom end) of the separated vapor-phase refrigerant outlet pipe 142c in a longitudinal direction and the integration valve member 29. A length of the separating space A2 in the axial direction of the vapor-liquid separating space 141b is equal to an inside diameter of the separated vapor-phase refrigerant outlet pipe 142c.

The storing space A3 is positioned downward of the separating space A2 and is a space provided between the inner wall surface of the vapor-liquid separating space 141b and an outer wall surface of a tubular portion 143 which will be described later. A length of the storing space A3 in the axial direction of the vapor-liquid separating space 141b is the rest length of the whole length of the vapor-liquid separating space 141b excepting the length of the swirl space A1 and the length of the separating space A2.

As shown in a cross-sectional view of FIG. 6, the refrigerant introducing hole 141g of this embodiment is configured by an elongate hole extending in the axial direction of the vapor-liquid separating space 141b. In other words, a vertical dimension Dv of the refrigerant introducing hole 141g extending in the axial direction of the vapor-liquid separating space 141b is larger than a horizontal dimension Dh of the refrigerant introducing hole 141g extending in a direction perpendicular to the tangential direction of the vapor-liquid separating space 141b (Dv>Dh).

Therefore, when a refrigerant introduced to the vapor-liquid separating space 141b swirls in the vapor-liquid separating space 141b, a main flow of the refrigerant gyrates along a radial-outer wall of the vapor-liquid separating space 141b without spreading radial-inward of the vapor-liquid separating space 141b. Thus, centrifugal force can act effectively to the refrigerant flowing into the vapor-liquid separating space 141b, and a vapor-liquid separating efficiency in the integration valve 14 can be improved.

Furthermore, the refrigerant introducing hole 141g opens at a position where is far from one end (i.e., a lower end) of the separated vapor-phase refrigerant outlet pipe 142c in a longitudinal direction and is closer to the other end (i.e., an upper end) of the separated vapor-phase refrigerant outlet pipe 142c in the longitudinal direction.

A distance Lv from a lower end of the refrigerant introducing hole 141g to the one end (i.e., the lower end) of the separated vapor-phase refrigerant outlet pipe 142c is determined based on the vertical dimension Dv of the refrigerant introducing hole 141g. Specifically, the distance Lv from the lower end of the refrigerant introducing hole 141g to the one end (i.e., the lower end) of the separated vapor-phase refrigerant outlet pipe 142c is determined to be larger than a half of the vertical dimension Dv of the refrigerant introducing hole 141g as shown in a formula F1 below.

$$Lv \geq (1/2) \times Dv \tag{F1}$$

A location of the lower end of the refrigerant introducing hole 141g corresponds to an end portion at the one end side of the separated vapor-phase refrigerant outlet pipe 142c, which will be described later.

As described above, when the distance Lv from an end location of the refrigerant introducing hole 141g to the one end of the separated vapor-phase refrigerant outlet pipe 142c is set to satisfy the formula F1, an entrance length, in which the refrigerant swirls sufficiently in the vapor-liquid separating space 141b, can be kept. Therefore, a vapor-liquid separating efficiency in the integration valve 14 can be improved.

A distance Lh between a center line CI of the refrigerant introducing passage 141h and a tangent line TI of the vapor-liquid separating space 141b at a radial-outer wall surface, which is parallel with the center line CI is determined based on the horizontal dimension Dh of the refrigerant introducing hole 141g. Specifically, the distance Lh between the center line CI and the tangent line TI is determined to be longer than a half of the horizontal dimension Dh of the refrigerant introducing hole 141g and shorter than one and a half of the horizontal dimension Dh of the refrigerant introducing hole 141g, as shown with a formula F2.

$$(1/2) \times Dh \leq Lh \leq (3/2) \times Dh \tag{F2}$$

FIG. 7 is a cross-sectional view taken along a line VII-VII of FIG. 6 in a condition where the distance Lh between the center line CI and the tangent line TI is equal to a half of the horizontal dimension Dh of the refrigerant introducing hole 141g. FIG. 8 is a cross-sectional view taken along the line VII-VII of FIG. 6 in a condition where the distance Lh between the center line CI and the tangent line TI is equal to one and a half of the horizontal dimension Dh of the refrigerant introducing hole 141g.

Because the distance Lh between the center line CI and the tangent line TI is set to satisfy the formula F2, the refrigerant can receive great centrifugal force, when the refrigerant flowing into the vapor-liquid separating space 141b swirls along the radial-outer wall surface of the vapor-liquid separating space 141b. Therefore, a vapor-liquid separating efficiency in the integration valve 14 can be improved.

The separated vapor-phase refrigerant outlet pipe 142c, which guides the vapor-phase refrigerant separated in the vapor-liquid separating space 141b toward a vapor-phase refrigerant outlet port 142a, is provided at the body 140. The separated vapor-phase refrigerant outlet pipe 142c is formed in a cylindrical shape and is positioned to be coaxial with the vapor-liquid separating space 141b. Therefore, the refrigerant flowing into the vapor-liquid separating space 141b flows and swirls along the separated vapor-phase refrigerant outlet pipe 142c.

The separated vapor-phase refrigerant outlet pipe 142c extends so that a terminal part of the separated vapor-phase refrigerant outlet pipe 142c is positioned inside the vapor-liquid separating space 141b. The separated vapor-phase refrigerant outlet hole 142d is provided at the terminal part emitting the vapor-phase refrigerant separated in the vapor-liquid separating space 141b.

According to this embodiment, the vapor-phase refrigerant passage 142b is provided in the separated vapor-phase refrigerant outlet pipe 142c. A communication hole, through which an upper side of the separated vapor-phase refrigerant outlet pipe 142c communicates with outside the body 140, is provided at an upper side of the separated vapor-phase refrigerant outlet pipe 142c. An opening of the communication hole on an external side of the body 140 defines the vapor-phase refrigerant outlet port 142a. The communication hole extends to be perpendicular to the axis direction of the vapor-phase refrigerant outlet pipe 142c.

The vapor-liquid separating space 141b houses the separated vapor-phase refrigerant outlet hole 142d of the separated vapor-phase refrigerant outlet pipe 142c and the integration valve member 29 opening or closing a separated liquid-phase refrigerant outlet hole 141c, which is positioned at the tubular portion 143 located on a lower side of the body 140.

The tubular portion 143 is formed of a generally cylindrical resin part, which is located such that an axial direction of the resin part is coaxial with the vapor-liquid separating space 141b, and is fixed and fastened at a terminal part of the body 140. The tubular portion 143 is a portion configuring a liquid-phase refrigerant passage 141d and the fixed throttle 17. Therefore, the liquid-phase refrigerant passage 141d and the fixed throttle 17 are positioned downward of the separated vapor-phase refrigerant outlet hole 142d. A seal portion is positioned between an inner periphery side of the body 140 and an outer periphery side of the tubular portion 143 so that a refrigerant does not leak from a gap between the inner periphery side of the body 140 and the outer periphery side of the tubular portion 143.

The liquid-phase refrigerant passage 141d is defined on the inner periphery side of the tubular portion 143. An opening on an upper end side of the tubular portion 143 defines the separated liquid-phase refrigerant outlet hole 141c introducing a liquid-phase refrigerant separated at the vapor-liquid separating space 141b to a side of the liquid-phase refrigerant passage 141d. An opening on a lower end side of the tubular portion 143 defines a liquid-phase refrigerant outlet port 141e flowing out the liquid-phase refrigerant separated at the vapor-liquid separating space 141b outside the integration valve 14. The separated liquid-phase refrigerant outlet hole 141c is provided to be opposite to the separated vapor-phase refrigerant outlet hole 142d of the separated vapor-phase refrigerant outlet pipe 142c.

A protruding portion, which has an annular shape and protrudes toward a vapor-liquid separating space 141b side, is provided at the opening on the upper end side of the tubular portion 143. An upper end surface of the protruding portion of the tubular portion 143 is provided with a valve seat portion 143a, which contacts a liquid-phase-refrigerant side seal portion 29a of the integration valve member 29, when the integration valve member 29 closes the separated liquid-phase refrigerant outlet hole 141c (i.e., the liquid-phase refrigerant passage 141d).

Further, the fixed throttle 17 is provided on an outer periphery side of the protruding portion of the tubular portion 143 to decompress and discharge a liquid-phase refrigerant separated at the vapor-liquid separating space 141b toward a side of a liquid-phase refrigerant outlet port 141e when the integration valve member 29 closes the liquid-phase refrigerant passage 141d. More specifically, the fixed throttle 17 is extended to be parallel with a refrigerant passage provided inside the valve seat portion 143a.

If a refrigerant of which speed fluctuation is wide in the swirl space A1 of the separating space A2 directly flows into the fixed throttle 17, there may be a fear that a decompression characteristic of the fixed throttle 17 becomes unstable.

In the present embodiment, the fixed throttle 17 has is configured to open to the storing space A3 of the vapor-liquid separating space 141b. Therefore, a vapor-phase refrigerant is restricted from flowing into the fixed throttle 17, and the decompression characteristic of the fixed throttle 17 can be stabilized.

Specifically, a nozzle or an orifice of which opening degree is fixed can be used as the fixed throttle 17. In a fixed throttle such as the nozzle and the orifice, aperture passage area is drastically decreased or increased. Therefore, a flow amount of a refrigerant passing through the fixed throttle and a quality of a refrigerant on an upstream side of the fixed throttle can be self-controlled (i.e., balanced) while a pressure difference between an upstream side and a downstream side (i.e., a pressure difference between an inlet port and an outlet port).

Specifically, when the pressure difference between the upstream side and the downstream side is relatively large, the quality of the refrigerant on the upstream side of the fixed throttle 17 is balanced to be large while a required flow amount of a circulating refrigerant, which is a required flow amount circulating in a cycle, is decreased. On the other hand, when the pressure difference is relatively small, the quality of the refrigerant on the upstream side of the fixed throttle 17 is balanced to be small while the required flow amount of the circulating refrigerant is increased.

However, when the quality of the refrigerant on the upstream side of the fixed throttle 17 is large, and when an exterior heat exchanger 20 works as an evaporator, a coefficient of performance (COP) of the cycle is slipped while a heat absorb amount (i.e., a refrigeration capacity) of a refrigerant at the exterior heat exchanger 20 is decreased. According to this embodiment, even if the required flow amount of the circulating refrigerant is changed by variation of a load change in a heating operation mode (i.e., a first heating mode), the COP is restricted from slipping such that a quality X of the refrigerant on the upstream side of the fixed throttle 17 is smaller than or equal to 0.1.

In other words, the fixed throttle 17 of the present embodiment is adapted such that the quality of the refrigerant on the upstream side of the fixed throttle is self-controlled to be smaller than or equal to 0.1 even if the flow amount of the circulating refrigerant and the pressure difference between the inlet port and the outlet port of the fixed throttle changes in a range envisioned when a load change is caused in the heat pump cycle 10.

A temperature difference between a temperature of a refrigerant after passing through the fixed throttle 17 and a temperature before passing through the fixed throttle 17 is large (e.g., about 30° C.). Therefore, when the tubular portion 143 configuring the liquid-phase refrigerant passage 141d and the fixed throttle 17 is a metal block, a heat of a high-temperature refrigerant before passing through the fixed throttle 17 is heat-exchanged with a low-temperature refrigerant (i.e., a refrigerant in vapor-liquid mixing state) after passing through the fixed throttle 17 and is cooled via the body 140 and the tubular portion 143. That is, when the body 140 and the tubular portion 143 are made of a metal material having a relatively high heat conductivity, there is a possibility that the refrigerant before passing through the fixed throttle 17 is indirectly heat-exchanged with the refrigerant after passing through the fixed throttle 17 via the body 140 and the tubular portion 143.

Such a heat transferring causes (i) a decreasing of a heat-transferring amount of the exterior heat exchanger 20 positioned on a downstream side of the integration valve 14 in a flow direction of a refrigerant, and (ii) a decreasing of a heating capacity when the heat pump cycle 10 is operated to be a gas injection cycle.

In contrast, according to this embodiment, the tubular portion 143 is made of a resin material having a greater heat resistance than the body 140 made of a metal block. The decompressing characteristic of the fixed throttle 17 can be stable by restricting indirect heat transferring between the refrigerant before passing through the fixed throttle 17 and the refrigerant after passing through the fixed throttle 17 via the body 140 and the fixed throttle 17. Therefore, a decreasing of a heat-transferring amount of a heat exchanger positioned downstream of the integration valve 14 in the flow direction of the refrigerant can be restricted. Moreover, a temperature decreasing of a vapor-phase refrigerant flowing out via the vapor-phase refrigerant passage 142b can be restricted, by a liquid-phase refrigerant decompressed by operation of the integration valve member 29. Accordingly, when the heat pump cycle 10 is operated to be the gas injection cycle, the heating capacity is restricting from decreasing.

Further, according to this embodiment, the vapor-liquid separating space 141b, the liquid-phase refrigerant passage 141d, and the fixed throttle 17 are integrally-configured inside the body 140. Therefore, a heat-transferring amount of refrigerant passing through the liquid-phase refrigerant passage 141d from outside can be decreased as compared to a case where a refrigerant passage connecting the separated liquid-phase refrigerant outlet hole 141c of the vapor-liquid separating space 141b and the fixed throttle is separately provided by a pipe.

Figure 9:
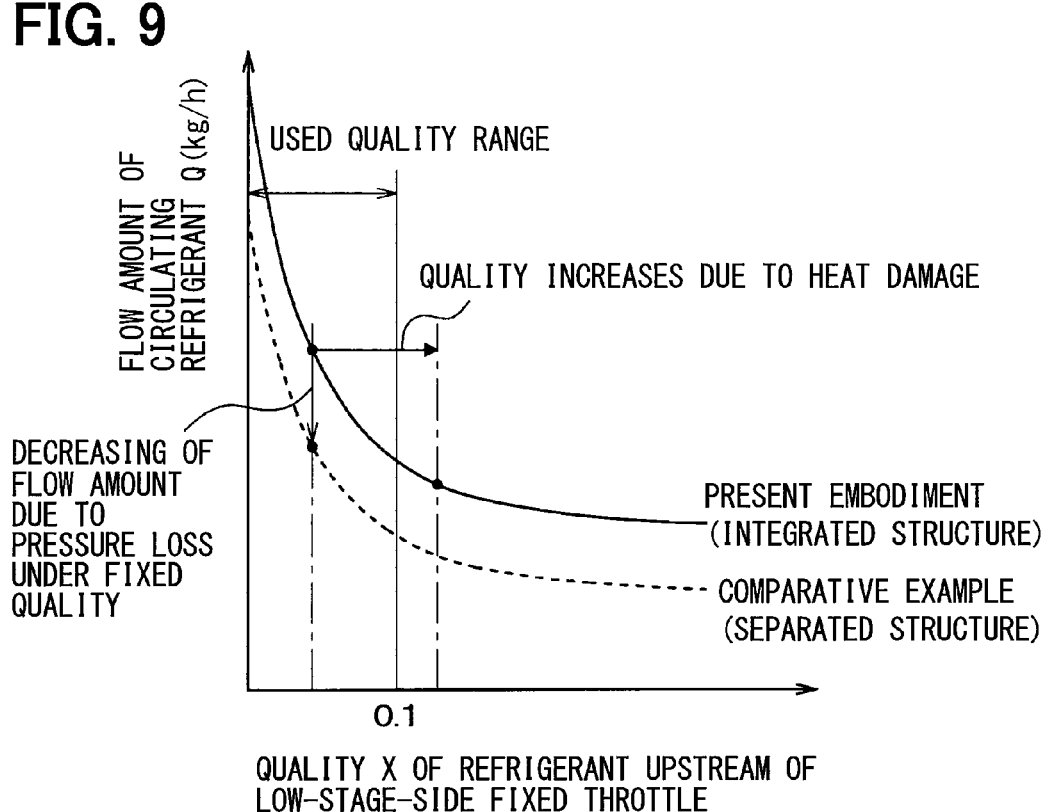
FIG. 9 is a graph showing how heat damage impacts a flow characteristic of a fixed throttle according to the first embodiment.

Therefore, a phenomenon, which will be referred to as a heat damage hereafter, that the refrigerant passing through the liquid-phase refrigerant passage 141d is boiled and vaporize by having heat from outside of the integration valve 14 can be reduced. This point will be described referring to FIG. 9. FIG. 9 is a flow characteristic chart (i.e., a throttle characteristic chart) showing an influence of the heat damage in a condition that the pressure difference between a refrigerant pressure on the upstream side of the fixed throttle 17 and a refrigerant pressure on the downstream side of the fixed throttle 17 is fixed.

As seen in FIG. 9, a flow amount Q of refrigerant passing through the fixed throttle 17 is decreased when a quality of the refrigerant upstream of the fixed throttle 17 is increased by the heat damage. Further, when a density of a refrigerant passing through the liquid-phase refrigerant passage 141d is decreased, the flow amount Q is decreased by increase of a pressure loss by the heat damage while a refrigerant passes through the liquid-phase refrigerant passage 141d.

According to this embodiment, the vapor-liquid separating space 141b, the liquid-phase refrigerant passage 141d, and the fixed throttle 17 are integrally configured in the body 140. Therefore, increase of the quality X and increase of the pressure loss caused by the heat damage are restricted, and the flow amount Q at the fixed throttle 17 can be effectively restricted from decreasing.

The integration valve member 29 is positioned between the separated vapor-phase refrigerant outlet hole 142d located in the separating space A2 and the separated liquid-phase refrigerant outlet hole 141c located in the storing space A3. The integration valve member 29 extends in a direction perpendicular to the axis direction of the vapor-liquid separating space 141b (i.e., a horizontal direction according to this embodiment) and is formed of a discoid shaped portion. The discoid shaped portion is larger than an inside diameter of the separated liquid-phase refrigerant outlet hole 141c.

According to this embodiment, an outside diameter Ds of the integration valve member 29 is determined in a range satisfying the relational expression F3 and the relational expression F4 shown below, in consideration of a vapor-liquid separating efficiency in the integration valve 14 and a pressure loss ΔP of the integration valve 14 due to the integration valve member 29.

$$Dp \leq Ds \leq (Dx+Dr)/2 \qquad \text{F3}$$

$$\pi \times (Dr/2)^2 - \pi \times (Dx/2)^2 = \pi \times (Do/2)^2 \qquad \text{F4}$$

Dp is an outside diameter of the separated vapor-phase refrigerant outlet pipe 142c, Dr is an inside diameter of the vapor-liquid separating space 141b, and Do is an inside diameter of the separated liquid-phase refrigerant outlet hole 141c. When being viewed in an axial direction, Dx is an outside diameter (i.e., an equivalent diameter) of the integration valve member 29, in a condition that an area of a ring shaped part provided between the vapor-liquid separating space 141b and the integration valve member 29, is equal to a cross-sectional area of the separated liquid-phase refrigerant outlet hole 141c in the radial direction. The area of the ring shaped part corresponds to the left-hand side of the above relational expression F4, and the cross-sectional area of the separated liquid-phase refrigerant outlet hole 141c in the radial direction corresponds to the right-hand side of the relational expression F4. The relational expression F4 is simplified to $Dx=(Dr^2-Do^2)^{1/2}$.

Figure 10:
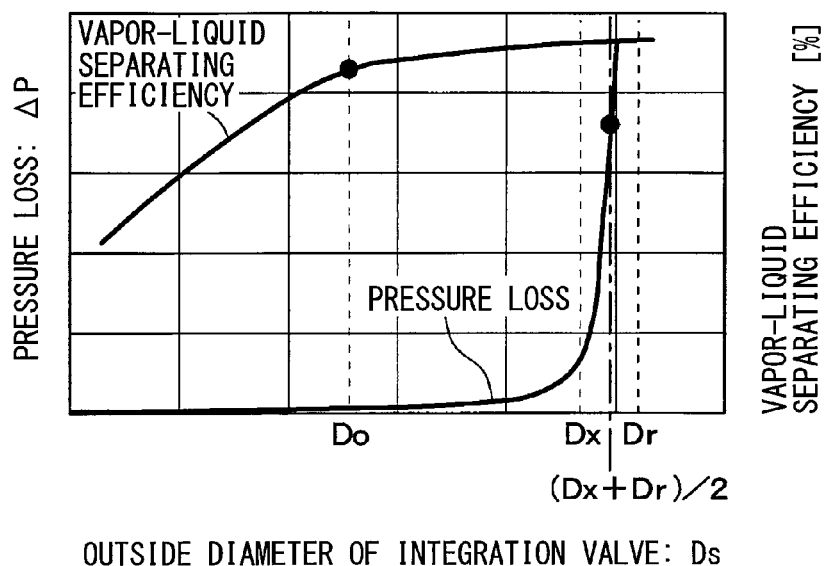
FIG. 10 is an explanatory diagram showing a vapor-liquid separating efficiency and a pressure loss in a case where an outside diameter of an integration valve member is changed.

The above relationship will be described referring to FIG. 10. FIG. 10 is an explanatory diagram showing (i) a variation of the pressure loss ΔP in the integration valve 14 integration valve member and (ii) a variation of the vapor-liquid separating efficiency (%) of the vapor-liquid separating space 141b when the outer diameter Ds of the integration valve member 29 of the integration valve 14 shown in FIG. 6 is changed. The pressure loss ΔP is a measured value in an operation mode in which the separated liquid-phase refrigerant outlet hole 141c is open, and the separated vapor-phase refrigerant outlet hole 142d is closed in the integration valve member 29. The vapor-liquid separating efficiency is a measured value in an operation mode in which the separated liquid-phase refrigerant outlet hole 141c is closed, and the separated vapor-phase refrigerant outlet hole 142d is open.

As shown in FIG. 10, as the outside diameter Ds of the integration valve member 29 decreases, the vapor-liquid separating efficiency tends to be decreased. Moreover, when the outside diameter Ds of the integration valve member 29 is smaller than the outside diameter Dp of the separated vapor-phase refrigerant outlet pipe 142c, the vapor-liquid separating efficiency is decreased drastically. Conversely, when the outside diameter Ds of the integration valve member 29 is larger than or equal to the outside diameter Dp of the separated vapor-phase refrigerant outlet pipe 142c, the vapor-liquid separating efficiency is securely maintained to be high.

Therefore, according to the present embodiment, a minimum value of the outside diameter Ds of the integration valve member 29 is determined to be the same value as the outside diameter Dp of the separated vapor-phase refrigerant outlet pipe 142c (Dp≤Ds), from the point of view of the vapor-liquid separating efficiency inside of the integration valve 14.

When the outside diameter Ds of the integration valve member 29 is overlarge, the integration valve member 29 itself may become a passage resistance between an outer periphery side of the integration valve member 29 and the vapor-liquid separating space 141b in an operation mode (cooling operation mode or the like) in which the integration valve member 29 opens 141c and closes 142d. In this case, a pressure loss of refrigerant passing between the outer periphery side of the integration valve member 29 and the vapor-liquid separating space 141b may be increased.

Specifically, as shown in FIG. 10, the pressure loss ΔP is drastically increased when the outside diameter Ds of the integration valve member 29 is larger than the outside diameter Dx. Such increase of the pressure loss ΔP inside of the integration valve 14 may decrease a system performance.

Therefore, inventors of the present disclosure determine a maximum value of the outside diameter Ds of the integration valve member 29 at a middle value (=(Dx+Dr)/2) between the outside diameter Dx and the inside diameter Dr of the vapor-liquid separating space 141b, by considering an acceptable range of a system-performance decrease due to the pressure loss ΔP.

In a point of view of reducing the pressure loss ΔP in the integration valve 14, an upper limit of the outside diameter Ds of the integration valve member 29 is set to Dx preferably. In this case, an area of a ring-shaped part provided between the vapor-liquid separating space 141b and the integration valve member 29 is larger than a sectional area of the separated liquid-phase refrigerant outlet hole 141c in the radial direction. Therefore, the pressure loss ΔP in the integration valve 14 due to disposing the integration valve member 29 is restricted from increasing.

According to the present embodiment, (i) the liquid-phase-refrigerant side seal portion 29a, which is made of resin and has an annular shape, is positioned on a bottom surface side of the integration valve member 29, and (ii) a vapor-phase-refrigerant side seal portion 29b, which is made of resin and has an annular shape, is positioned on a top surface side of the integration valve member 29. As shown in FIG. 5, the vapor-phase-refrigerant side seal portion 29b abuts the separated vapor-phase refrigerant outlet hole 142d of the separated vapor-phase refrigerant outlet pipe 142c when the integration valve member 29 closes the vapor-phase refrigerant passage 142b.

Furthermore, the integration valve member 29 connects with a movable part of the stepping motor 28, and the stepping motor 28 is fixed to an upper side of the body 140 using a fastening part such as a fastening bolt or the like, via a shaft 29c adapting as a drive mechanism. The shaft 29c is disposed coaxially with the separated vapor-phase refrigerant outlet pipe 142c and passes through inside of the separated vapor-phase refrigerant outlet pipe 142c (i.e., the vapor-phase refrigerant passage 142b).

The stepping motor 28 is a drive device moving the integration valve member 29 in an axial direction (i.e., a top-bottom direction) of the shaft 29c, and a control pulse output from the air-conditioning controller 40 controls an operation of the stepping motor 28.

The stepping motor 28 is constructed to move the integration valve member 29 to a position closing the separated vapor-phase refrigerant outlet hole 142d (i.e., the vapor-phase refrigerant passage 142b) when the separated liquid-phase refrigerant outlet hole 141c (i.e., the liquid-phase refrigerant passage 141d) is open to discharge refrigerant toward a side of the liquid-phase refrigerant outlet hole 141e. Specifically, the stepping motor 28 moves the integration valve member 29 upward so that the separated vapor-phase refrigerant outlet hole 142d is closed, and that the separated liquid-phase refrigerant outlet hole 141c is open.

In a condition that the integration valve member 29 is positioned to open the separated liquid-phase refrigerant outlet hole 141c, a pressure loss caused due to refrigerant passing through the liquid-phase refrigerant passage 141d is extremely smaller than a pressure loss caused due to refrigerant passing through the fixed throttle 17. Therefore, in the condition that the integration valve member 29 is positioned to open the separated liquid-phase refrigerant outlet hole 141c, refrigerant flows out through the liquid-phase refrigerant outlet hole 141e to outside of the integration valve 14 generally without being decompressed via a refrigerant passage provided on an inner periphery side of the valve seat portion 143a.

The stepping motor 28 is also constructed to move the integration valve member 29 to a position decompressing vapor-phase refrigerant flowing toward a side of the liquid-phase refrigerant outlet hole 141e, when the separated vapor-phase refrigerant outlet hole 142d (i.e., the vapor-phase refrigerant passage 142b) is open to discharge vapor-phase refrigerant to a side of the vapor-phase refrigerant outlet hole 142a. Specifically, the stepping motor 28 moves the integration valve member 29 to a position closing the separated liquid-phase refrigerant outlet hole 141c (i.e., the liquid-phase refrigerant passage 141d) so as to open the separated vapor-phase refrigerant outlet hole 142d.

When the separated liquid-phase refrigerant outlet hole 141c is closed by the integration valve member 29 in such a way, liquid-phase refrigerant separated in the vapor-liquid separating space 141b flows out through the liquid-phase refrigerant outlet port 141e to outside of the integration valve 14 after being decompressed by the fixed throttle 17.

A check valve (not shown) is positioned at a refrigerant pipe of the integration valve 14, which extends from the vapor-phase refrigerant outlet port 142a to the intermediate-pressure port 11b of the compressor 11, and allows refrigerant to flow only from the integration valve 14 to the intermediate-pressure port 11b of the compressor 11. Accordingly, refrigerant is restricted from flowing out of a side of the compressor 11 to a side of the integration valve 14. The check valve may be configured integrally with the integration valve 14 or the compressor 11.

As shown in FIGS. 1-3, a refrigerant inlet side of the exterior heat exchanger 20 is connected to the liquid-phase refrigerant outlet port 141e of the integration valve 14. The exterior heat exchanger 20 is positioned in a bonnet, and heat is transferred between refrigerant flowing inside the exterior heat exchanger 20 and outside air blown by a blower 21. The exterior heat exchanger 20 works as an evaporator evaporating low-pressure refrigerant so that the low-pressure refrigerant exerts a heat-absorbing action at least in the heating operation (e.g., the first heating mode and the second heating mode) and works as a radiator so that high-pressure refrigerant radiates heat in the cooling operation mode or the like.

A refrigerant inlet side of a cooling expansion valve 22, which is as a second decompression device, connects with an outlet side of a refrigerant outlet side of the exterior heat exchanger 20. The cooling expansion valve 22 decompresses refrigerant which flows out through the exterior heat exchanger 20 into the interior evaporator 23 in the cooling operation mode or the like. A basic structure of the cooling expansion valve 22 is the same as a high-stage-side expansion valve 13, and an operation of the cooling expansion valve 22 is controlled by control signals output from the air-conditioning controller 40.

A refrigerant inlet side of the interior evaporator 23 connects with an outlet side of the cooling expansion valve 22. The interior evaporator 23 is disposed in the air conditioning case 31 of the interior air conditioning unit 30 at an upstream side of the interior condenser 12 in a blowing air direction. The interior evaporator 23 is a heat exchanger adapting as an evaporator (e.g., a second using-side heat exchanger) and cools blowing air by evaporating refrigerant passing through the interior evaporator 23 so that the refrigerant exerts a heat-absorbing action in the cooling operation mode, the dehumidification and heating operation mode, or the like.

An inlet side of an accumulator 24 connects with an outlet side of the interior evaporator 23. The accumulator 24 is a low-pressure-side vapor-liquid separator separating refrigerant drawn in the accumulator 24 into vapor-phase refrigerant and liquid-phase refrigerant and storing excess refrigerant. In addition, the suction port 11a of the compressor 11 connects with a vapor-phase refrigerant outlet port of the accumulator 24. Therefore, the interior evaporator 23 connects with the accumulator 24 so as to cause refrigerant to flow toward a side of the suction port 11a of the compressor 11.

Further, the outlet side of the exterior heat exchanger 20 connects with an expansion-valve bypass passage 25, and the expansion-valve bypass passage 25 guides refrigerant flowing form the exterior heat exchanger 20 to the inlet side of the accumulator 24 such that refrigerant bypasses the cooling expansion valve 22 and the interior evaporator 23. A bypass-passage switching valve 27 is located at the expansion-valve bypass passage 25.

The bypass-passage switching valve 27 is a solenoid valve switching the expansion-valve bypass passage 25 to be open or closed, and the opening and closing operation of the bypass-passage switching valve 27 is controlled by a control voltage output from the air conditioning controller 40. A pressure loss due to refrigerant passing the bypass-passage switching valve 27 is extremely smaller than a pressure loss due to refrigerant passing the cooling expansion valve 22.

Therefore, when the bypass-passage switching valve 27 is open, refrigerant flowing out of the exterior heat exchanger 20 flows into the accumulator 24 via the expansion-valve bypass passage 25. In this case, the cooling expansion valve 22 may be fully open.

When the bypass-passage switching valve 27 is closed, refrigerant flows into the interior evaporator 23 via the cooling expansion valve 22. Accordingly, the bypass-passage switching valve 27 can switch a refrigerant cycle of the heat pump cycle 10. Therefore, the bypass-passage switching valve 27 of the present embodiment constructs a refrigerant cycle switching device together with the integration valve 14.

The interior air conditioning unit 30 will be described. The interior air conditioning unit 30 is disposed inside an instrument board (i.e., a dash panel) located at forefront part of a passenger compartment and has the air conditioning case 31 therein. The air conditioning case 31 provides an outer shell of the interior air conditioning unit 30 and has an air passage, in which air blown toward the passenger compartment flows.

A blower 32, the interior condenser 12, the interior evaporator 23, or the like are disposed in the air passage.

An inside air/outside air switching device 33 switching intake air between inside air (i.e., air inside the passenger compartment) and outside air is positioned at a most upstream side in a flow direction of air in the air conditioning case 31. The inside air/outside air switching device 33 continuously regulates (i) an opening area of an inside air intake port introducing inside air into the air conditioning case 31 and (ii) an opening area of an outside air intake port introducing outside air into the air conditioning case 31 by using an inside air/outside air switching door so that an air volume ratio of inside air volume to outside air volume is continuously changed.

The blower 32, which blows air drawn via the inside air/outside air switching device 33 toward the passenger compartment, is positioned downstream of the inside air/outside air switching device 33 in the flow direction of air. The blower 32 is an electric blower, in which a centrifugal multiblade blower (i.e., a sirocco fan) is operated by an electric motor, and a rotating speed (i.e., a blowing air volume) is controlled based on a control voltage output from the air conditioning controller 40.

The interior evaporator 23 and the interior condenser 12 are disposed on a downstream side of the blower 32 in the flow direction of air in this order of the interior evaporator 23 and the interior condenser 12. In other words, the interior evaporator 23 is located at an upstream side of the interior condenser 12 in the flow direction of air.

In the air conditioning case 31, a bypass passage 35 guiding blowing air after passing the interior evaporator 23 to bypass the interior condenser 12 is disposed, and an air mix door 34 is positioned on a downstream side of the interior evaporator 23 and on an upstream side of the interior condenser 12 in the flow direction of air.

The air mix door 34 of the present embodiment is a flow amount regulator regulating a flow amount (i.e., an air volume) of blowing air blown into the interior condenser 12 so that a ratio of an air volume of blowing air passing on a side of the interior condenser 12 to an air volume of blowing air passing through the bypass passage 35 is regulated after blowing air passes through the interior evaporator 23. The air mix door 34 functions as a regulator regulating a heat exchanging ability of the interior condenser 12.

A mixing space 36 is provided at a downstream side of the interior condenser 12 and the bypass passage 35 in the flow direction of air. In the mixing space 36, blowing air heated by exchanging heat with refrigerant at the interior condenser 12 is mixed with blowing air passing through the bypass passage 35 without being heated.

Openings are located most downstream of the air conditioning case 31 in the flow direction of air so that blowing air mixed in the mixing space 36 is blown to the passenger compartment that is a space to be cooled. Specifically, (i) a defroster opening 37a blowing conditioned air toward inside surface of a windshield of a vehicle, (ii) a face opening 37b blowing conditioned air toward an upper body of an occupant in the passenger compartment, and (iii) a foot opening 37c blowing conditioned air toward foot of an occupant in the passenger compartment are provided as the opening.

Therefore, the air mix door 34 regulates the ratio of an air volume of blowing air passing on a side of the interior condenser 12 to an air volume of blowing air passing through the bypass passage 35 such that temperature of air in the mixing space 36 is regulated. The air mix door 34 is operated by a servo motor (not shown), and an operation of the servo motor is controlled based on control signals output from the air conditioning controller 40.

Moreover, a defroster door 38a regulating an opening area of the defroster opening 37a, a face door 38b regulating an opening area of the face opening 37b, and a foot door 38c regulating an opening area of the foot door 38c are located upstream of the defroster opening 37a, the face opening 37b, and the foot opening 37c, respectively.

The defroster door 38a, the face door 38b, and the foot door 38c configure outlet mode switching parts for opening or closing the openings 37a-37c and are controlled by a servo motor (not shown), which is operated based on control signals output from the air conditioning controller 40, via a link mechanics or the like.

A face outlet, a foot outlet, and a defroster outlet disposed in the passenger compartment are connected to a downstream side of the defroster opening 37a, the face opening 37b, and the foot opening 37c, respectively, in the flow direction of air via a duct providing an air passage.

The outlet mode is, for example, (i) a face mode in which the face opening 37b is fully open to blow air toward an upper body of an occupant via the face outlet, (ii) a bi-level mode in which both of the face opening 37b and the foot opening 37c are open to blow air toward an upper body and foot of an occupant, and (iii) a foot mode in which the foot opening 37c is fully open and the defroster opening 37a is open in a small degree to mainly blow air from the foot outlet.

An electric control device of the present embodiment will be described. The air conditioning controller 40 is configured from a well-known microcomputer including CPU, ROM, RAM, or the like and a peripheral circuit, and performs a variety of arithmetic processing. The air conditioning controller 40 controls an operation of a variety of air conditioning devices (e.g., the compressor 11, the integration valve 14, the bypass passage switching valve 27, the blower 32, or the like) connected to an output side, based on an air conditioning control program memorized at ROM.

A sensor group 41 for a variety of air conditioning control is connected to an input side of the air conditioning controller 40. The sensor group 41 includes (i) an inside air sensor detecting a temperature in a passenger compartment, (ii) an outside air sensor detecting a temperature of outside air, (iii) a solar radiation sensor detecting a solar radiation amount entering in the passenger compartment, (iv) a temperature sensor for an evaporator detecting a temperature of blowing air blown from the interior evaporator 23 (i.e., a temperature of the evaporator), (v) a discharge-pressure sensor detecting a pressure of high-pressure refrigerant discharged from the compressor 11, (vi) a condenser temperature sensor detecting a temperature of refrigerant flowing out of the interior condenser 12, (vii) a suction-pressure sensor detecting a pressure of intake refrigerant drawn into the compressor 11, or the like.

Further, a control panel (not shown) is positioned around an instrument panel located at front area in a passenger compartment and is connected to an input side of the air conditioning controller 40. Control signals from various air conditioning operation switches disposed to the control panel are input to the air conditioning controller 40. The various air conditioning operation switches are, specifically, (i) an operation switch of the vehicle air conditioner 1, (ii) an inside temperature setting switch setting a temperature in the passenger compartment, (iii) a mode selecting switch selectively setting the cooling operation mode, (iv) a dehumidification and heating operation mode, or (v) the heating operation mode, or the like.

Control parts controlling operation of various air conditioning control devices connected to an output side of the air conditioning controller 40 are integrated to provide the air conditioning controller 40, and a configuration (a hardware and a software) controlling operation of each controlled object apparatus configures a control part controlling the operation of each controlled object apparatus.

For example, according to the present embodiment, a configuration (a hard ware and a software) controlling an operation of an electric motor of the compressor 11 configures a discharge ability controlling part, and a configuration (a hard ware and a software) controlling an operation of the integration valve 14 and the bypass passage switching valve 27 configures a refrigerant circuit controlling part. The discharge ability controlling part, the refrigerant circuit controlling part, or the like may be configured as a control device separately from the air conditioning controller 40.

An operation of the vehicle air conditioner 1 of the present embodiment having a structure described above will be described. As described above, the vehicle air conditioner 1 of the present embodiment selectively switches (i) the cooling operation mode cooling a passenger compartment, (ii) the heating operation mode heating the passenger compartment, and (iii) the dehumidification and heating mode dehumidifying and heating the passenger, compartment. An operation in each operation mode will be described.

(a) Cooling Operation Mode

The cooling operation mode is started when the cooling operation mode is set by the mode selecting switch in a condition that an operation switch of the control panel is on. In the cooling operation mode, the air conditioning controller 40 (i) operates the high-stage-side expansion valve 13 to be fully open, (ii) moves the integration valve member 29 so that the stepping motor 28 of the integration valve 14c closes the separated vapor-phase refrigerant outlet hole 142d, (iii) partly closes the cooling expansion valve 22 to exert a decompression action, and (iv) closes the bypass passage switching valve 27.

Accordingly, as shown in FIG. 5, the integration valve member 29 opens the separated liquid-phase refrigerant outlet hole 141c and closes the separated vapor-phase refrigerant outlet hole 142d in the integration valve 14, and the heat pump cycle 10 sets a refrigerant cycle in which refrigerant flows as shown by solid arrows in FIG. 1.

In the above configuration of the refrigerant cycle, the air conditioning controller 40 reads detection signals of the sensor group 41 for air conditioning control and operation signals of the operation panel. A target air temperature TAO, which is a target temperature of air to be blown into a passenger compartment, is calculated based on the detection signals and the operation signals. Furthermore, the air conditioning controller 40 determines operation states of various air conditioning control device connected to the output side of the air conditioning controller 40 based on the calculated target air temperature TAO and detection signals of the sensor group 41.

For example, a refrigerant discharge ability of the compressor 11, in other words, control signals fed into the electric motor of the compressor 11, is determined as following description. Based on the target air temperature TAO, a target evaporator air temperature TEO which is a temperature of air from an air outlet of the interior evaporator 23 is determined using a control map memorized at the air conditioning controller 40.

Control signals, which is output to the electric motor of the compressor 11, are determined based on a deviation between the target evaporator air temperature TEO and a temperature of air at the outlet of the interior evaporator 23, detected by the evaporator temperature sensor, so that a temperature of air blown from the interior evaporator 23 approaches to the target evaporator air temperature TEO, by using a feedback control.

Control signals output to the cooling expansion valve 22 is determined so that a supercooling degree of refrigerant flowing into the cooling expansion valve 22 approaches to a target supercooling degree. The target supercooling degree is predetermined such that the COP approaches generally to a maximum value. Control signals output to the servo motor of the air mix door 34 is determined so that the air mix door 34 closes the air passage of the interior condenser 12, and that all amount of blowing air after passing through the interior evaporator 23 passes through the bypass passage 35.

Control signals or the like determined in a manner described above are output to the various air conditioning control devices. Subsequently, a control routine, for example, (i) reading the detection signals and the operation signals, (ii) calculating the target air temperature TAO, (iii) determining each operation state of the various of air conditioning control devices, (iv) outputting the control voltage and the control signal, and the like, is repeated until a predetermined period when an operation of the vehicle air conditioner is required to be stopped via the control panel. A repeat of such a control routine is similarly performed in other operation modes.

Therefore, in the cooling operation mode of the heat pump cycle 10, high-pressure refrigerant discharged from the discharge port 11c of the compressor 11 (the point $a_{11}$ in FIG. 11) flows into the interior condenser 12. In the cooling operation mode, the air mix door 34 closes the air passage of the interior condenser 12, and refrigerant flowing into the interior condenser 12 flows out through the interior condenser 12 so as to radiate little heat to air blown to the passenger compartment.

The high-stage-side expansion valve 13 is fully open, and refrigerant flowing out of the interior condenser 12 passes through the high-stage-side expansion valve 13 without being decompressed. The refrigerant flows into the vapor-liquid separating space 141b via the refrigerant inlet port 141a of the integration valve 14.

Refrigerant flowing into the integration valve 14 is vapor-phase refrigerant having a superheating degree, and the vapor-phase refrigerant flows into the liquid-phase refrigerant passage 141d without being separated into vapor-phase and liquid-phase in the vapor-liquid separating space 141b of the integration valve 14. Further, because the integration valve member 29 is positioned to open the separated liquid-phase refrigerant outlet hole 141c, the vapor-phase refrigerant flowing into the liquid-phase refrigerant passage 141d flows out of the liquid-phase refrigerant outlet port 141e generally without being decompressed at the fixed throttle 17.

That is, refrigerant flowing into the integration valve 14 flows out through the liquid-phase refrigerant outlet port 141e generally without causing pressure loss. On this occasion, the integration valve member 29 closes the separated vapor-phase refrigerant outlet hole 142d, and refrigerant does not flow out from the separated vapor-phase refrigerant outlet port 142a.

Vapor-phase refrigerant flowing out of the liquid-phase refrigerant outlet port 141e of the integration valve 14 flows into the exterior heat exchanger 20. Refrigerant flowing into the exterior heat exchanger 20 radiates heat by exchanging heat with outside air blown by the blower 21 (from the point $a_{11}$ to the point $b_{11}$ in FIG. 11). Since the bypass passage switching valve 27 is in a closed state, refrigerant flowing out of the exterior heat exchanger 20 flows into the cooling expansion valve 22 being slightly open and is decompressed and expanded isoenthalpially to be low-pressure refrigerant (the point $b_{11}$ to the point $c_{11}$ in FIG. 11).

Figure 11:
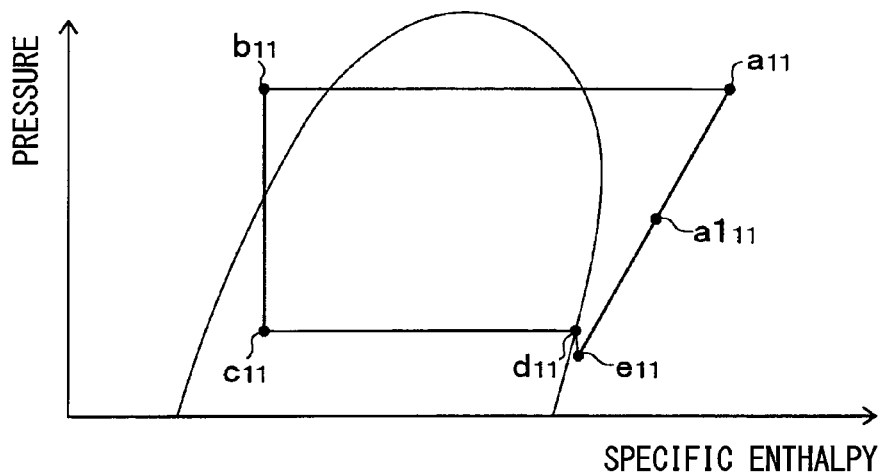
FIG. 11 is a Mollier diagram showing a refrigerant state in the cooling operation mode of the heat pump cycle according to the first embodiment.

Low-pressure refrigerant decompressed at the cooling expansion valve 22 flows into the interior evaporator 23, absorbs heat from air blown toward the passenger compartment, which is blown by the blower 32, and evaporates (the point $c_{11}$ to the point $d_{11}$ in FIG. 11). Accordingly, air blown toward the passenger compartment is cooled.

Refrigerant flowing out of the interior evaporator 23 is separated into vapor-phase refrigerant and liquid-phase refrigerant in the accumulator 24. separated vapor-phase refrigerant is drawn to the suction port 11a of the compressor 11 (the point $e_{11}$ in FIG. 11) and decompressed again in a following order of the low-stage-side compression mechanism and high-stage-side compression mechanism (in a following order of the point $e_{11}$, the point $a1_{11}$, the point $a_{11}$ in FIG. 11). On the other hand, separated liquid-phase refrigerant is stored in the accumulator 24 as an excess refrigerant which is unnecessary for a cycle to perform a required refrigeration capacity.

As shown in FIG. 11, the point $d_{11}$ is different from the point $e_{11}$ due to (i) a pressure loss caused to vapor-phase refrigerant passing through a refrigerant pipe extending from the accumulator 24 to the suction port 11a of the compressor 11 and (ii) a heat-absorbed amount, which is a heat amount of vapor-phase refrigerant absorbing heat from outside (i.e., outside air). Therefore, in an ideal cycle, the point $d_{11}$ is preferably coincide with the point $e_{11}$. This matter is similar to a Mollier diagram in a following description.

As described above, in the cooling operation mode, since the air passage of the interior compressor 12 is closed by the air mix door 34, air cooled at the interior evaporator 23 can be blown into the passenger compartment. Accordingly, a cooling operation of the passenger compartment can be exerted.

(b) Heating Operation Mode

The heating operation mode will be described below. As described above, in the heat pump cycle 10 of the present embodiment, the first heating mode or the second heating mode can be performed as the heating operation mode. The heating operation mode is started when the heating operation mode is selected by using the mode selecting switch in a condition that the operation switch of the vehicle air conditioner is on.

When the heating operation mode is operated, the air conditioning controller 40 reads detection signals from the sensor group 41 for air conditioning control and operation signals from the operation panel, and determines refrigerant discharging capacity (i.e., a rotation speed) of the compressor 11. In addition, the air conditioning controller 40 operates the first heating mode or the second heating mode based on the determined rotation speed.

(b-1) First Heating Mode

The first heating mode will be described below. When the first heating mode is operated, the air conditioning controller 40 controls (i) the high-stage-side expansion valve 13 to be slightly open, (ii) the integration valve member 29 to be moved to a position where the stepping motor 28 closes the separated liquid-phase refrigerant outlet hole 141c, (iii) the cooling expansion valve 22 to be fully closed, and (iv) the bypass passage switching valve 27 to be closed.

Accordingly, in the integration valve 14 shown in FIG. 4, the integration valve member 29 is positioned to open the separated vapor-phase refrigerant outlet hole 142d and to close the separated liquid-phase refrigerant outlet hole 141c, and the heat pump cycle 10 is set to a refrigerant flow passage in which refrigerant flows as shown in FIG. 2 with solid arrows.

In a configuration of the refrigerant flow passage (i.e., a configuration of a cycle), similar to a case of the cooling operation mode, the air conditioning controller 40 (i) reads detection signals detected by the sensor group 41 for air conditioning and operation signals from the operation panel and (ii) determines operation states of the various air control devices electrically connect to the output side of the air conditioning controller 40 based on the target air temperature TAO and the detection signals of the sensor group.

In the first heating mode, control signals fed into the high-stage-side expansion valve 13 is determined so that a pressure of refrigerant at the interior condenser 12 becomes a predetermined target high pressure, or that a supercooling degree of refrigerant flowing out of the interior condenser 12 becomes a predetermined target supercooling degree. Control signals fed into the servo motor of the air mix door 34 is determined so that the air mix door 34 is positioned to close the bypass passage 35 and that all volume of blowing air after passing through the interior evaporator 23 passes through the interior condenser 12.

Figure 12:
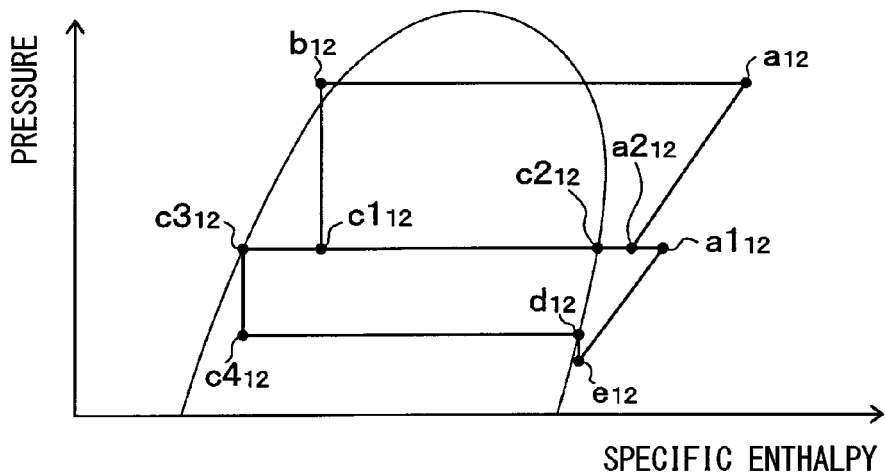
FIG. 12 is a Mollier diagram showing a refrigerant state in the first heating mode of the heat pump cycle according to the first embodiment.

Therefore, in the first heating mode of the heat pump cycle 10, as shown in a Mollier diagram in FIG. 12, high-pressure refrigerant discharged from the discharge port 11c of the compressor 11 (the point $a_{12}$ in FIG. 12) flows into the interior condenser 12. Refrigerant flowing into the interior condenser 12 radiates heat by exchanging heat with air blown toward the passenger compartment, which is blown from the blower 32 and passes through the interior evaporator 23 (the point $a_{12}$ to a point $b_{12}$ in FIG. 12). Accordingly, air blown toward the passenger compartment is heated.

Refrigerant flowing out of the interior condenser 12 is decompressed isoenthalpially at the high-stage-side expansion valve 13 being slightly opened to be intermediate-pressure refrigerant (the point $b_{12}$ to the point $c1_{12}$ in FIG. 12). The intermediate-pressure refrigerant decompressed at the high-stage-side expansion valve 13 flows into the vapor-liquid separating space 141b from the vapor-phase refrigerant outlet port 142a of the integration valve 14 and separated into vapor-phase refrigerant and liquid-phase refrigerant (from the point $c1_{12}$ to the point $c2_{12}$, and from the point $c1_{12}$ to the point $c3_{12}$ in FIG. 12).

Because the integration valve member 29 is positioned to close the separated liquid-phase refrigerant outlet hole 141c, the liquid-phase refrigerant separated in the vapor-liquid separating space 141b is decompressed and expanded isoenthalpially at the fixed throttle 17 to be low-pressure refrigerant (the point $c3_{12}$ to the point $c4_{12}$ in FIG. 12) and flows out through the liquid-phase refrigerant outlet port 141e.

The integration valve member 29 is positioned to open the separated vapor-phase refrigerant outlet hole 142d. Therefore, the vapor-phase refrigerant separated in the vapor-liquid separating space 141b flows out through the vapor-phase refrigerant outlet port 142a of the integration valve 14 into a side of the compressor 11 adjacent to the intermediate-pressure port 11b (the point $c2_{12}$ in FIG. 12).

Refrigerant flowing into the intermediate-pressure port 11b is mixed with refrigerant discharged from the low-pressure-side compression mechanism (the point $a1_{12}$ in FIG. 12), and the mixed refrigerant is drawn into the high-stage-side compression mechanism (the point $a2_{12}$ in FIG. 12). On the other hand, refrigerant flowing out of the liquid-phase refrigerant outlet port 141e of the integration valve 14 via the fixed throttle 17 flows into the exterior heat exchanger 20 and absorbs heat by exchange heat with outside air blown by the blower 21 (the point $c4_{12}$ to the point $d_{12}$ in FIG. 12).

Refrigerant flowing out of the exterior heat exchanger 20 flows into the accumulator 24 via the expansion-valve bypass passage 25 and is separated into the vapor-phase refrigerant and liquid-phase refrigerant because the bypass passage switching valve 27 is in an open state. The separated vapor-phase refrigerant drawn into the suction port 11a of the compressor 11 (the point $e_{12}$ in FIG. 12) and is decompressed again. On the other hand, the separated liquid-phase refrigerant is stored in the accumulator 24 as an excess refrigerant, which is unnecessary for the cycle to perform a required refrigerant capacity.

As described above, in the first heating mode, heat of refrigerant discharged from the compressor 11 is radiated to blowing air, which is blown into the passenger compartment, at the interior condenser 12, and the heated blowing air is blown into the passenger compartment. Accordingly, a heating operation of the passenger compartment can be exerted.

Further, in the first heating mode, a gas injection cycle (i.e., an economizer refrigerant cycle) can be configured. In the gas injection cycle, low-pressure refrigerant decompressed at the fixed throttle 17 is drawn from the suction port 11a of the compressor 11, and intermediate-pressure refrigerant decompressed at the high-stage-side expansion valve 13 flows into the intermediate-pressure port 11b and is mixed with refrigerant being compressed.

Thus, the mixed refrigerant of which temperature is low can be drawn in the high-stage-side compression mechanism. Therefore, a pressure difference between a pressure of drawn refrigerant and a pressure of discharged refrigerant is decreased in both the high-stage-side compression mechanism and the low-stage-side compression mechanism such that a compression efficiency of the high-stage-side compression mechanism is improved, and both the compression efficiency of the high-stage-side compression mechanism and a compression efficiency of the low-stage-side compression mechanism can be improved. Accordingly, COP in whole of the heat pump cycle 10 can be improved.

(b-2) Second Heating Mode

The second heating mode will be described below. When the second heating mode is operated, the air conditioning controller 40 controls (i) the high-stage-side expansion valve 13 to be slightly open, (ii) the integration valve member 29 to be positioned such that the stepping motor 28 of the integration valve 14 closes the separated vapor-phase refrigerant outlet hole 142d, (iii) the cooling expansion valve 22 to be fully closed, and (iv) the bypass passage switching valve 27 to be open. Accordingly, similar to the cooling operation mode, the integration valve 14 is in a state shown in FIG. 5, and the heat pump cycle 10 is set to a refrigerant flow passage in which refrigerant flows as shown by solid arrows in FIG. 3.

In a configuration of the refrigerant flow passage (i.e., a configuration of the cycle), similar to the cooling operation mode, the air conditioning controller 40 (i) reads a detection signals of the sensor group 41 for air conditioning and an operation signals from the operation panel and (ii) determines operation states of the various air conditioning control devices connected to the output side of the air conditioning controller 40 based on the target air temperature TAO and the detection signals of the sensor group.

In the second heating mode, control signals fed into the high-stage-side expansion valve 13 is determined so that a refrigerant pressure at the interior condenser 12 becomes a predetermined target high-pressure, or that a supercooling degree of refrigerant flowing out of the interior condenser 12 becomes a predetermined target supercooling degree. Control signals fed into the servo motor of the air mix door 34 is determined so that the air mix door 34 closes the bypass passage 35, and that all volume of blowing air after passing the interior evaporator 23 passes through the interior condenser 12.

Figure 13:
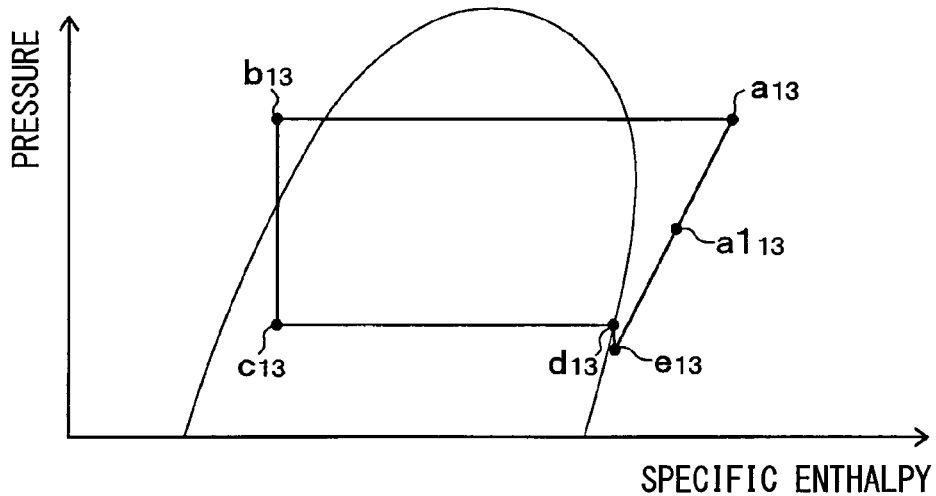
FIG. 13 is a Mollier diagram showing a refrigerant state in a second heating mode of the heat pump cycle according to the first embodiment.

Therefore, in the second heating mode of the heat pump cycle 10, as shown in a Mollier diagram of FIG. 13, high-pressure refrigerant discharged from the discharge port 11c of the compressor 11 (the point $a_{13}$ in FIG. 13) flows into the interior condenser 12, and similar to a case in the first heating mode, radiates heat to air blown toward the passenger compartment, by exchanging heat (from the point $a_{13}$ to the point $b_{13}$ in FIG. 13). Accordingly, air blown toward the passenger compartment is heated.

Refrigerant flowing out of the interior condenser 12 is decompressed and expanded isoenthalpially at the high-stage-side expansion valve 13, which is slightly open, to be low-pressure refrigerant (from the point $b_{13}$ to the point $c_{13}$ in FIG. 13) and flows into the vapor-liquid separating space 141b of the integration valve 14. Refrigerant flowing into the vapor-liquid separating space 141b flows out through the liquid-phase refrigerant outlet port 141e without flowing out of the vapor-phase refrigerant outlet port 142a and without being decompressed, similar to a case in the cooling operation mode.

Low-pressure refrigerant flowing out of the liquid-phase refrigerant outlet port 141e flows into the exterior heat exchanger 20 and absorbs heat from outside air blown from the blower 21 by exchange heat (from the point $c_{13}$ to the point $d_{13}$ in FIG. 13). Refrigerant flowing out of the exterior heat exchanger 20 flows into the accumulator 24 via the expansion valve bypass passage 25 because an open state of the bypass passage switching valve 27 is in an open state, and is being separated into vapor-phase refrigerant and liquid-phase refrigerant in the accumulator 24. The separated vapor-phase refrigerant is drawn into the suction port 11a of the compressor 11 (the point $e_{13}$ in FIG. 13).

As described above, in the second heating mode, heat of refrigerant discharged from the compressor 11 is radiated to air blown toward the passenger compartment at the interior condenser 12, and the heated blowing air can be blown into the passenger compartment. Accordingly, a heating operation of the passenger compartment can be exerted.

An effect of operating the second heating mode, in a condition that a heating load is relatively low relative to the first heating mode, for example, a condition that outside temperature is high, will be described. In the first heating mode, as described above, the gas injection cycle can be configured, and COP in the whole of the heat pump cycle 10 can be improved.

That is, theoretically, as long as a rotation speed of the compressor 11 is fixed, the first heating mode can perform with a higher heating capacity than that of the second heating mode. In other words, a rotation speed (i.e., a refrigerant discharging capacity) of the compressor 11, which is required to perform the same heating capacity, in the first heating mode is lower than a rotation speed of the compressor 11 in the second heating mode.

However, in a compression mechanism, there is a rotation speed for maximum efficiency at which a compression efficiency is maximum (i.e., a compression efficiency reaches a peak). When a rotation speed is lower than the rotation speed for maximum efficiency, the compression efficiency is greatly reduced. Therefore, when the compressor 11 is operated with a rotation speed which is lower than the rotation speed for maximum efficiency in a condition that a heating load is relatively low, COP may rather be reduced in the first heating mode.

According to the present embodiment, the rotation speed for maximum efficiency is determined as a standard rotation speed. When the rotation speed of the compressor 11 is lower than the standard rotation speed in the first heating mode, the first heating mode is switched to the second heating mode. When the rotation speed of the compressor 11 exceeds a sum rotation speed of the target rotation speed and a predetermined rotation speed in the second heating mode, the second heating mode is switched to the first heating mode.

Accordingly, one of the first heating mode and the second heating mode can be set to perform higher COP. Therefore, when the rotation speed of the compressor 11 is lower than the standard rotation speed in the first heating mode, COP in the whole of the heat pump cycle 10 can be improved by switching the first heating mode to the second heating mode.

(c) Dehumidification and Heating Operation Mode

The dehumidification and heating operation mode will be described. The dehumidification and heating operation mode is operated when a setting temperature set by a passenger-compartment temperature setting switch is higher than outside temperature in the cooling operation mode.

When the dehumidification and heating operation mode is set, the air conditioning controller 40 controls (i) the high-stage-side expansion valve 13 to be fully open or slightly open, (ii) the integration valve member 29 to be moved so that the stepping motor 28 of the integration valve 14 is operated to close the separated vapor-phase refrigerant outlet hole 142d, (iii) the cooling expansion valve 22 to be fully open or slightly open, and (iv) the bypass passage switching valve 27 to be closed. Accordingly, the heat pump cycle 10 is switched to a refrigerant flow passage in which refrigerant flows as shown with solid arrows in FIG. 1 as the same as the cooling operation mode.

In a configuration of the refrigerant flow passage (i.e., a configuration of the cycle), the air conditioning controller 40 (i) reads detection signals of the sensor group 41 for air conditioning and operation signals from the operation panel and (ii) determines operation states of the various air conditioning control devices connected to the output side of the air conditioning controller 40 based on the target air temperature TAO and the detection signals of the sensor group.

For example, control signals fed into the servo motor of the air mix door 34 is determined so that the air mix door 34 closes the bypass passage 35, and that all volume of blowing air after passing through the interior evaporator 23 passes through the interior condenser 12. Further, in the dehumidification and heating mode of the present embodiment, an opening degree of the high-stage-side expansion valve 13 and an opening degree of the cooling expansion valve 22 are changed depend on a temperature difference between the setting temperature and outside temperature. Specifically, in association with increasing the target air temperature TAO, four stages of the dehumidification and heating mode, from a first to fourth dehumidification and heating modes, are operated.

(c-1) First Dehumidification and Heating Mode

In the first dehumidification and heating mode, the high-stage-side expansion valve 13 is fully closed, and the cooling expansion valve 22 is slightly open. In the first dehumidification and heating mode, although a configuration of the cycle (i.e., a configuration of the refrigerant flow passage) is the same as the cycle of the cooling operation mode, the air mix door 34 is adjusted so that the air passage of the interior condenser 12 is fully open. Accordingly, a state of refrigerant circulating in the cycle is varied as shown in a Mollier diagram in FIG. 14.

Figure 14:
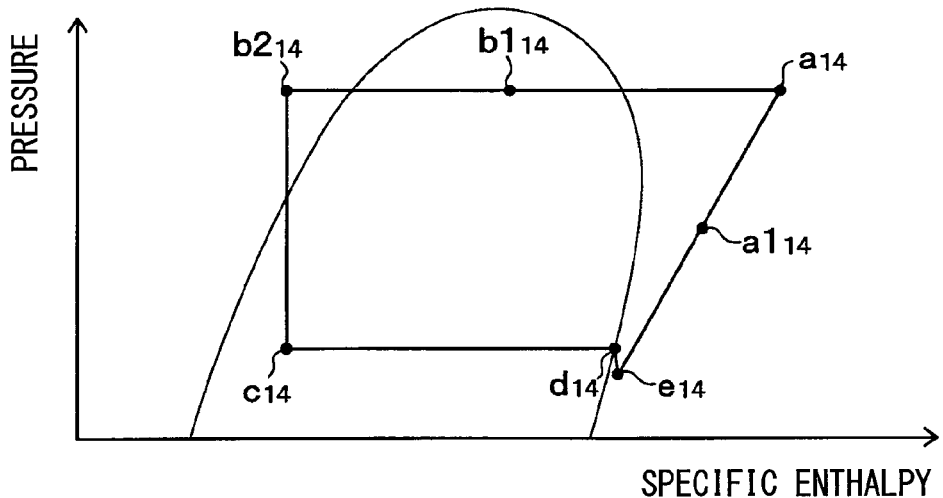
FIG. 14 is a Mollier diagram showing a first dehumidification and heating mode of the heat pump cycle according to the first embodiment.

That is, as shown in FIG. 14, high-pressure refrigerant discharged from the discharge port 11c of the compressor 11 (the point $a_{14}$ in FIG. 14) flows into the interior condenser 12 and radiates heat by exchanging heat with air blown toward the passenger compartment and having been cooled and dehumidified at the interior evaporator 23 (from the point $a_{14}$ to the point $b1_{14}$ in FIG. 14). Accordingly, air blown toward the passenger compartment is heated at the interior condenser 12.

As the same as the cooling operation mode, refrigerant flowing out of the interior condenser 12 flows into the exterior heat exchanger 20 via the high-stage-side expansion valve 13 and the integration valve 14, in this order. High-pressure refrigerant flowing into the exterior heat exchanger 20 further radiates heat by exchanging heat with outside air blown from the blower 21 (from the point $b1_{14}$ to the point $b2_{14}$ in FIG. 14). A following operation is the same as the cooling operation mode.

As described above, in the first dehumidification and heating mode, air blown toward the passenger compartment, which is cooled and dehumidified at the interior evaporator 23, can be heated at the interior condenser 12 and blown into the passenger compartment. Therefore, a dehumidification and heating operation of the passenger compartment can be exerted.

(c-2) Second Dehumidification and Heating Mode

When the target air temperature TAO exceeds a first standard temperature, which is predetermined, in the first dehumidification and heating mode, the second dehumidification and heating mode is switched for the first dehumidification and heating mode. In the second dehumidification and heating mode, the high-stage-side expansion valve 13 is slightly open, and the cooling expansion valve 22 in a throttle state in which an opening degree of the cooling expansion valve 22 is larger than an opening degree of the cooling expansion valve 22 in the first dehumidification and heating mode. Therefore, in the second dehumidification and heating mode, a state of refrigerant circulating the cycle is changed as shown in a Mollier diagram in FIG. 15.

Figure 15:
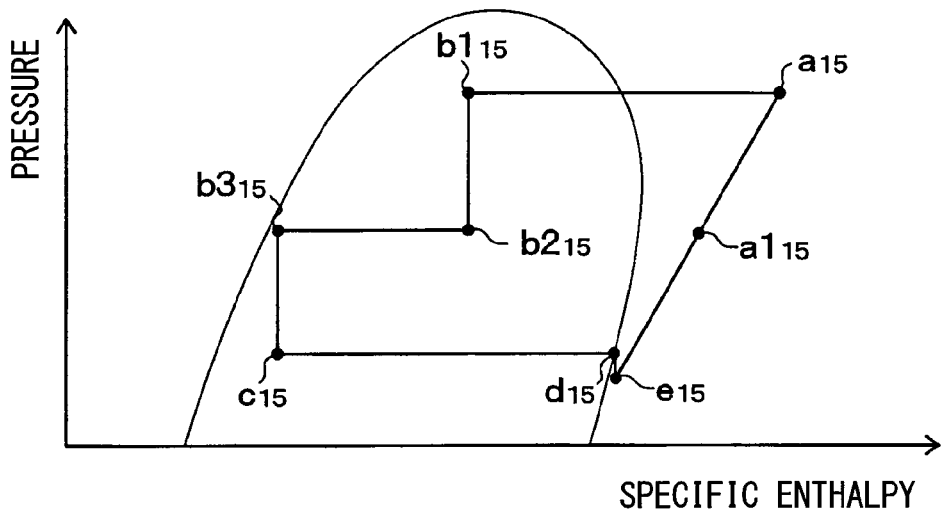
FIG. 15 is a Mollier diagram showing a second dehumidification and heating mode of the heat pump cycle according to the first embodiment.

That is, as shown in FIG. 15, high-pressure refrigerant discharged from the discharge port 11c of the compressor 11 (a point $a_{15}$ in FIG. 15) flows into the interior condenser 12 and radiates heat by exchanging heat with air blown toward the passenger compartment, which is cooled and dehumidified at the interior evaporator 23, similar to the first dehumidification and heating mode (from the point $a_{15}$ to a point $b1_{15}$ in FIG. 15). Therefore, air blown toward the passenger compartment is heated at the interior condenser 12.

Refrigerant flowing out of the interior condenser 12 is decompressed isoenthalpially to be intermediate-pressure refrigerant, of which temperature is higher than outside temperature, at the high-stage-side expansion valve 13 being slightly open (from the point $b1_{15}$ to the point $b2_{15}$ in FIG. 15). The intermediate-pressure refrigerant decompressed at the high-stage-side expansion valve 13 flows into the exterior heat exchanger 20 via the integration valve 14, similar to the cooling operation mode.

The intermediate-pressure refrigerant flowing into the exterior heat exchanger 20 radiates heat by exchanging heat with outside air blown from the blower 21 (from the point $b2_{15}$ to the point $b3_{15}$ in FIG. 15). A following operation is the same as the cooling operation mode.

As described above, in the second dehumidification and heating mode, air blown toward the passenger compartment, which has been cooled and dehumidified at the interior evaporator 23, can be heated at the interior condenser 12 and blown into the passenger compartment, similar to the first dehumidification and heating mode. Therefore, a dehumidification and heating operation of the passenger compartment can be exerted.

In the second dehumidification and heating mode, the high-stage-side expansion valve 13 is slightly open, and temperature of refrigerant flowing into the exterior heat exchanger 20 can be lower than that of the first dehumidification and heating mode. Therefore, a temperature difference between a temperature of refrigerant at the exterior heat exchanger 20 and outside temperature is decreased, and a radiated heat amount of refrigerant at the exterior heat exchanger 20 can be reduced.

Accordingly, in comparison to the first dehumidification and heating mode, a refrigerant pressure at the interior condenser 12 can be increased without increasing a flow amount of refrigerant circulating in the cycle, and a temperature of air blown from the interior condenser 12 can be increased greater than the first dehumidification and heating mode.

(c-3) Third Dehumidification and Heating Mode

The third dehumidification and heating mode is operated when the target air temperature TAO is higher than a second standard temperature, which is predetermined, in the second dehumidification and heating mode. In the third dehumidification and heating mode, an opening degree of the high-stage-side expansion valve 13 is smaller than that of the second dehumidification and heating mode, and an opening degree of the cooling expansion valve 22 is larger than that of the second dehumidification and heating mode. Therefore, a state of refrigerant circulating the cycle is changed as shown in a Mollier diagram in FIG. 16 in the third dehumidification and heating mode.

Figure 16:
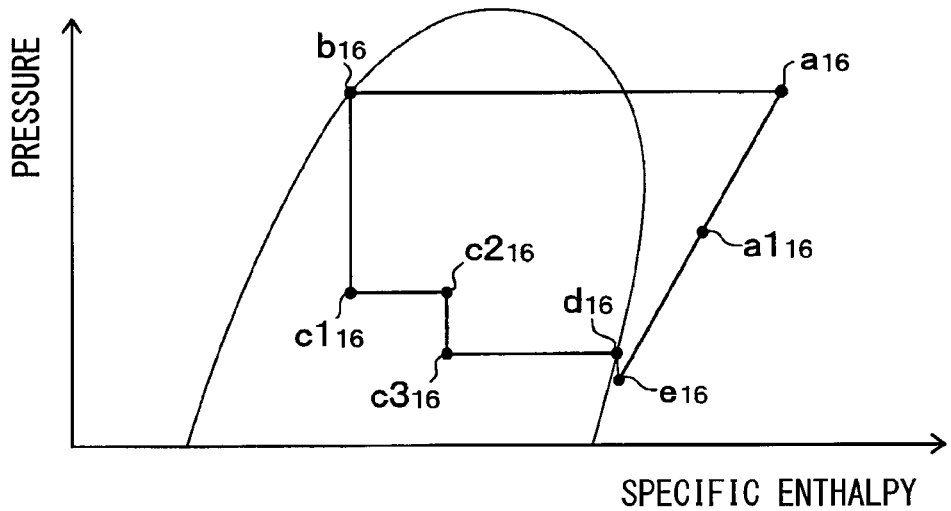
FIG. 16 is a Mollier diagram showing a third dehumidification and heating mode of the heat pump cycle according to the first embodiment.

That is, as shown in FIG. 16, high-pressure refrigerant discharged from the discharge port 11c of the compressor 11 (the point $a_{16}$ in FIG. 16) flows into the interior condenser 12 and radiates heat by exchanging heat with air blown toward the passenger compartment, which is cooled and dehumidified at the interior evaporator 23, (from the point $a_{16}$ to the point $b_{16}$ in FIG. 16), similar to the first and the second dehumidification and heating modes. Therefore, air blown toward the passenger compartment is heated at the interior condenser 12.

Refrigerant flowing out of the interior condenser 12 is decompressed isoenthalpially to be intermediate-pressure refrigerant, of which temperature is lower than outside temperature, at the high-stage-side expansion valve 13 being slightly open (from the point $b_{16}$ to the point $c1_{16}$ in FIG. 16). The intermediate-pressure refrigerant decompressed at the high-stage-side expansion valve 13 flows into the exterior heat exchanger 20 via the integration valve 14, similar to the cooling operation mode.

The intermediate-pressure refrigerant flowing into the exterior heat exchanger 20 absorbs heat from outside air blown from the blower 21 by exchanging heat (from the point $c1_{16}$ to the point $c2_{16}$ in FIG. 16). Further, refrigerant flowing out of the exterior heat exchanger 20 is decompressed isoenthalpially at the cooling expansion valve 22 (from the point $c2_{16}$ to the point $c3_{16}$ in FIG. 16) and flows into the interior evaporator 23. A following operation is the same as the cooling operation mode.

As described above, in the third dehumidification and heating mode, air blown toward the passenger compartment, which is cooled and dehumidified at the interior evaporator 23, can be heated at the interior condenser 12 and blown into the passenger compartment, similar to the first and the second dehumidification and heating mode. Therefore, a dehumidification and heating operation of the passenger compartment can be exerted.

In the third dehumidification and heating mode, an opening degree of the high-stage-side expansion valve 13 is decreased such that the exterior heat exchanger 20 works as an evaporator. Therefore, in comparison to the second dehumidification and heating mode, an absorbed heat amount of refrigerant absorbing heat at the exterior heat exchanger 20 can be increased.

Accordingly, in comparison to the second dehumidification and heating mode, (i) a density of refrigerant drawn into the compressor 11 can be increased, (ii) a refrigerant pressure at the interior condenser 12 can be increased without increasing a rotation speed of the compressor 11, and (iii) temperature of air blown from the interior condenser 12 can be increased greater than the second dehumidification and heating mode.

(c-4) Fourth Dehumidification and Heating Mode

When the target air temperature TAO exceeds a third standard temperature, which is predetermined, in the third dehumidification and heating mode, the fourth dehumidification and heating mode is operated. In the fourth dehumidification and heating mode, an opening degree of the high-stage-side expansion valve 13 is smaller than that of the third dehumidification and heating mode, and the cooling expansion valve 22 is in a full-open state. Therefore, in the fourth dehumidification and heating mode, a state of refrigerant circulating in the cycle is changed as shown in a Mollier diagram in FIG. 17.

Figure 17:
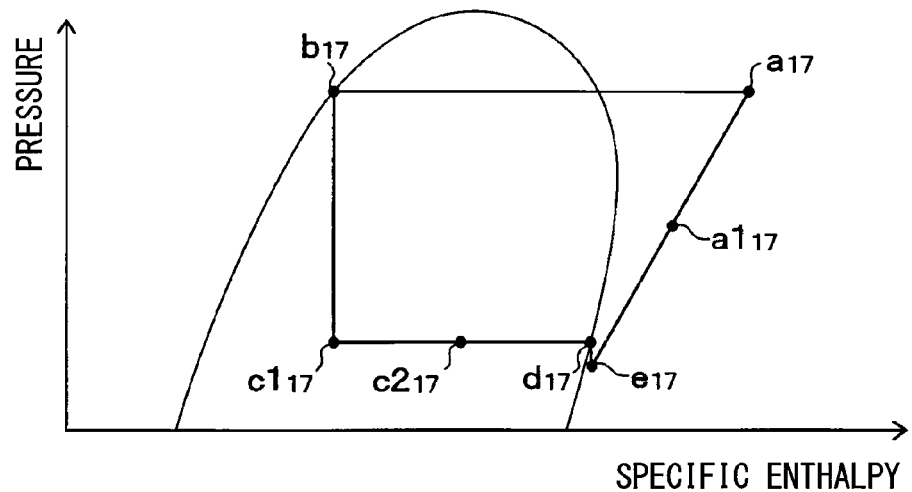
FIG. 17 is a Mollier diagram showing a fourth dehumidification and heating mode of the heat pump cycle according to the first embodiment.

That is, as shown in FIG. 17, high-pressure refrigerant discharged from the discharge port 11c of the compressor 11 (the point $a_{17}$ in FIG. 17) flows into the interior condenser 12 and radiates heat by exchanging heat with air blown toward the passenger compartment, which is cooled and dehumidified at the interior evaporator 23, (from the point $a_{17}$ the point $b_{17}$ in FIG. 17), similar to the first and the second dehumidification and heating mode. Therefore, blown air for the passenger compartment is heated at the interior condenser 12.

Refrigerant flowing out of the interior condenser 12 is decompressed isoenthalpially to be low-pressure refrigerant, of which temperature is lower than outside air, at the high-stage-side expansion valve 13 being slightly open (from the point $b_{17}$ to the point $c1_{17}$ in FIG. 17). The low-pressure refrigerant decompressed at the high-stage-side expansion valve 13 flows into the exterior heat exchanger 20 via the integration valve 14, similar to the cooling operation mode.

The low-pressure refrigerant flowing into the exterior heat exchanger 20 absorbs heat from outside air blown from the blower 21 by exchanging heat (from the point $c1_{17}$ to the point $c2_{17}$ in FIG. 17). Further, the cooling expansion valve 22 is in a full-open state, and refrigerant flowing out of the exterior heat exchanger 20 flows into the interior evaporator 23 without being decompressed. A following operation is the same as the cooling operation mode.

As described above, in the fourth dehumidification and heating mode, air blown toward the passenger compartment, which is cooled and dehumidified at the interior evaporator 23, can be heated at the interior condenser 12 and blown into the passenger compartment, as the same as the first, the second, and the third dehumidification and heating modes. Therefore, a dehumidification and heating of the passenger compartment can be exerted.

In the fourth dehumidification and heating mode, as the same as the third dehumidification and heating mode, the exterior heat exchanger 20 works as an evaporator, and an opening degree of the high-stage-side expansion valve 13 is smaller than that of the third dehumidification and heating mode. Accordingly, evaporating temperature of refrigerant at the exterior heat exchanger 20 can be decreased. Therefore, a temperature difference between a temperature of refrigerant at the exterior heat exchanger 20 and outside temperature is bigger than that of the third dehumidification and heating mode, and an absorbed heat amount absorbed by refrigerant at the interior condenser 12 can be increased.

Accordingly, in comparison to the third dehumidification and heating mode, (i) a density of refrigerant drawn into the compressor 11 can be increased, (ii) a refrigerant pressure at the interior condenser 12 can be increased without increasing of a rotation speed of the compressor 11, and (iii) a temperature of air blown from the interior condenser 12 can be higher than that of the third dehumidification and heating mode.

According to the vehicle air conditioner 1 of the present embodiment, as described above, a refrigerant flow passage of the heat pump cycle 10 is switched so that various configurations of cycles are implemented to exert appropriate cooling, heating, and dehumidification and heating of the passenger compartment.

Further, the vehicle air conditioner 1 of the present embodiment usable for an electric vehicle cannot use waste heat for heating a passenger compartment in a vehicle mounting an internal combustion engine (i.e., an engine). Therefore, the heat pump cycle 10 of the present embodiment is extremely effective for a case operated with a high COP regardless of a heating load in the hating operation mode.

According to the present embodiment, the integration valve 14 is used, and in the integration valve, parts of necessary components, which are necessary for the heat pump cycle 10 to be used as a gas injection cycle, are configured integrally. Therefore, a configuration of the heat pump cycle configuring the gas injection cycle can be simple. Accordingly, a mountability of the heat pump cycle in a target object can be improved.

According to the present embodiment, the single integration valve 14 performs (i) separation of intermediate-pressure refrigerant into vapor-phase and liquid-phase, (ii) opening or closing of the liquid-phase refrigerant passage 141d and the vapor-phase refrigerant passage 142b, and (iii) decompression of liquid-phase refrigerant.

Further, according to the integration valve 14 of the present embodiment, when the integration valve member 29 opens one of the vapor-phase refrigerant passage 142b and the liquid-phase refrigerant passage 141d, another one thereof can be closed. The integration valve member 29 can selectively close or open the vapor-phase refrigerant passage 142b and the liquid-phase refrigerant passage 141d. Furthermore, by just displacing the integration valve member 29 using the stepping motor 28, a refrigerant circuit in the cycle can be switched to a refrigerant circuit working as a gas injection cycle.

Accordingly, the liquid-phase refrigerant passage 141d and the vapor-phase refrigerant passage 142b can be selectively open or closed by a single valve body without disposing a valve body to each of the liquid-phase refrigerant passage 141d and the vapor-phase refrigerant passage 142b. Therefore, an inner structure of the integration valve 14 can be simplified, and a configuration of the heat pump cycle working as the gas injection cycle can be simplified.

Figure 18:
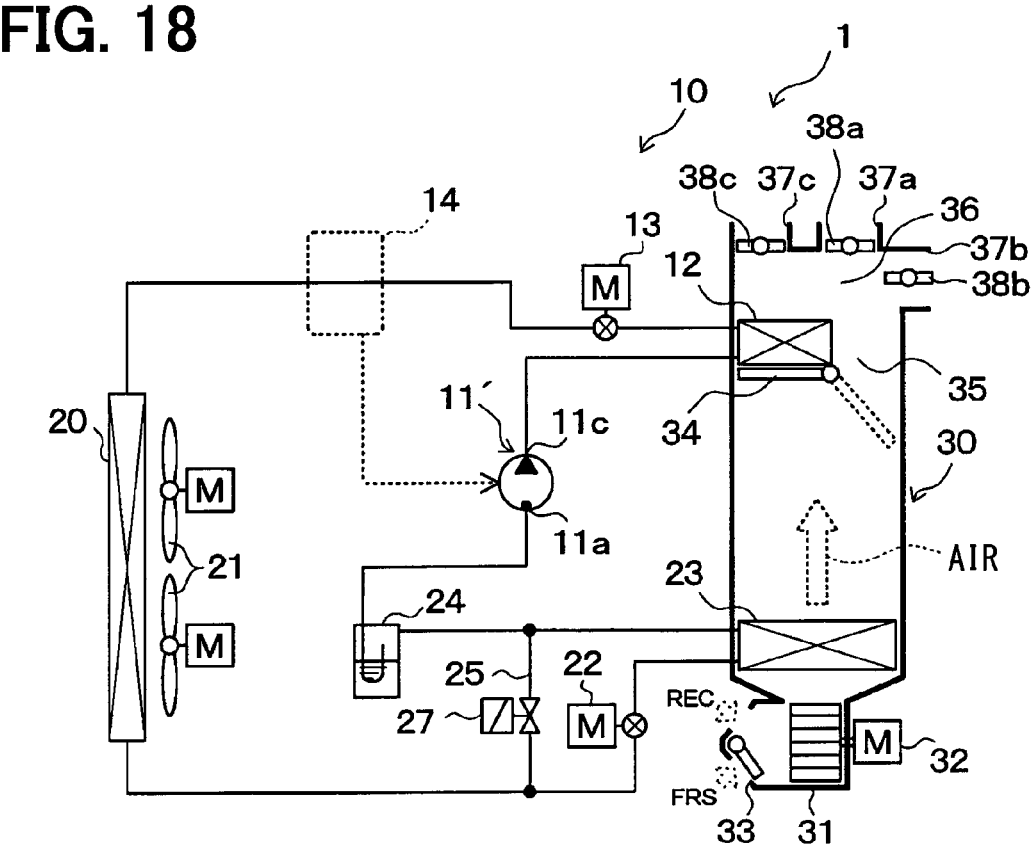
FIG. 18 is an overall schematic diagram illustrating an existing heat pump cycle.

Thus, with respect to a well-known switchable-type heat pump cycle in which refrigerant flow passages are switched, shown in FIG. 18, a heat pump cycle working at least as a gas injection cycle can be configured easily by (i) changing a compressor 11' shown in FIG. 18 to a two-stage-compression-type compressor, (ii) disposing the integration valve 14 of the present embodiment at a part surrounding with a dashed line, and (iii) connecting the vapor-phase refrigerant outlet port 142a of the integration valve 14 and the intermediate-pressure port 11b with each other.

More specifically, when the integration valve member 29 opens the liquid-phase refrigerant passage 141d, a cycle configuration is set such that at least one of the interior condenser 12 and the exterior heat exchanger 20 works as a radiator at which refrigerant radiates heat, and the interior evaporator 23 works as an evaporator at which refrigerant is evaporated.

On the other hand, when the integration valve member 29 closes the liquid-phase refrigerant passage 141d, a heat pump cycle can be easily switched to a gas injection cycle in which the interior condenser 12 works as a radiator at which refrigerant radiates heat, and the interior evaporator 23 works as an evaporator at which refrigerant is evaporated.

The heat pump cycle 10 in FIG. 18 is an example of a well-known heat pump cycle, in which (i) the interior condenser 12 and the exterior heat exchanger 20 work as radiators, and the interior evaporator 23 works as an evaporator when the bypass passage switching valve 27 is in a closed state, or (ii) a configuration in which the interior condenser 12 works as a radiator, and the exterior heat exchanger 20 work as an evaporator when the bypass passage switching valve 27 is in an open state.

In FIG. 18, parts that correspond to or equal to the components described in the present embodiment are assigned with the same reference numbers. This term is similar to other drawings, as well. Further, in FIG. 18, illustrations of the air conditioning controller 40 and a power wiring, a signal wiring, or the like electrically connecting the air conditioning controller 40 and various components are omitted, for illustrating clarification.

According to the integration valve 14 of the present embodiment, the vapor-liquid separating space 141b configures a centrifugal vapor-liquid separating part. Accordingly, in comparison to a configuration in which a vapor-liquid separating performance is exerted using an effect such as gravity, surface tension, or the like, the integration valve 14 exerts a high vapor-liquid separating performance. In this case, a space for the vapor-liquid separating space 141b can be saved, and a whole size of the integration valve can be downsized. Alternatively, a vapor-liquid separating can be performed in the integration valve 14 by using an effect such as gravity, surface tension, or the like, depending on a required vapor-liquid separating performance.

Moreover, the liquid-phase refrigerant passage 141d and the fixed throttle 17 are positioned downward of the separated vapor-phase refrigerant outlet hole 142d, and the vapor-phase refrigerant passage 142b is positioned upward of the separated vapor-phase refrigerant outlet hole 142d. Therefore, liquid-phase refrigerant separated in the vapor-liquid separating space 141b by using gravity is guided securely to a side of the liquid phase refrigerant passage 141d and a side of the fixed throttle 17, and separated vapor-phase refrigerant is guided securely to a side of the vapor-phase refrigerant passage 142b.

In addition, according to the integration valve 14 of the present embodiment, the refrigerant introducing hole 141g is an oblong hole. The oblong hole extends in an axial direction of the vapor-liquid separating space 141b and is open at the position far from the one end of the separated vapor-phase refrigerant outlet pipe 142c in the longitudinal direction and is closer to the other end of the separated vapor-phase refrigerant outlet pipe 142c in the longitudinal direction.

Accordingly, a diffusion of refrigerant in a radial-inward direction of the vapor-liquid separating space 141b is restricted while an approach zone for refrigerant in the vapor-liquid separating space 141b is secured, and refrigerant can flow along the radial-outer wall surface of the vapor-liquid separating space 141b. Therefore, centrifugal force effectively acts to refrigerant flowing into the vapor-liquid separating space 141b, and a vapor-liquid separating efficiency in the integration valve 14 can be improved. Thus, a space for the vapor-liquid separating space 141b can be saved, and the whole size of the integration valve 14 can be downsized. Accordingly, whole size of the heat pump cycle 10 can be downsized, and mountability of the heat pump cycle in a target object can be improved.

According to the present embodiment, the integration valve member 29 is positioned between the separated vapor-phase refrigerant outlet hole 142d located in the separating space A2 and the separated liquid-phase refrigerant outlet hole 141c located in the storing space A3, and is made of a discoid-shaped member having an inside diameter which is larger than an inside diameter of the separated liquid-phase refrigerant outlet hole 141c.

Therefore, the integration valve member 29 restricts liquid-phase refrigerant from diffusing from a side of the separated liquid-phase refrigerant outlet hole 141c to a side of the separated vapor-phase refrigerant outlet hole 142d. Accordingly, a vapor-liquid separating efficiency in the integration valve 14 can be improved. Thus, a space for the vapor-liquid separating space 141b can be saved, and whole size of the integration valve can be downsized. Accordingly, whole size of the heat pump cycle 10 can be downsized, and mountability of the heat pump cycle in a target object can be improved.

Moreover, according to the integration valve 14 of the present embodiment, the outside diameter Ds of the integration valve member 29 is determined in consideration of a vapor-liquid separating efficiency in the integration valve 14 and the pressure loss $\Delta P$ in side the integration valve 14 due to the integration valve member 29. Thus, the vapor-liquid separating efficiency inside the integration valve 14 can be improved while a pressure loss due to the integration valve member 29 can be restricted from being caused.

Furthermore, the body 140 of the integration valve of the present embodiment has the tubular portion 143 therein, and the liquid-phase refrigerant passage 141d and the separated liquid-phase refrigerant outlet hole 141c are provided. The tubular portion 143 is configured to have a higher heat resistance than surrounding parts.

Accordingly, indirect heat-transferring between liquid-phase refrigerant decompressed due to displacement of the integration valve member 29 and refrigerant in the vapor-liquid separating space 141b is restricted. Therefore, a decompression characteristics is restricted from changing due to displacement of the integration valve member 29.

According to the present embodiment, the shaft 29c connected with the movable part of the stepping motor 28 included in the integration valve member 29 is disposed to pass through inside of the separated vapor-phase refrigerant outlet pipe 142c. Therefore, a space for arranging the shaft 29c inside the body 140 is not necessary to be provided separately, and whole size of the integration valve 14 can be downsized.

Second Embodiment

As shown in cross-sectional views of FIGS. 19 and 20, the fixed throttle 17 is not used in the present embodiment, but an integration valve 14 is configured as follows. That is, when the integration valve member 29 opens the separated vapor-phase refrigerant outlet hole 142d, the stepping motor 28 operates the integration valve member 29 to slightly open the separated liquid-phase refrigerant outlet hole 141c so that liquid-phase refrigerant separated in the vapor-liquid separating space 141b is decompressed.

Figure 19:
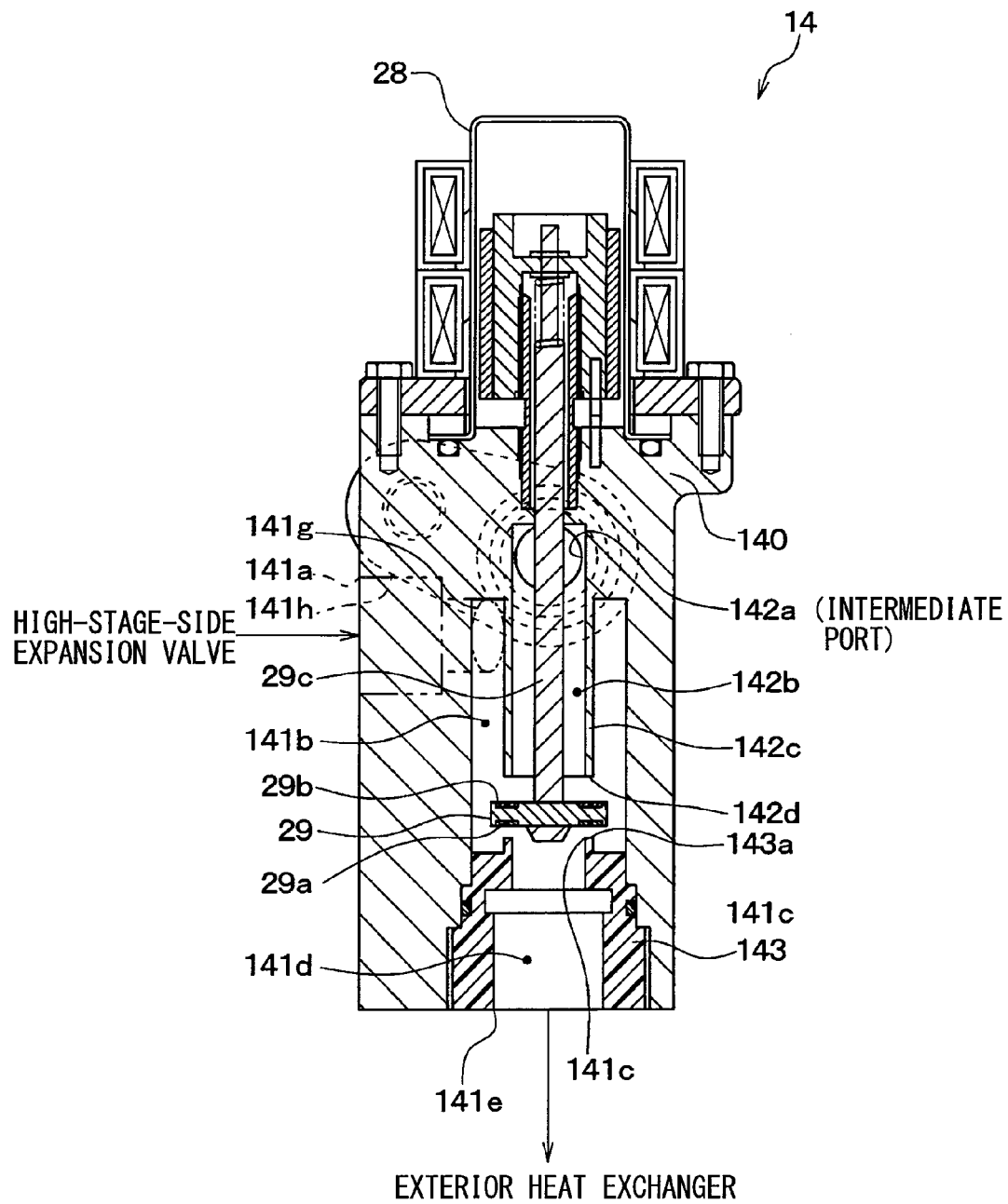
FIG. 19 is a cross-sectional view of an integration valve taken along the line extending in the top-bottom direction at a time when the separated vapor-phase refrigerant outlet hole is open, according to a second embodiment.
Figure 20:
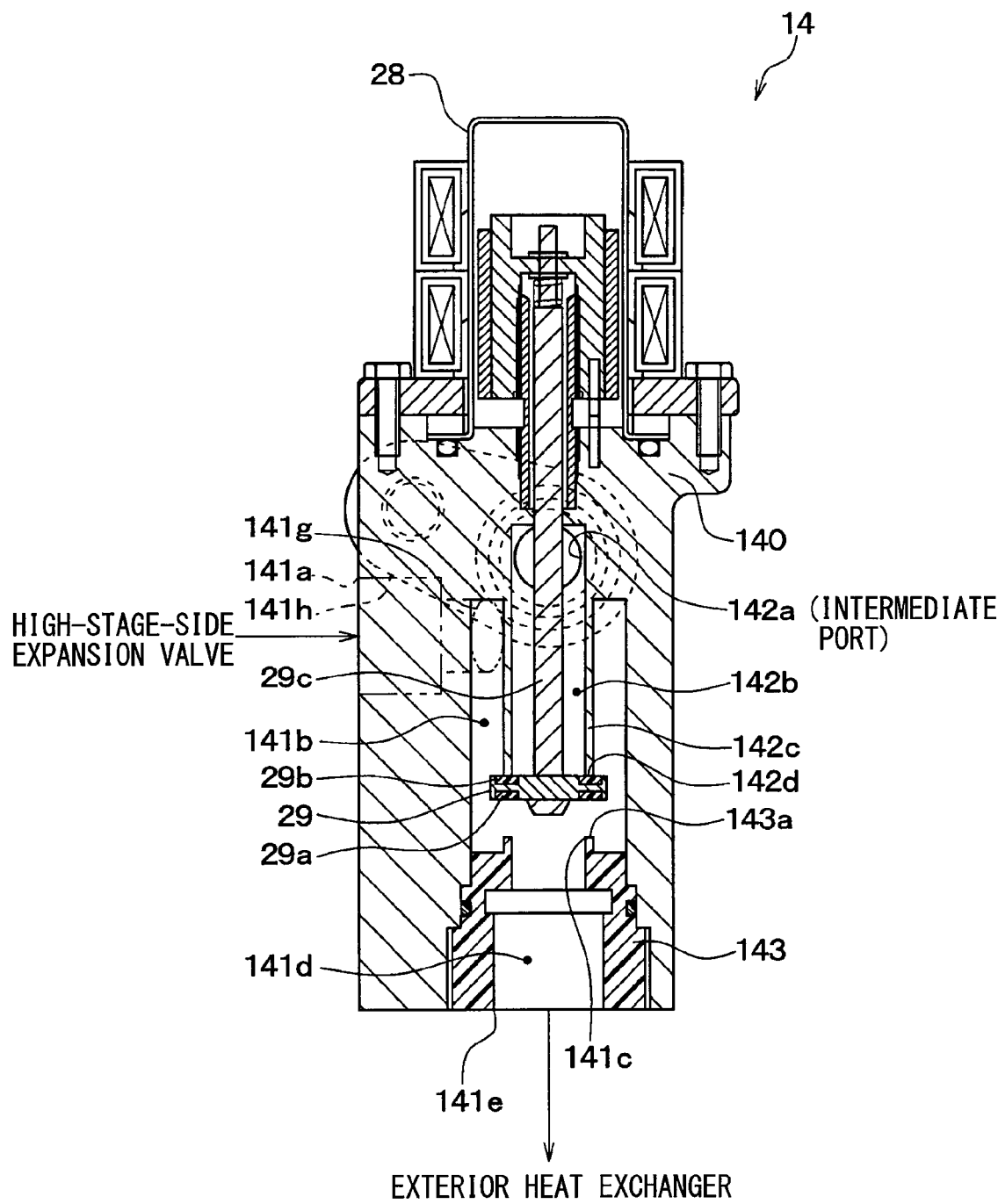
FIG. 20 is a cross-sectional view of the integration valve taken along the line extending in the top-bottom direction at a time when the separated vapor-phase refrigerant outlet hole is closed, according to the second embodiment.

Specifically, according to the present embodiment, when the integration valve member 29 opens the separated vapor-phase refrigerant outlet hole 142d, the stepping motor 28 operates the integration valve member 29 so that a clearance is provided between the integration valve member 29 and the separated liquid-phase refrigerant outlet hole 141c, as shown in FIG. 19. According to the present embodiment, the clearance provided between the integration valve member 29 and the separated liquid-phase refrigerant outlet hole 141c works as a throttle for decompressing liquid-phase refrigerant. Further, the stepping motor 28 operates the integration valve member 29 so that quality of refrigerant at upstream of the clearance, which is provided between the integration valve member 29 and the separated liquid-phase refrigerant outlet hole 141c, is smaller than or equal to 0.1 when the integration valve member 29 opens the separated vapor-phase refrigerant outlet hole 142d.

According to the present embodiment, the stepping motor 28 operates the integration valve member 29 to (i) slightly open the separated liquid-phase refrigerant outlet hole 141c in the first heating mode described in the first embodiment and (ii) close the separated vapor-phase refrigerant outlet hole 142d in the cooling operation mode, the dehumidification and heating operation mode, and the second heating mode described in the first embodiment.

Other configurations and operations of the vehicle air conditioner 1 is the same as the first embodiment. Therefore, according to the vehicle air conditioner 1 of the present embodiment, refrigerant passages of the heat pump cycle 10 are switched as the same as the first embodiment so that appropriate cooling, heating, and dehumidification and heating in the passenger vehicle are implemented by implement of the various cycle configurations.

Further, a single valve body can open or close the liquid-phase refrigerant passage 141d and the vapor-phase refrigerant passage 142b, and it is unnecessary to dispose a valve body in each of the liquid-phase refrigerant passage 141d and the vapor-phase refrigerant passage 142b to switch those passages. Thus, inside configuration of the integration valve 14 can be simplified. Accordingly, a cycle configuration of the heat pump cycle working as a gas injection cycle can be simplified.

In addition, when the integration valve member 29 is moved and opens the vapor-phase refrigerant passage 142b, liquid-phase refrigerant is decompressed in the clearance provided between the integration valve member 29 and the liquid-phase refrigerant passage 141d. Therefore, the fixed throttle 17 described in the first embodiment is unnecessary and the integration valve 14 is made with a simpler configuration.

Moreover, when the integration valve member 29 is located to open the vapor-phase refrigerant passage 142b, the stepping motor 28 operates the integration valve member 29 to be displaced so that a pressure difference between in the vapor-phase refrigerant passage 142b and in the liquid-phase refrigerant passage 141d can be finely adjusted. For example, the stepping motor 28 operates the integration valve member 29 to be moved to decrease the clearance such that flow amount of liquid-phase refrigerant flowing into the liquid-phase refrigerant passage 141d can be reduced at the clearance provided between the integration valve member 29 and the liquid-phase refrigerant passage 141d.

Therefore, a control capacity of the heat pump cycle working as a gas injection cycle can be improved with the configuration of the present embodiment.

Third Embodiment

In the present embodiment, an example of changing an inside configuration of the integration valve 14 with respect to the first embodiment will be described. A description about a portion corresponding to or equal to a portion of the first embodiment is omitted or simplified.

In the first embodiment described above, the integration valve member 29 is simply configured by a discoid-shaped member. According to the present embodiment, a diameter of an outer periphery part of the integration valve member 29 at least on a side of the separated vapor-phase refrigerant outlet hole 142d continuously decreases from a side of the separated liquid-phase refrigerant outlet hole 141c to the side of the separated vapor-phase refrigerant outlet hole 142d.

Figure 21:
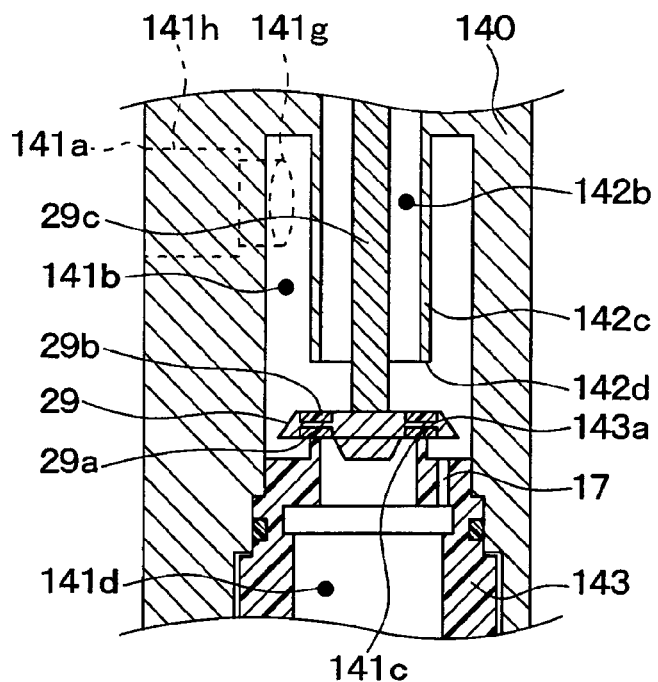
FIG. 21 is an enlarged cross-sectional view illustrating an enlarged substantial part of an integration valve according to a third embodiment.

Specifically, as shown in FIG. 21, the outer periphery part of the separated vapor-phase refrigerant outlet hole 142d of the integration valve member 29 has a tapered shape. Alternatively, an outer periphery part of the integration valve member 29 on a side of the separated vapor-phase refrigerant outlet hole 142d may have a curve shape.

Accordingly, when refrigerant flows around the integration valve member 29, the refrigerant flows smoothly from a side of the separated vapor-phase refrigerant outlet hole 142d to a side of the separated liquid-phase refrigerant outlet hole 141c, and the pressure loss $\Delta P$ caused by the integration valve member 29 can be reduced.

Figure 22:
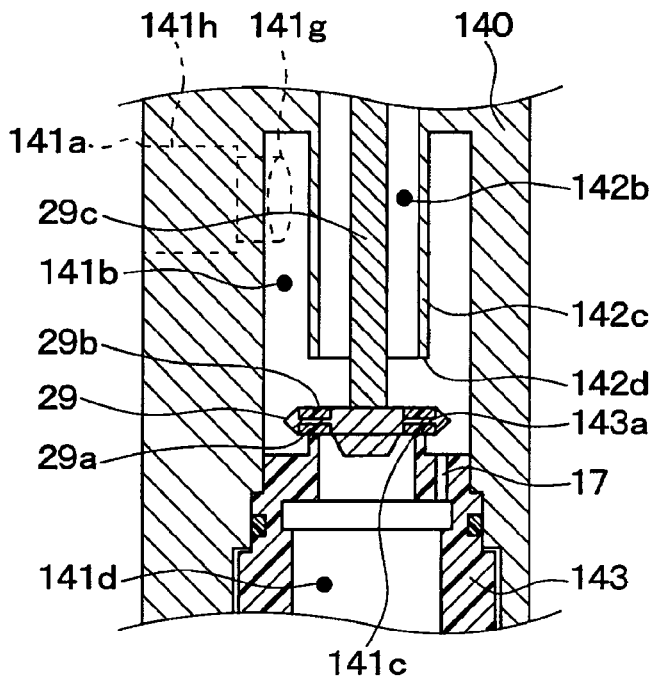
FIG. 22 is a cross-sectional view illustrating a modification example of the integration valve member.

In the present embodiment, although an example, in which the outer periphery part of the integration valve member 29 on the side of the separated vapor-phase refrigerant outlet hole 142d has a tapered shape, is described, a shape of the outer periphery part of the integration valve member 29 is not limited to the example. For example, as shown in FIG. 22, a diameter of the outer periphery part of the integration valve member 29 on the side of the separated liquid-phase refrigerant outlet hole 141c is continuously decreased from the side of the separated vapor-phase refrigerant outlet hole 142d to the separated liquid-phase refrigerant outlet hole 141c.

Accordingly, refrigerant flowing around the integration valve member 29 is guided to a center side of the separated liquid-phase refrigerant outlet hole 141c by using the outer periphery part of the integration valve member 29 on the side of the separated liquid-phase refrigerant outlet hole 141c, and the pressure loss $\Delta P$ caused by the integration valve member 29 may be decreased.

Figure 23:
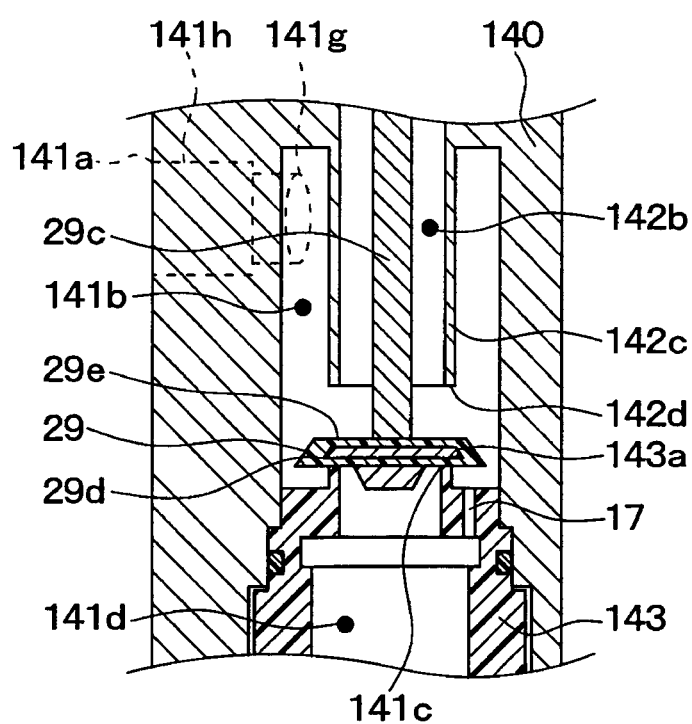
FIG. 23 is a cross-sectional view illustrating a modification example of the integration valve member.

As shown in FIG. 23, the integration valve member 29 may have a configuration in which a discoid-shaped portion 29d made of metal is molded with a resin 29e. Accordingly, the resin 29e molded to the discoid-shaped portion 29d can seal the separated vapor-phase refrigerant outlet hole 142d and the separated liquid-phase refrigerant outlet hole 141c without a gap.

Further, the integration valve member 29 of the present embodiment may be used as an integration valve member 29 in other embodiments except for the first embodiment.

Fourth Embodiment

In the present embodiment, an example, in which an inside configuration of the integration valve 14 is changed with respect to the first embodiment, will be described. A description about a portion corresponding to or equal to a portion of the first embodiment is omitted or simplified.

Figure 24:
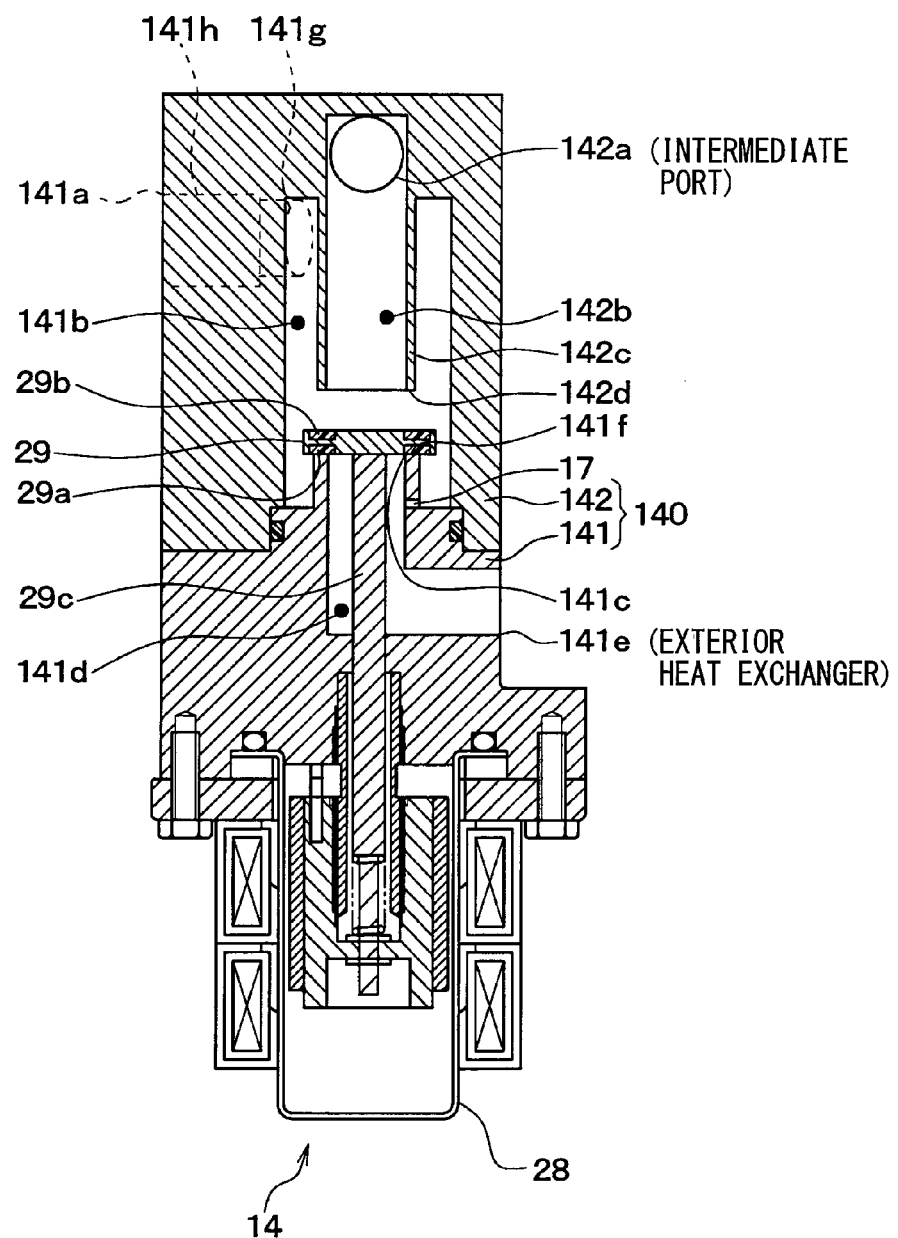
FIG. 24 is a cross-sectional view of an integration valve taken along the line extending the top-bottom direction according to a fourth embodiment.

As shown in a cross-sectional view of FIG. 24, the body 140 of the present embodiment is configured by a lower body 141 and an upper body 142 fixed upward of the lower body 141.

The upper body 142 is made of a generally bottomed-square-tubular metal block portion, of which axial direction extends in the top-bottom direction, and the refrigerant inlet port 141a is provided at an outer wall surface of the upper body 142. The vapor-liquid separating space 141b is provided in the upper body 142, and the upper body 142 houses the separated vapor-phase refrigerant outlet pipe 142c coaxially with the vapor-liquid separating space 141b. Further, a communication hole is provided at the separated vapor-phase refrigerant outlet pipe 142c at an upper end side so that the upper end portion of the separated vapor-phase refrigerant outlet pipe 142c communicates with outside of the body 140. The vapor-phase refrigerant outlet port 142a is an opening of the body 140 on a side of the body 140 adjacent to outside.

The lower body 141 is made of a generally-cylindrical metal block portion having an outside diameter which is generally equal to an outside diameter of the upper body 142. When the lower body 141 is fixed to the upper body 142, the separated liquid-phase refrigerant outlet hole 141c is provided on an uppermost periphery side of the lower body 141, opposite to the vapor-liquid separating space 141b. Liquid-phase refrigerant separated in the vapor-liquid separating space 141b flows to a side of the liquid-phase refrigerant passage 141d via the separated liquid-phase refrigerant outlet hole 141c. A periphery part of the separated liquid-phase refrigerant outlet hole 141c configures a valve seat part 141f contacting the integration valve member 29.

The liquid-phase refrigerant passage 141d is arranged downward of the vapor-liquid separating space 141b, and guides liquid-phase refrigerant separated in the vapor-liquid separating space 141b to the side of the liquid-phase refrigerant outlet port 141e. The liquid-phase refrigerant in the liquid-phase refrigerant passage 141d flows out of the integration valve 14 through the liquid-phase refrigerant outlet port 141e.

More specifically, the liquid-phase refrigerant passage 141d extends in a direction perpendicular to the axial direction of the vapor-liquid separating space 141b (i.e., a horizontal direction in the present embodiment). The liquid-phase refrigerant passage 141d is configured by a communication hole, through which inside of the lower body 141 and outside of the lower body 141 communicate with each other. An opening of the communication hole at an outer side of the lower body 141 provides the liquid-phase refrigerant outlet port 141e.

The integration valve member 29 is connected to the movable part of the stepping motor 28 fixed to a lower side of the lower body 141 by a fastening method such as a bolting via the shaft 29c. The shaft 29c of the present embodiment is arranged coaxially with the separated vapor-phase refrigerant outlet pipe 142c and passes through a part of the separated liquid-phase refrigerant outlet hole 141c and a part of the liquid-phase refrigerant passage 141d.

Other configurations and operations are the same as those of the first embodiment, and the present embodiment has additional effects described below with respect to the first embodiment.

In the present embodiment, the shaft 29c connected to the integration valve member 29 is arranged to pass through a part of the separated liquid-phase refrigerant outlet hole 141c and a part of the liquid-phase refrigerant passage 141d without passing inside of the separated vapor-phase refrigerant outlet pipe 142c. Accordingly, with respect to a case that the shaft 29c is disposed inside the separated vapor-phase refrigerant outlet pipe 142c, vapor-phase refrigerant passes inside the separated vapor-phase refrigerant outlet pipe 142c with less pressure loss.

Further, the inside configuration of the integration valve 14 of the present embodiment may be applied to other embodiments except for the first embodiment.

Fifth Embodiment

In the present embodiment, an example, in which an inside configuration of the integration valve 14 is changed with respect to the first embodiment, will be described. A description about a portion corresponding to or equal to a portion of the first embodiment is omitted or simplified.

Figure 25:
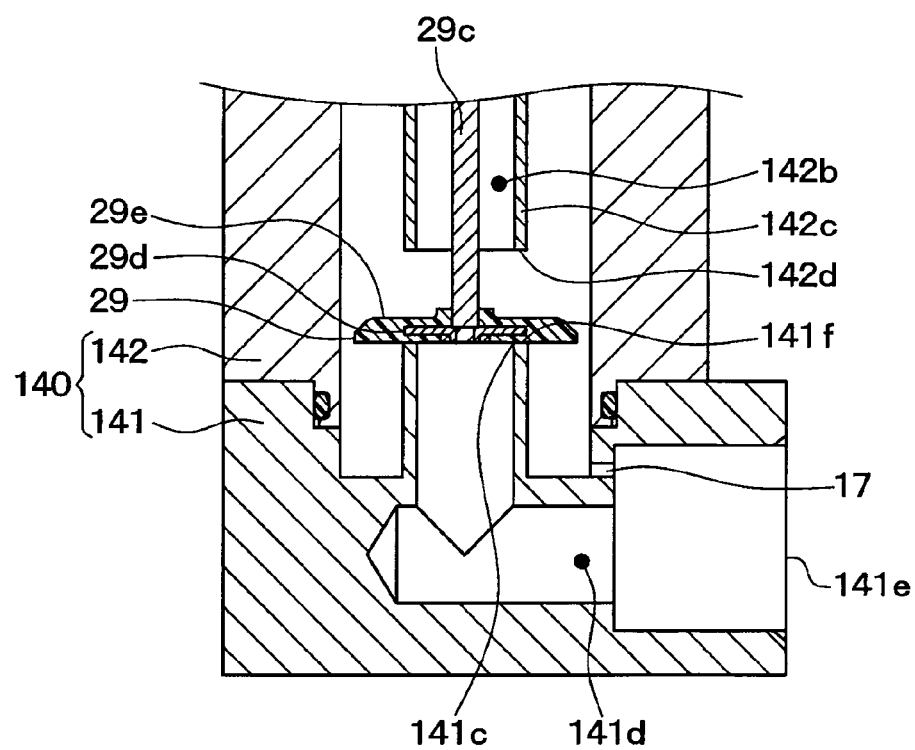
FIG. 25 is an enlarged cross-sectional view illustrating an enlarged substantial part of an integration valve according to a fifth embodiment.

As shown in FIG. 25, in the integration valve 14 of the present embodiment, the lower body 141 and the upper body 142 configure the body 140. The stepping motor 28 is attached to an upper end part of the upper body 142. The shaft 29c is arranged to pass through inside the separated vapor-phase refrigerant outlet pipe 142c.

Liquid-phase refrigerant separated in the vapor-liquid separating space 141b stagnates easily by gravity in the storing space A3 located downward of the vapor-liquid separating space 141b. Further, in the storing space A3, liquid-phase refrigerant stagnates easiest on an inner wall surface, at where a maximum centrifugal force affects to liquid-phase refrigerant.

The fixed throttle 17 of the present embodiment opens at a radial-outward and lowest part of the storing space A3 in the lower body 141. Accordingly, vapor-phase refrigerant can be effectively restricted from flowing into the fixed throttle 17, and a decompressing characteristic of the fixed throttle 17 can be stabilized. The inside configuration of the integration valve 14 described in the present embodiment may be used for other embodiments.

Sixth Embodiment

The first embodiment described above is an example in which the integration valve member 29 is linearly moved in the axial direction of the shaft 29c (i.e., in the vertical direction) by driving force of the stepping motor 28 to open or close the separated liquid-phase refrigerant outlet hole 141c and the separated vapor-phase refrigerant outlet hole 142d. In the present embodiment, the integration valve member 29 is linearly moved in a radial direction of the vapor-liquid separating space 141b to open or close the separated liquid-phase refrigerant outlet hole 141c and the separated vapor-phase refrigerant outlet hole 142d.

Figure 26A:
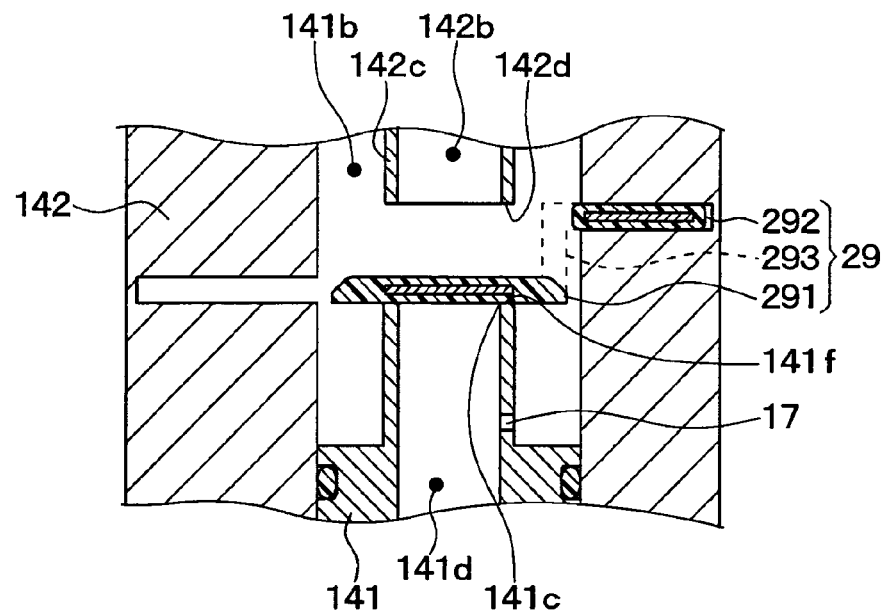
FIG. 26A is a cross-sectional view illustrating a situation where an integration valve member opens a separated vapor-phase refrigerant outlet hole according to a sixth embodiment.
Figure 26B:
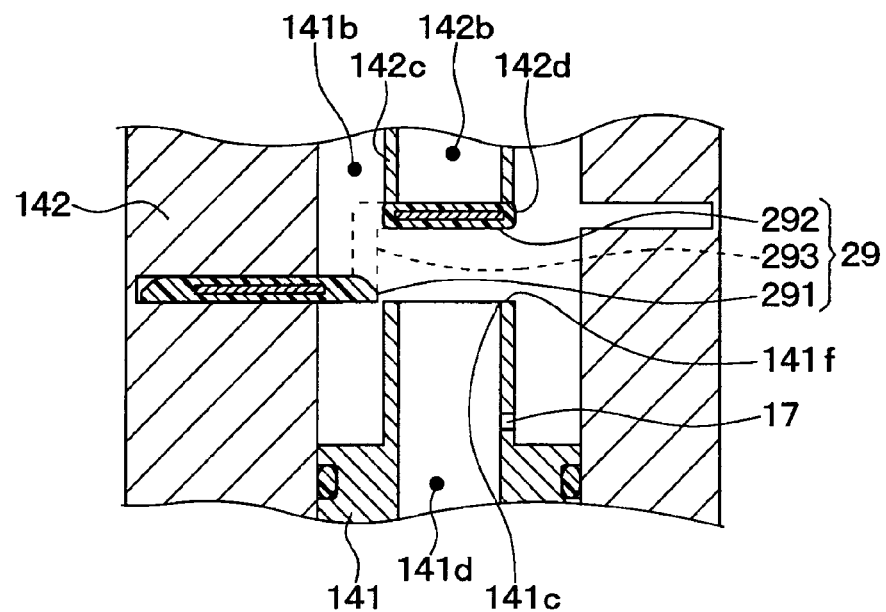
FIG. 26B is a cross-sectional view illustrating a situation where the integration valve member closes the separated vapor-phase refrigerant outlet hole according to the sixth embodiment.

As shown in FIGS. 26A and 26B, the integration valve member 29 of the present embodiment is configured by a discoid-shaped first valve part 291, a discoid-shaped second valve part 292, and a connecting part 293 connecting the first valve part 291 and the second valve part 292 with each other.

By moving the first valve part 291 in the radial direction of the vapor-liquid separating space 141b, the separated liquid-phase refrigerant outlet hole 141c is open or closed.

As shown in FIG. 26A, the second valve part 292 is moved to open the separated vapor-phase refrigerant outlet hole 142d in conjunction with a displacement of the first valve part 291 closing the separated liquid-phase refrigerant outlet hole 141c. As shown in FIG. 26B, the second valve part 292 is moved to close the separated vapor-phase refrigerant outlet hole 142d in conjunction with a displacement of the first valve part 291 opening the separated liquid-phase refrigerant outlet hole 141c.

The integration valve member 29 operated as described above is connected to a movable part of the stepping motor 28 via a driving mechanism (not shown), and the integration valve member 29 is movable in the radial direction of the vapor-liquid separating space 141b by the driving force of the stepping motor 28 so that the separated liquid-phase refrigerant outlet hole 141c and the separated vapor-phase refrigerant outlet hole 142d can be open or closed.

Other configurations and operations are the same as those of the first embodiment, and by using the integration valve 14 of the present disclosure, the integration valve member 29 can close one of the vapor-phase refrigerant passage 142b and the liquid-phase refrigerant passage 141d when the other one is open. That is, the integration valve member 29 can selectively open or close the vapor-phase refrigerant passage 142b and the liquid-phase refrigerant passage 141d, and a refrigerant circuit in the cycle can be switched for a refrigerant circuit working as a gas injection cycle by just moving the integration valve member 29 operated by the stepping motor 28.

Similar to the second embodiment, in a case where the fixed throttle 17 is not used, and where the integration valve member 29 opens the separated vapor-phase refrigerant outlet hole 142d, the stepping motor 28 may operate the integration valve member 29 to slightly open the separated liquid-phase refrigerant outlet hole 141c so that liquid-phase refrigerant separated in the vapor-liquid separating space 141b is decompressed.

Figure 27A:
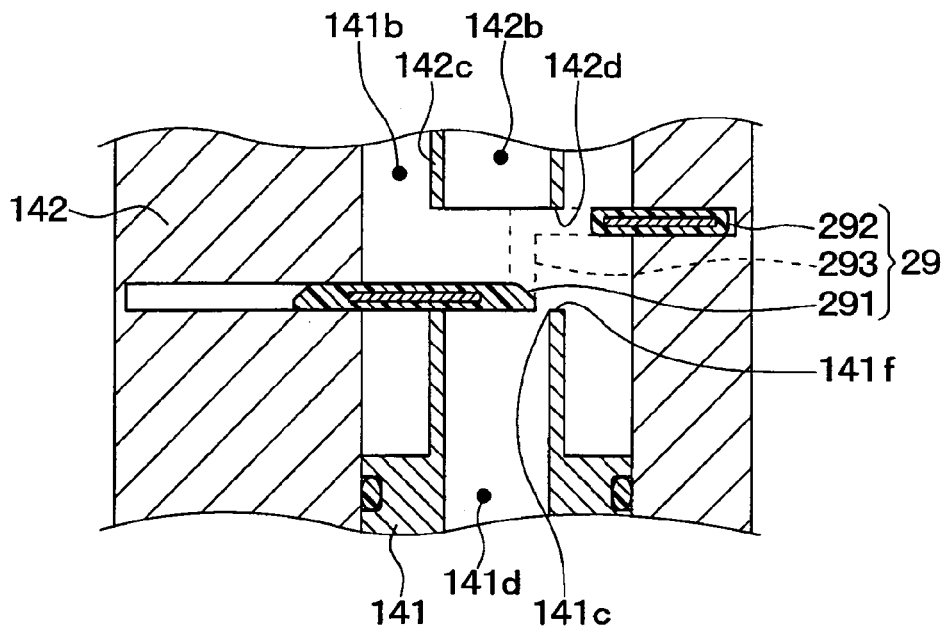
FIG. 27A is a cross-sectional view illustrating a modification example of the sixth embodiment.
Figure 27B:
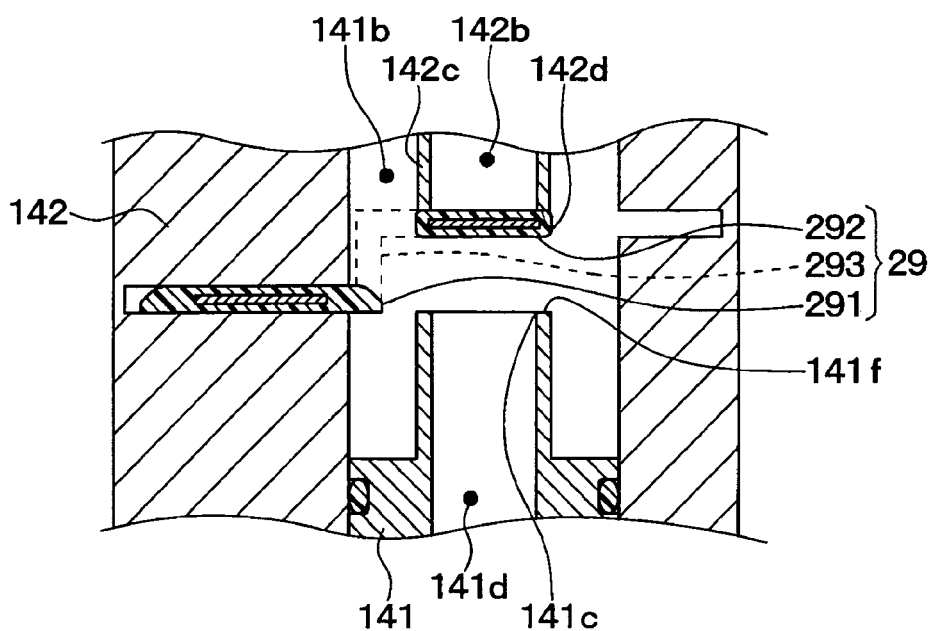
FIG. 27B is a cross-sectional view illustrating a modification example of the sixth embodiment.

Specifically, as shown in FIG. 27A, the stepping motor 28 may operate the first valve part 291 (i) to slightly open the separated liquid-phase refrigerant outlet hole 141c when the second valve part 292 opens the separated vapor-phase refrigerant outlet hole 142d and (ii) to open the separated liquid-phase refrigerant outlet hole 141c when the second valve part 292 closes the separated vapor-phase refrigerant outlet hole 142d.

Seventh Embodiment

The first embodiment described above is an example in which the integration valve member 29 is linearly moved in the axial direction of the shaft 29c (i.e., the vertical direction) by the driving force of the stepping motor 28 so that the separated liquid-phase refrigerant outlet hole 141c and the separated vapor-phase refrigerant outlet hole 142d are open or closed. The present embodiment will describe an example, in which the integration valve member 29 is rotatably movable so that the separated liquid-phase refrigerant outlet hole 141c and the separated vapor-phase refrigerant outlet hole 142d are open or closed.

Figure 28A:
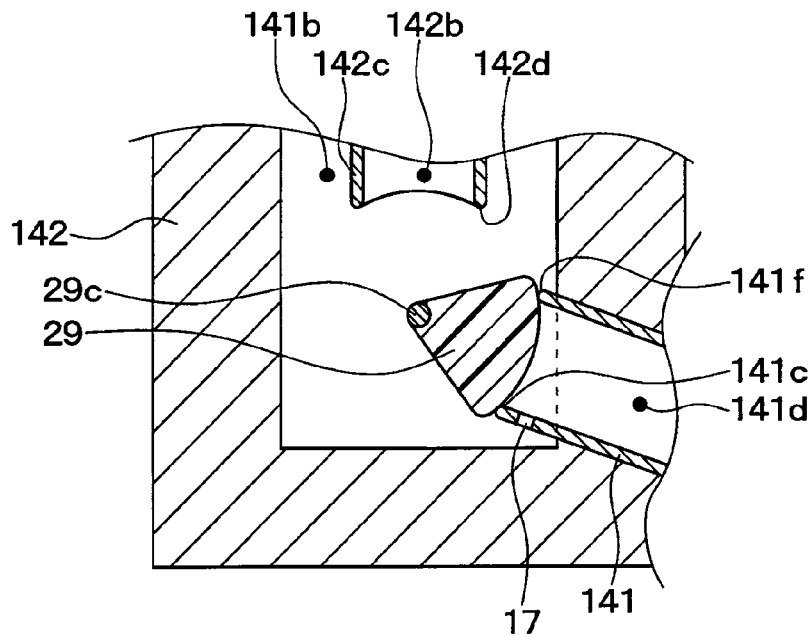
FIG. 28A is a cross-sectional view illustrating a situation where an integration valve member opens the separated vapor-phase refrigerant outlet hole according to a seventh embodiment.
Figure 28B:
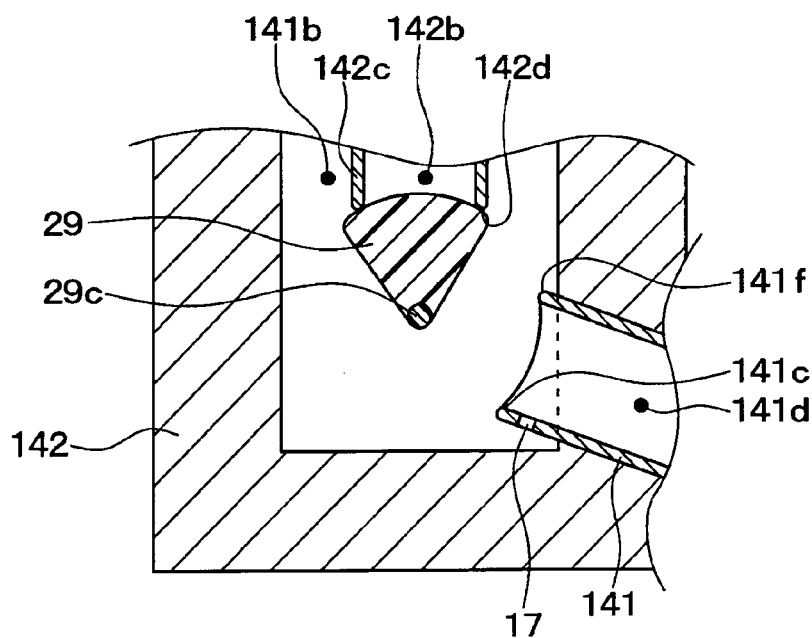
FIG. 28B is a cross-sectional view illustrating a situation where the integration valve member closes the separated vapor-phase refrigerant outlet hole according to the seventh embodiment.

In the present embodiment, as shown in FIGS. 28A and 28B, the separated vapor-phase refrigerant outlet hole 142d opens in the axial direction of the vapor-liquid separating space 141b. Whereas, the separated liquid-phase refrigerant outlet hole 141c opens to cross with the axial direction of the vapor-liquid separating space 141b. That is, the separated vapor-phase refrigerant outlet hole 142d and the separated liquid-phase refrigerant outlet hole 141c of the present embodiment are open so that a flow direction of vapor-phase refrigerant flowing out of the separated vapor-phase refrigerant outlet hole 142d is different from a flow direction of liquid-phase refrigerant flowing out of the separated liquid-phase refrigerant outlet hole 141c.

The integration valve member 29 is made of a sector-shaped member, and the separated liquid-phase refrigerant outlet hole 141c and the separated vapor-phase refrigerant outlet hole 142d are selectively open or closed by an ark-shaped circumference surface of the sector-shaped member.

Specifically, as shown in FIG. 28A, when the integration valve member 29 is moved to close the separated liquid-phase refrigerant outlet hole 141c, the separated vapor-phase refrigerant outlet hole 142d is open. As shown in FIG. 28B, when the integration valve 29 is moved to open the separated liquid-phase refrigerant outlet hole 141c, the separated vapor-phase refrigerant outlet hole 142d is closed.

The integration valve member 29 having such a configuration described above is connected to a movable part of the stepping motor 28 via the shaft 29c working as a rotation axis. By moving the integration valve member 29 rotatably based on the driving force of the stepping motor 28, the separated liquid-phase refrigerant outlet hole 141c and the separated vapor-phase refrigerant outlet hole 142d can be open or closed.

Other configurations and operations are the same as those of the first embodiment. Even in the integration valve 14 of the present embodiment, the integration valve member 29 can close one of the vapor-phase refrigerant passage 142d and the liquid-phase refrigerant passage 141d when the integration valve member 29 opens the other one. That is, the integration valve member 29 can selectively open or close the vapor-phase refrigerant passage 142b and the liquid-phase refrigerant passage 141d, and a refrigerant circuit in the cycle can be switched for a refrigerant circuit working as a gas injection cycle, by just moving the integration valve member 29 operated by the stepping motor 28.

Similar to the second embodiment, in a case where the fixed throttle 17 is not used, and where the integration valve member 29 opens the separated vapor-phase refrigerant outlet hole 142d, the stepping motor 28 may operate the integration valve member 29 to slightly open the separated liquid-phase refrigerant outlet hole 141c so that liquid-phase refrigerant separated in the vapor-liquid separating space 141b is decompressed.

Figure 29A:
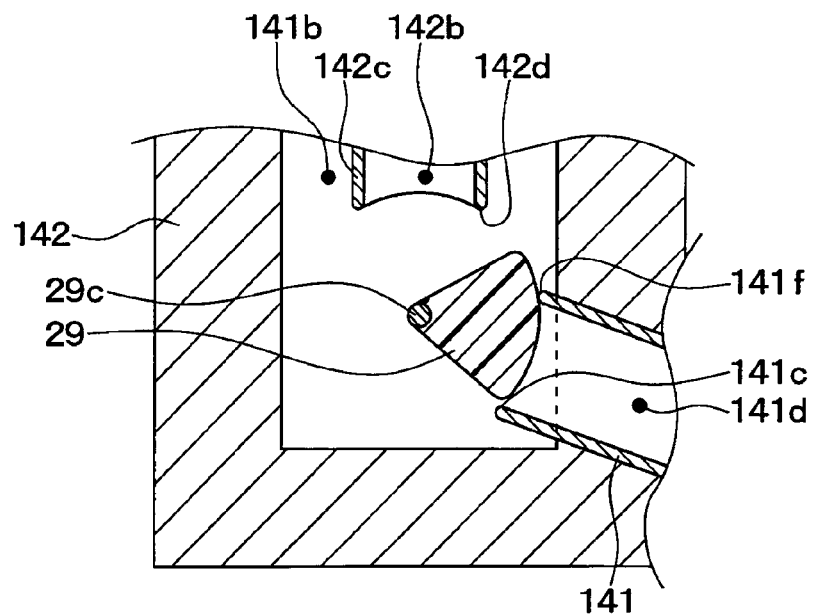
FIG. 29A is a cross-sectional view illustrating a modification example of the seventh embodiment.
Figure 29B:
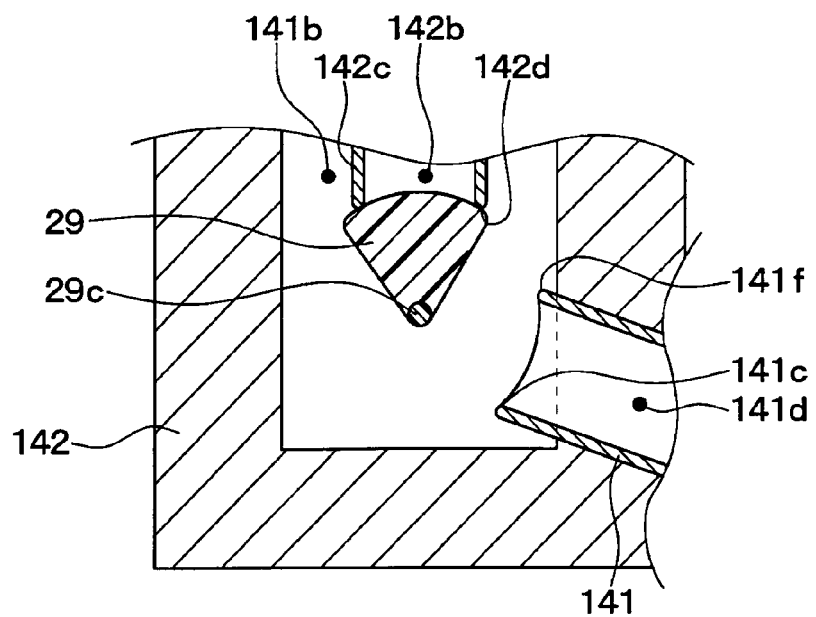
FIG. 29B is a cross-sectional view illustrating a modification example of the seventh embodiment.

Specifically, the stepping motor 28 may operate the integration valve member 29 (i) to slightly open the separated liquid-phase refrigerant outlet hole 141c when the integration valve member 29 is moved to open the separated vapor-phase refrigerant outlet hole 142d, as shown in FIG. 29A, and (ii) to open the separated liquid-phase refrigerant outlet hole 141c when the integration valve member 29 is moved to close the separated vapor-phase refrigerant outlet hole 142d, as shown in FIG. 29B.

Eighth Embodiment

The present embodiment which will be described below is an example in which the separated liquid-phase refrigerant outlet hole 141c and the separated vapor-phase refrigerant outlet hole 142d are open or closed by rotatably moving the integration valve member 29.

Figure 30A:
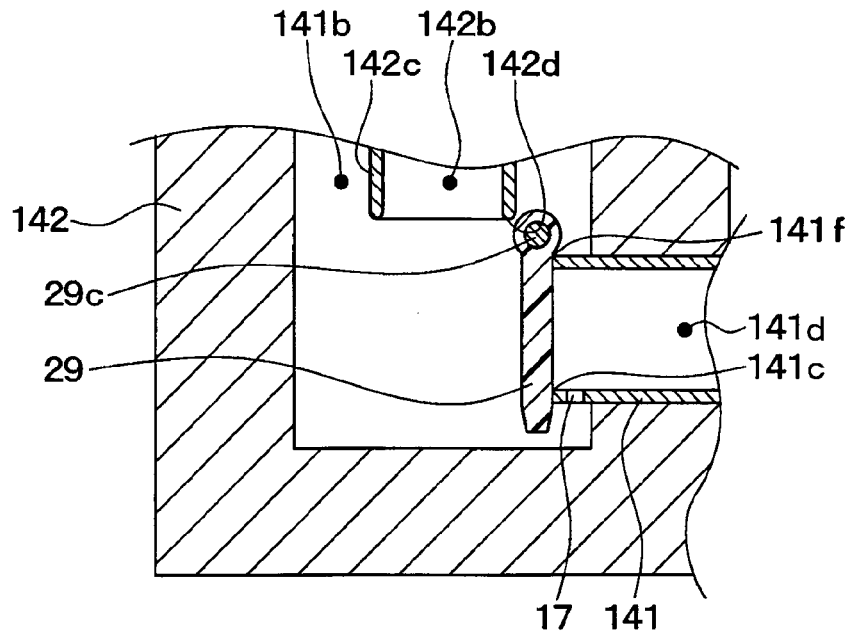
FIG. 30A is a cross-sectional view illustrating a situation where an integration valve member opens the separated vapor-phase refrigerant outlet hole according to an eighth embodiment.
Figure 30B:
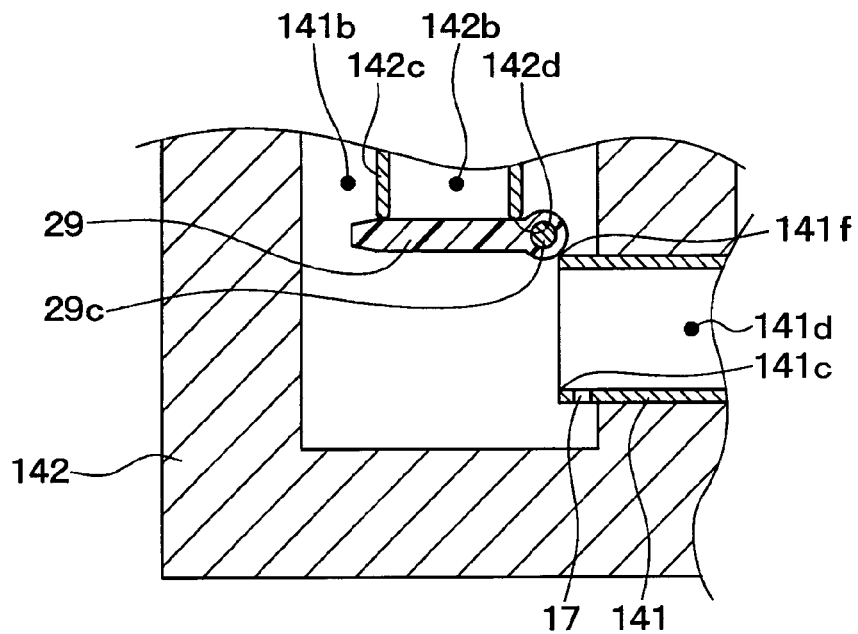
FIG. 30B is a cross-sectional view illustrating a situation where the integration valve member closes the separated vapor-phase refrigerant outlet hole according to the eighth embodiment.

In the present embodiment, as shown in FIGS. 30A and 30B, the separated vapor-phase refrigerant outlet hole 142d opens in the axial direction of the vapor-liquid separating space 141b, whereas the separated liquid-phase refrigerant outlet hole 141c opens to be perpendicular to the axial direction of the vapor-liquid separating space 141b. That is, the separated vapor-phase refrigerant outlet hole 142d and the separated liquid-phase refrigerant outlet hole 141c of the present embodiment are open so that a flow direction of vapor-phase refrigerant flowing out of the separated vapor-phase refrigerant outlet hole 142d is different from a flow direction of liquid-phase refrigerant flowing out of the separated liquid-phase refrigerant outlet hole 141c.

The integration valve member 29 is made of a flat plate-shaped member, and a plate surface of the integration valve member 29 opens or closes the separated liquid-phase refrigerant outlet hole 141c and the separated vapor-phase refrigerant outlet hole 142d, selectively.

Specifically, as shown in FIG. 30A, when the integration valve member 29 is moved to close the separated liquid-phase refrigerant outlet hole 141c, the separated vapor-phase refrigerant outlet hole 142d is open. As shown in FIG. 30B, when the integration valve member 29 is moved to open the separated liquid-phase refrigerant outlet hole 141c, the separated vapor-phase refrigerant outlet hole 142d is closed.

The integration valve 29 configured as described above is connected to a movable part of the stepping motor 28 via the shaft 29c working as a rotation axis, and the separated liquid-phase refrigerant outlet hole 141c and the separated vapor-phase refrigerant outlet hole 142d can be open or closed by moving the integration valve member 29 rotatably based on the driving force of the stepping motor 28.

Other configurations and operations are the same as those of the first embodiment, and in the integration valve 14 of the present embodiment, the integration valve member 29 can close one of the vapor-phase refrigerant passage 142b and the liquid-phase refrigerant passage 141d when the integration valve member 29 open the other one. That is, the integration valve member 29 can selectively open or close the vapor-phase refrigerant passage 142b and the liquid-phase refrigerant passage 141d, and a refrigerant circuit in the cycle can be switched for a refrigerant circuit working as a gas injection cycle by moving the integration valve member 29 by the stepping motor 28.

Similar to the second embodiment, in a case where the fixed throttle 17 is not used, and where the integration valve member 29 opens the separated vapor-phase refrigerant outlet hole 142d, the stepping motor 28 may operate the integration valve member 29 to slightly open the separated liquid-phase refrigerant outlet hole 141c so that liquid-phase refrigerant separated in the vapor-liquid separating space 141b is decompressed.

Figure 31A:
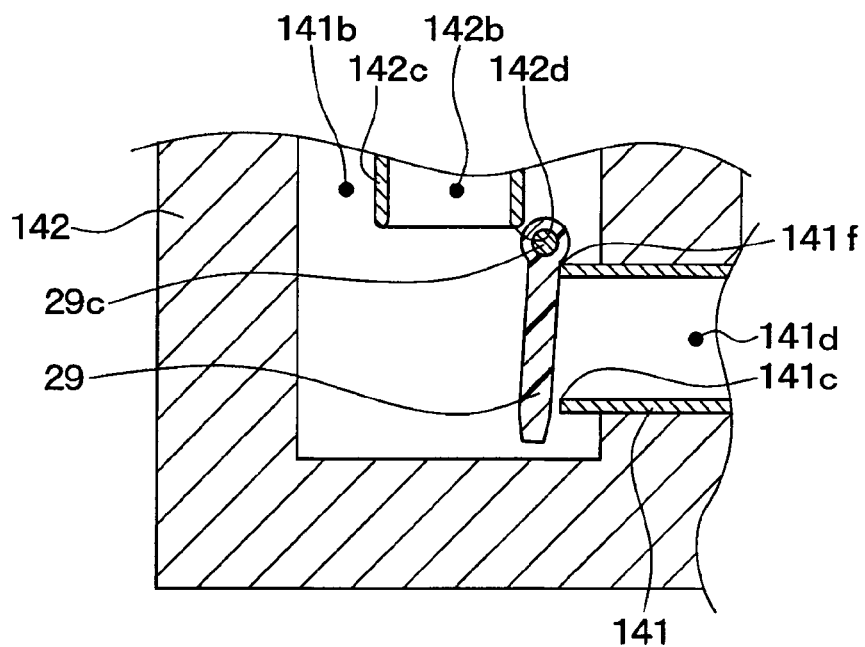
FIG. 31A is a cross-sectional view illustrating a modification example of the eighth embodiment.
Figure 31B:
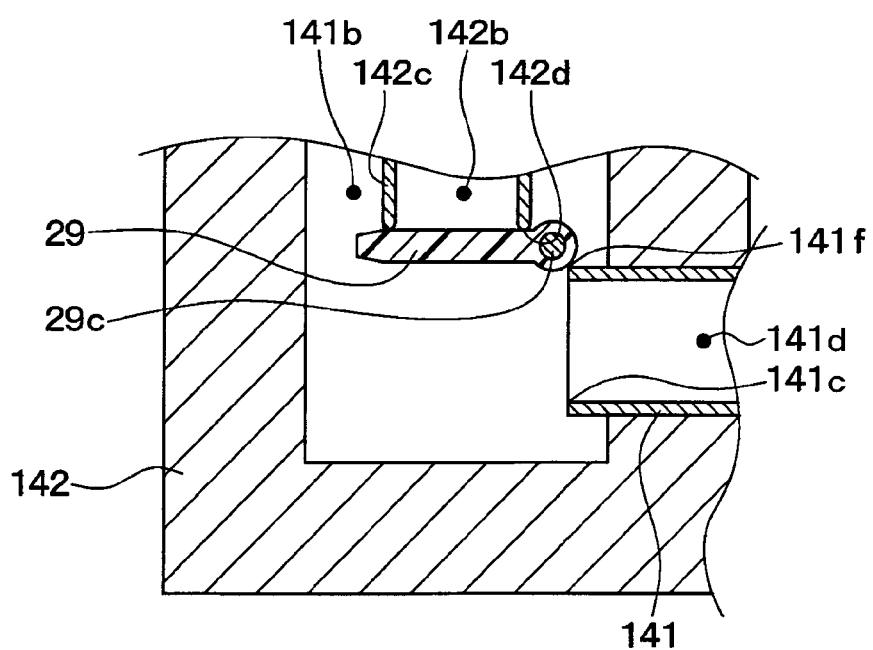
FIG. 31B is a cross-sectional view illustrating a modification example of the eighth embodiment.

Specifically, the stepping motor 28 may operate the integration valve member 29 (i) to slightly open the separated liquid-phase refrigerant outlet hole 141c when the integration valve member 29 is moved to open the separated vapor-phase refrigerant outlet hole 142d, as shown in FIG. 31A, and (ii) to open the separated liquid-phase refrigerant outlet hole 141c when the integration valve member 29 is moved to close the separated vapor-phase refrigerant outlet hole 142d, as shown in FIG. 31B.

(Other Modifications)

This disclosure is not limited to above embodiments, and various changes may be made without departing from the scope of the present disclosure.

(1) According to the above embodiments, the heat pump cycle 10 of the present disclosure is used in the vehicle air conditioner 1 of an electric vehicle. However, the heat pump cycle 10 may be effective for using in a vehicle, such as a hybrid vehicle getting a driving force for a vehicle driving from an engine (i.e., an internal combustion engine) and an electric motor, in which exhaust heat of the engine is not enough as a heat source for heating.

Moreover, the heat pump cycle 10 may be used in, for example, a stationary air conditioner, a container in which air therein is kept at a cool temperature, a liquid heating device, or the like. When the heat pump cycle 10 is employed in the liquid heating device, a liquid-refrigerant heat exchanger may be used as a using side heat exchanger, and a flow amount regulating part may be a liquid pump or a flow regulating valve, which regulates a flow amount of liquid flowing into the liquid-refrigerant heat exchanger.

Although a refrigerant circuit is switched so that the heat pump cycle 10 performs various operation modes in the above embodiments, a heat pump cycle functioning simply as a gas injection cycle can be configured, for example, when the integration valve 29 is moved by the stepping motor 28 to decompress liquid-phase refrigerant.

(2) Although the stepping motor 28 is used as a drive device operating the integration valve member 29 in the above embodiments, the drive device is not limited to the stepping motor 28. For example, a servo motor may be used as the drive device operating the integration valve member 29.

(3) Although the body 140 has a generally cylindrical-shaped exterior, the exterior shape of the body 140 is not limited to this example and may be a rectangular column shape. Further, by employing an exterior shape adapted to a mounting space in an object to be mounted, mountability of an entire heat pump cycle in the object can be greatly improved.

(4) Although the vapor-liquid separating space 141b of the body 140 is arranged so that the axial direction of the vapor-liquid separating space 141b is parallel with the vertical direction, the axial direction of the vapor-liquid separating space 141b is unnecessary to be coincide with the vertical direction. For example, in the heat pump cycle 10 mounted in a vehicle or the like, the axial direction of the vapor-liquid separating space 141b may be misaligned from the vertical direction when whole of the vehicle leans in a driving time.

In this case, based on an assuming result of a mounted state of the integration valve 14 assumed from a tilt of whole of the vehicle or the like, (i) the liquid-phase refrigerant passage 141d and the fixed throttle 17 are arranged downward of the separated vapor-phase refrigerant outlet hole 142d, and (ii) the vapor-phase refrigerant passage 142b is arranged upward of the separated vapor-phase refrigerant outlet hole 142d.

(5) Although the storing space A3 is provided in the vapor-liquid separating space 141b in the above embodiments, a location of the storing space A3 is not limited to this example. For example, the inside diameter of the vapor-liquid separating space 141b is set to be in a range from one and a half times to three times as large as an inside diameter of the refrigerant pipe connected with the refrigerant inlet port 141a so that whole of the integration valve 14 can be downsized.

More specifically, an inner volume of the vapor-liquid separating space 141b of this modification may be set to be smaller than an excess refrigerant volume, which is a refrigerant volume after deducting a maximum required refrigerant volume from a sealed refrigerant volume. The maximum required refrigerant volume is in a liquid-phase state and is calculated from a required refrigerant volume required for the cycle to perform with a maximum capacity in the cycle. The sealed refrigerant volume is in a liquid-phase state and is converted from a refrigerant volume sealed in the cycle. In other words, the inner volume of the vapor-liquid separating space 141b of this modification may not store an excess refrigerant substantially, even when a refrigerant volume circulating in the cycle is varied due to a load change.

(6) In the above embodiments and modifications, at least drawings referred to describe the integration valve 14 show specific examples of the integration valve 14, and it should be noted that configurations of the integration valve 14 is not limited to the specific examples. Various configurations of the integration valve 14 shown in those drawings can be combined as far as there is no harm in the combination.

What is claimed is:

1. An integration valve used for a heat pump cycle, which is capable of working as a gas injection cycle and includes (i) a compressor, which decompresses refrigerant drawn from a suction port, discharges high-pressure refrigerant from a discharge port, and has an intermediate-pressure port drawing intermediate-pressure refrigerant in the cycle and mixing the intermediate-pressure refrigerant with refrigerant being decompressed, (ii) a using-side heat exchanger, in which a heat-exchange fluid exchanges heat with the high-pressure refrigerant discharged from the discharge port so as to be heated, (iii) a high-stage-side decompressor decompressing high-pressure refrigerant flowing out of the using-side heat exchanger to be intermediate-pressure refrigerant, and (iv) an evaporator evaporating low-pressure refrigerant in the cycle, and causing the evaporated low-pressure refrigerant to flow to the suction port, the integration valve comprising:

a body having (i) a refrigerant inlet port through which the intermediate-pressure refrigerant decompressed at the high-stage-side decompressor flows, (ii) a vapor-liquid separating space separating refrigerant flowing out of the refrigerant inlet port into vapor-phase refrigerant and liquid-phase refrigerant, (iii) a vapor-phase refrigerant outlet port through which the vapor-phase refrigerant separated in the vapor-liquid separating space flows to a side of the intermediate-pressure port, and (iv) a liquid-phase refrigerant outlet port through which the liquid-phase refrigerant separated in the vapor-liquid separating space flows to a side of the evaporator;

an integration valve member disposed in the body, and opening or closing (i) a liquid-phase refrigerant passage extending from the vapor-liquid separating space to the liquid-phase refrigerant outlet port and (ii) a vapor-phase refrigerant passage extending from the vapor-liquid separating space to the vapor-phase refrigerant outlet port; and a drive device connected to the integration valve member via a drive mechanism and operating the integration valve member, wherein the drive device operates and moves the integration valve member to close the vapor-phase refrigerant passage when the liquid-phase refrigerant passage is open so that liquid-phase refrigerant flows toward a side of the liquid-phase refrigerant outlet port; and the drive device operates and moves the integration valve member to be displaced so that liquid-phase refrigerant flowing to the side of the liquid-phase refrigerant outlet port is decompressed when the vapor-phase refrigerant passage is open and passes vapor-phase refrigerant so as to flow to a side of the vapor-phase refrigerant outlet port.

2. The integration valve according to claim 1, wherein the body houses a fixed throttle which decompresses the liquid-phase refrigerant flowing to the side of the liquid-phase refrigerant outlet port when the vapor-phase refrigerant passage is open so that vapor-phase refrigerant flows toward the side of the vapor-phase refrigerant outlet port, and the drive device operates the integration valve member to close the liquid-phase refrigerant passage when the vapor-phase refrigerant passage is open so that vapor-phase refrigerant flows to the side of the vapor-phase refrigerant outlet port.

3. The integration valve according to claim 2, wherein the liquid-phase refrigerant passage and the fixed throttle are located downward of the separated vapor-phase refrigerant outlet hole through which vapor-phase refrigerant flows out of the vapor-liquid separating space to a side of the vapor-phase refrigerant passage.

4. The integration valve according to claim 1, wherein the drive device operates the integration valve member so that the liquid-phase refrigerant passage is slightly open to decompress liquid-phase refrigerant flowing to the side of the liquid-phase refrigerant outlet port, when the vapor-phase refrigerant passage is open, and when vapor-phase refrigerant flows to the side of the vapor-phase refrigerant outlet port.

5. The integration valve according to claim 1, wherein the vapor-liquid separating space is defined in a cylindrical shape, a separated vapor-phase refrigerant outlet pipe having a cylindrical shape and providing the vapor-phase refrigerant passage therein is arranged inside the vapor-liquid separating space coaxially with the vapor-liquid separating space, the separated vapor-phase refrigerant outlet pipe is provided with a separated vapor-phase refrigerant outlet hole through which vapor-phase refrigerant flows out of the vapor-liquid separating space to the side of the vapor-phase refrigerant passage, at an end of the separated vapor-phase refrigerant outlet pipe in a longitudinal direction, and the integration valve member opens or closes a separated liquid-phase refrigerant outlet hole through which liquid-phase refrigerant flowing from a side of the separated vapor-phase refrigerant outlet hole and the vapor-liquid separating space flows to the side of the liquid-phase refrigerant passage.

6. The integration valve according to claim 5, wherein the vapor-liquid separating space comprises:

a swirl space provided between an inner wall surface of the vapor-liquid separating space and an outer wall surface of the separated vapor-phase refrigerant outlet pipe, wherein refrigerant flowing from the refrigerant inlet port swirls along the inner wall surface of the vapor-liquid separating space;

a separating space (i) located downward of the swirl space, (ii) provided between the end of the separated vapor-phase refrigerant outlet pipe in the longitudinal direction and the integration valve member, and (iii) separating refrigerant into vapor-phase and liquid-phase; and a storing space located downward of the separating space and storing liquid-phase refrigerant separated from refrigerant in the separating space, and the integration valve member is arranged between the separated vapor-phase refrigerant outlet hole located in the separating space and the separated liquid-phase refrigerant outlet hole located in the storing space and is made of a discoid-shaped member which is larger than an inside diameter of the separated liquid-phase refrigerant outlet hole.

7. The integration valve according to claim 6, wherein when (i) an outside diameter of the integration valve member is defined as Ds, (ii) an outside diameter of the separated vapor-phase refrigerant outlet pipe is defined as Dp, (iii) an inside diameter of the vapor-liquid separating space is defined as Dr, and (iv) the inside diameter of the separated liquid-phase refrigerant outlet hole is defined as Do, Ds, Dp, Dr, and Do are determined to satisfy following formulas of $Dp \leq Ds \leq (Dx+Dr)/2$ and $Dx=(Dr^2-Do^2)^{1/2}$.

8. The integration valve according to claim 6, wherein a diameter of an outer periphery part of the integration valve member at least on a side of the separated vapor-phase refrigerant outlet hole continuously decreases from a side of the separated liquid-phase refrigerant outlet hole to a side of the separated vapor-phase refrigerant outlet hole.

9. The integration valve according to claim 5, wherein a refrigerant introducing passage, guiding refrigerant to flow from the refrigerant inlet port to the vapor-liquid separating space, communicates with the vapor-liquid separating space via a refrigerant introducing hole provided at a radial-outer wall surface of the vapor-liquid separating space, and the refrigerant introducing hole is open at a position far from the end of the separated vapor-phase refrigerant outlet pipe in the longitudinal direction, and closer to the other end of the separated vapor-phase refrigerant outlet pipe in the longitudinal direction.

10. The integration valve according to claim 9, wherein
the refrigerant introducing hole is an oblong hole extending in an axial direction of the vapor-liquid separating space.

11. The integration valve according to claim 9, wherein
when (i) a distance in the axial direction from an end of the refrigerant introducing hole corresponding to the end of the separated vapor-phase refrigerant outlet pipe in the longitudinal direction to the other end of the separated vapor-phase refrigerant outlet pipe in the longitudinal direction is defined as Lv, and (ii) a dimension of the refrigerant introducing hole extending in the axial direction in the vapor-liquid separating space is defined as Dv, Lv and Dv are determined to satisfy a following formula of $Lv \geq (1/2) \times Dv$.

12. The integration valve according to claim 5, wherein
the body has a tubular portion in which the liquid-phase refrigerant passage and the separated liquid-phase refrigerant outlet hole (141*c*) are provided, and
the tubular portion has a heat resistance higher than that of a portion around the tubular portion.

13. The integration valve according to claim 5, wherein
the separated vapor-phase refrigerant outlet hole and the separated liquid-phase refrigerant outlet hole are open to oppose to each other, inside the body, and
the integration valve member moves linearly to open or close the separated vapor-phase refrigerant outlet hole and the separated liquid-phase refrigerant outlet hole.

14. The integration valve according to claim 5, wherein
the separated vapor-phase refrigerant outlet hole and the separated liquid-phase refrigerant outlet hole are open so that a flow direction of vapor-phase refrigerant flowing out of the separated vapor-phase refrigerant outlet hole is different from a flow direction of liquid-phase refrigerant flowing out of the separated liquid-phase refrigerant outlet hole, and
the integration valve member moves rotatably to open or close the separated vapor-phase refrigerant outlet hole and the separated liquid-phase refrigerant outlet hole.

* * * * *